US008039154B2

(12) United States Patent     (10) Patent No.:   US 8,039,154 B2
Morita et al.     (45) Date of Patent:   Oct. 18, 2011

(54) FUEL CELL SYSTEM, METHOD OF STARTING FUEL CELL SYSTEM

(75) Inventors: Junji Morita, Osaka (JP); Makoto Uchida, Osaka (JP); Yasushi Sugawara, Osaka (JP); Takayuki Urata, Hyogo (JP); Shinya Kosako, Hyogo (JP); Takahiro Umeda, Nara (JP); Soichi Shibata, Osaka (JP); Yoichiro Tsuji, Osaka (JP); Masataka Ozeki, Osaka (JP); Akinari Nakamura, Osaka (JP); Yoshikazu Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 1302 days.

(21) Appl. No.: 10/561,386

(22) PCT Filed: Aug. 24, 2004

(86) PCT No.: PCT/JP2004/012458
§ 371 (c)(1),
(2), (4) Date: Dec. 19, 2005

(87) PCT Pub. No.: WO2005/020360
PCT Pub. Date: Mar. 3, 2005

(65) Prior Publication Data
US 2007/0099040 A1     May 3, 2007

(30) Foreign Application Priority Data

Aug. 25, 2003 (JP) ................. 2003-299581
Aug. 29, 2003 (JP) ................. 2003-306621
Oct. 8, 2003 (JP) ................. 2003-350058
Dec. 12, 2003 (JP) ................. 2003-415579
Jan. 20, 2004 (JP) ................. 2004-011550

(51) Int. Cl.
*H01M 8/04* (2006.01)
(52) U.S. Cl. .......... 429/428; 429/427; 429/433
(58) Field of Classification Search .......... 429/22, 429/34, 13
See application file for complete search history.

(56) References Cited

U.S. PATENT DOCUMENTS
6,939,633 B2 * 9/2005 Goebel .................. 429/17
(Continued)

FOREIGN PATENT DOCUMENTS
GB     1 296 831     2/1969
(Continued)

OTHER PUBLICATIONS
Canadian Office Action issued in Canadian Patent Application No. 2,518,419 dated Mar. 31, 2011.
(Continued)

*Primary Examiner* — Barbara Gilliam
*Assistant Examiner* — Angela Martin
(74) *Attorney, Agent, or Firm* — McDermott Will & Emery LLP

(57) ABSTRACT

Problems of acceleration of drying of electrolyte membrane and local reaction, etc. can be properly coped with to attain the stabilization of performance of fuel cell.
There are provided a fuel cell 121 which generates electric power from a fuel gas and an oxidizing agent gas, a fuel gas feed pipe 161 and a first switch valve 129 as fuel gas supplying unit which supplies the said fuel gas into the said fuel cell on the anode side thereof, an oxidizing gas supplying pipe 162 and a second cut-off valve 131 as oxidizing agent gas supplying unit which supplies the said oxidizing agent into the said fuel cell on the cathode side thereof, a raw material gas supplying pipe 151 and a third switch valve 143 as raw material gas supplying unit which supplies raw material of the said fuel gas into the fuel cell and a control portion 127 which controls the supply of the said fuel gas, the supply of the said oxidizing agent and the supply of the said raw material and the control portion 127 controls the starting of electricity generation of the fuel cell 121 such that the said raw material gas supplying unit purges the fuel cell 121 at least on the cathode side thereof with the said raw material gas before the oxidizing agent gas supplying unit and the fuel gas supplying unit supply the fuel gas and the said oxidizing agent gas into the fuel cell 121, respectively.

9 Claims, 35 Drawing Sheets

U.S. PATENT DOCUMENTS

| | | |
|---|---|---|
| 2003/0104711 A1 | 6/2003 | Nakamura et al. |
| 2003/0224226 A1* | 12/2003 | Jia et al. ............................ 429/13 |
| 2004/0038098 A1* | 2/2004 | Imamura et al. ................. 429/25 |
| 2005/0159844 A1* | 7/2005 | Sigafus et al. ................. 700/275 |

FOREIGN PATENT DOCUMENTS

| | | | |
|---|---|---|---|
| JP | 62-190660 | * | 8/1987 |
| JP | 62 190660 | | 8/1987 |
| JP | 62-190661 | | 8/1987 |
| JP | 5-251101 | | 9/1993 |
| JP | 6-251788 | | 9/1994 |
| JP | 8-222258 | | 8/1996 |
| JP | 2000-260454 | | 9/2000 |
| JP | 2002-093448 | | 3/2002 |
| JP | 3-297125 | | 4/2002 |
| JP | 2003-151599 | | 5/2003 |
| JP | 2003-229149 | | 8/2003 |
| JP | 2003-229156 | | 8/2003 |

OTHER PUBLICATIONS

European Search Report issued in Patent Application No. 04772414.1-1227 dated on Aug. 20, 2008.

* cited by examiner

FUEL CELL SYSTEM, METHOD OF STARTING FUEL CELL SYSTEM

RELATED APPLICATIONS

This application is the U.S. National Phase under 35 U.S.C. §371 of International Application No. PCT/JP2004/012458, filed Aug. 24, 2004, which in turn claims the benefit of Japanese Application Nos. 2003-299581, filed Aug. 25, 2003; 2003-306621, filed Aug. 29, 2003; 2003-350058, filed Oct. 8, 2003; 2003-415579, filed Dec. 12, 2003; and 2004-011550, filed Jan. 20, 2004, the disclosures of which Applications are incorporated by reference herein in their entirety.

TECHNICAL FIELD

The present invention relates to a fuel cell system and a method of starting same.

BACKGROUND ART

The configuration and operation of a conventional ordinary solid polymer electrolyte type fuel cell will be described in connection with FIGS. 1, 2 and 7. FIG. 1 depicts the basic configuration of a polymer electrolyte type fuel cell (hereinafter referred to as "PEFC") among the conventional fuel cells. A fuel cell is an apparatus to cause electrochemical reaction of a fuel gas such as hydrogen with an oxygen-containing gas such as air on a gas diffusion electrode to generate electricity and heat at the same time. As an electrolyte 1 there is used a polymer electrolyte membrane which selectively transports hydrogen ion or the like. On the both surfaces of the electrolyte 1 is provided a catalytic reaction layer 2 comprising as a main component a carbon powder having a platinum-based metallic catalyst supported thereon in contact therewith. On this catalytic reaction layer, reactions represented by the (chemical formula 1) and (chemical formula 2) occur and, on the whole of the fuel cell, reactions represented by the (chemical formula 3) occurs.

$$H_2 \rightarrow 2H^+ + 2e^- \quad \text{(chemical formula 1)}$$

$$\tfrac{1}{2}O_2 + 2H^+ + 2e^- \rightarrow H_2O \quad \text{(chemical formula 2)}$$

$$H_2 + \tfrac{1}{2}O_2 \rightarrow H_2O \quad \text{(chemical formula 3)}$$

The fuel gas containing at least hydrogen (hereinafter referred to as "anode gas") undergoes a reaction represented by the (chemical formula 1) (hereinafter referred to as "anode reaction") while the hydrogen ion which has moved through the electrolyte 1 undergoes a reaction represented by the (chemical formula 2) (hereinafter referred to as "cathode reaction") with an oxygen-containing gas (hereinafter referred to as "cathode gas") on catalytic reaction layer 2 to produce water, whereby electricity and heat are generated. On the whole of the fuel cell, hydrogen and oxygen react with each other as represented by the (formula 3) to produce water electricity and heat can be used. The side on which the fuel gas such as hydrogen takes part in the reaction is called anode and is given a sign a in the drawings and the side on which the oxidizing agent gas such as air takes part in the reaction is called cathode and is given a sign c in the drawings. Further, diffusion layers 3a and 3c having both gas permeability and electrical conductivity are disposed in close contact with the outer surface of the catalytic reaction layers 2a and 2c, respectively. The diffusion layer 3a and the catalytic reaction layer 2a form an electrode 4a and the diffusion layer 3c and the catalytic reaction layer 2c form an electrode 4c. The reference numeral 5 indicates an electrode-electrolyte assembly (hereinafter referred to as "MEA") and is formed by the electrode 4 and the electrolyte 1. A pair of electrically-conductive separators 7a and 7c disposed thereon which mechanically fix MEA 5 and electrically connect adjacent MEAs 5 in serial, and have gas flow paths 6a and 6c formed on the surfaces thereof in contact with MEA 5 for supplying the reactive gas into the electrodes and carrying the gas produced by the reaction or extra gas away is provided. The electrolyte 1, the pair of catalytic reaction layers 2a and 2c, the pair of diffusion layers 3a and 3c, the pair of electrodes 4a and 4c and the pair of separators 7a and 7c form a basic unit of a fuel cell (hereinafter referred to as "cell") The separators 7a and 7c have the separator 7c and 7a of the adjacent cell disposed in contact therewith, respectively, on the surface thereof opposite MEA 5. The separators 7a and 7c have a cooling water flow-path 8 provided on the side thereof in contact with each other through which cooling water 9 flows. The cooling water 9 moves heat such that the temperature of MEA 5 is adjusted through the separators 7a and 7c. MEA 5 and the separator 7a or 7c are sealed to each other with an MEA gasket 10 and the separators 7a and 7c are sealed to each other with a separator gasket 11.

The electrolyte 1 has a fixed charge and as a counter ion for the fixed charge there is present hydrogen ion. The electrolyte 1 is required to be selectively permeable to hydrogen ion, and, to this end, it is necessary that the electrolyte 1 have water content retained therein. This is because when the electrolyte 1 contains water content, the fixed charge fixed in the electrolyte 1 is ionized, causing hydrogen which is a counter ion for the fixed charge to be ionized and movable.

FIG. 2 depicts a stack comprised of laminating cells. Since the voltage of a fuel cell unit is normally as low as about 0.75 v, a plurality of cell units is laminated in series with each other to give a high voltage. A collector 21 is adapted to take current out of the stack and an insulating plate 22 is adapted to electrically insulate the cell from the exterior. An end plate 23 is adapted to fasten and mechanically retain the stack having cell units laminated on each other.

A conventional fuel cell system will be described in connection with FIG. 38. A fuel cell system is received in an outer case 31. A gas purifying portion 32 is adapted to remove materials having adverse effects on the fuel cell from the fuel gas and introduce the fuel gas from the exterior through a raw material gas pipe 33. A valve 34 is adapted to control the flow of raw material gas. A fuel generator 35 is adapted to produce a fuel gas containing at least hydrogen from the raw material gas. The fuel gas is introduced from the fuel generator 35 into the stack 38 through a fuel gas pipe 37. A blower 39 is adapted to introduce an oxidizing agent gas into the stack 38 through a suction pipe 40. The suction pipe 42 is adapted to discharge the oxidizing agent gas discharged from the stack 38 out of the fuel cell system. The fuel gas which has not been used in the stack 38 is allowed to flow again into the fuel generator 35 through an off-gas pipe 48. The gas from the off-gas pipe 48 is used in combustion and is utilized in endothermic reaction for the production of a fuel gas from the raw material gas, etc. An electric power circuit portion 43 is adapted to take electric power out of the fuel cell stack 38 and a control portion 44 is adapted to control the gas and the electric power circuit portion. A pump 45 is adapted to cause water to flow from a cooling water inlet pipe 46 through the water line into the fuel cell stack 38. The water which has flown through the fuel cell stack 38 is carried out through the cooling water outlet pipe 47. Water flows through the fuel cell stack 38; thereby the heat generated in the fuel cell stack 38 can be used outside the fuel cell system while keeping the heated fuel cell stack 38 at a constant temperature. The fuel cell system is formed by the stack 38 composed of fuel cells, the gas purifying portion 32, the fuel generator 35, the electric power circuit portion 43 and the control portion 44.

The household fuel cell system is formed by the fuel cell stack 38 and the fuel generator 35. It is necessary that the deterioration of performance of the fuel cell system be eliminated to maintain desired performance over an extended period of time. Further, in the case where a raw material gas such as city gas comprising methane as a main component is used for household, it is effective to operate the household fuel cell system for a time zone during which electricity and heat are consumed in a large amount while suspending the household fuel cell system for a time zone during which electricity and heat are consumed less for the purpose of enhancing the advantage of fuel and light expenses and the effect of reducing $CO_2$.

In general, DSS (Daily Start & Stop or Daily Start-up & Shut-down) operation in which operation is conducted in the daytime but is suspended in the nighttime can enhance the advantage of fuel and light expenses and the effect of reducing $CO_2$ and the fuel cell system preferably can flexibly cope with an operation pattern comprising starting and suspension. Some reports have been made to date.

For example, as a method of solving these problems, an electric power consuming unit is separately connected to the interior of the system until the starting of connection of an external load to the system during starting to prevent the system from reaching the open circuit potential (see JP-A-5-251101). Alternatively, a discharging unit of inhibiting the open circuit voltage is installed in the system (see JP-A-8-222258). Alternatively, the system is suspended and stored while being enclosed with moistened inert gas to keep an ion exchange membrane as an electrolyte impregnated with water also during storage (see JP-A-6-251788). In order to prevent the oxygen electrode from being oxidized or having impurities adsorbed thereto, electricity generation is conducted while suspending the supply of an oxygen-containing gas so that the consumption of oxygen can be adjusted to enhance the durability (see JP-A-2002-93448). Alternatively, hydrogen leaking from the anode to the cathode is used to enhance the performance of the cathode electrode (see JP-A-2000-260454).

DISCLOSURE OF THE INVENTION

The aforementioned conventional method of suspending and storing a fuel cell discloses that the interior of the fuel cell is substituted by moistened inert gas for the purpose of preventing the acceleration of drying of the electrolyte membrane, but this suspending and storing method has the following matters to be desired.

Firstly, even if the fuel cell is sealed in such an arrangement that it is blocked off the external atmosphere, in the case where the fuel cell is stored over a certain period of time (e.g., about 15 hours to 3 days), it is likely that air (oxygen gas) can leak and enter inside of the fuel cell through the sealed portion. In the case of the moistened inert gas introducing method (involving introduction shortly after suspension) described in JP-A-6-251788 in particular, the falloff of the internal temperature of the fuel cell causes the water vapor contained in the moistened inert gas to form dew that accelerates the Negative-pressurization, making it more likely that oxygen gas can enter into the fuel cell. When a hydrogen-rich fuel gas is supplied into the fuel cell during re-starting under these conditions, it is likely that local reaction of oxygen gas with fuel gas on the anode of the fuel cell can cause damage or deterioration of performance of the fuel cell.

The present invention has been worked out under the aforementioned circumstances and its object is to provide a fuel cell system which can properly cope with problems of acceleration of drying of electrolyte membrane, local reaction, etc. to attain the stabilization of performance of fuel cell and a method of starting the fuel cell system.

The $1^{st}$ aspect of the present invention is a fuel cell system comprising:

a fuel cell which generates electric power from a fuel gas and an oxidizing agent gas;

a fuel gas supplying means which supplies the said fuel gas into the said fuel cell on the anode side thereof;

an oxidizing agent gas supplying means which supplies the said oxidizing agent gas into the said fuel cell on the cathode side thereof;

a raw material gas supplying means which supplies a gas of raw material of the said fuel gas into the said fuel cell; and a control means which controls the said fuel gas supplying means, the said oxidizing agent gas supplying means and the said raw material gas supplying means, wherein the said control means controls during the starting of electricity generation of the said fuel cell such that the said raw material gas supplying means purges the said fuel cell at least on the cathode side thereof with the said raw material gas before the said oxidizing agent gas supplying means and the said fuel gas supplying means supply the said fuel gas and the said oxidizing agent gas into the said fuel cell, respectively.

The $2^{nd}$ aspect of the present invention is the fuel cell system according to the $1^{st}$ aspect of the present invention, wherein the said raw material gas supplying means purges the interior of the said fuel cell on the anode side thereof after purging on the said cathode side thereof.

The $3^{rd}$ aspect of the present invention is the fuel cell system according to the $1^{st}$ or the $2^{nd}$ aspect of the present invention, comprising:

a fuel gas pipe disposed between the said fuel gas supplying means and the said fuel cell battery on the cathode side thereof;

a fuel gas on-off valve disposed along the said fuel gas pipe;

an oxidizing agent gas pipe disposed between the said oxidizing agent gas supplying means and the said fuel cell on the anode side thereof;

an oxidizing agent gas on-off valve disposed along the said oxidizing agent gas pipe;

a raw material gas pipe connected to the said raw material gas supplying means and a part of the said oxidizing agent gas pipe disposed between the said oxidizing agent gas on-off valve and the said fuel cell on the cathode side thereof; and a raw material gas on-off valve disposed along the said raw material gas pipe.

The $4^{th}$ aspect of the present invention is the fuel cell system according to the $3^{rd}$ aspect of the present invention, wherein a cathode side exhaust pipe through which an off-gas discharged from the said fuel cell on the cathode side thereof is discharged and a cathode side off-gas on-off valve disposed along the said cathode side exhaust pipe and the said purge is carried out by opening the said cathode side off-gas on-off valve, opening the said raw material gas on-off valve for a predetermined period of time and then closing the said raw material gas on-off valve.

The $5^{th}$ aspect of the present invention is the fuel cell system according to the $4^{th}$ aspect of the present invention, wherein there are provided an additional raw material gas pipe connected to the said raw material gas supplying means and a part of the said raw material gas pipe disposed between the said fuel gas on-off valve and the said fuel cell on the anode side thereof, an additional raw material gas on-off valve disposed along the said additional raw material gas pipe, an anode side exhaust pipe through which an off-gas discharged from the said fuel cell on the anode side thereof is discharged and an anode side off-gas on-off valve disposed along the said anode side exhaust pipe and the said purge is carried out by opening the said raw material gas on-off valve, opening the said anode side off-gas on-off valve, and then opening the said additional raw material gas on-off valve for a predetermined period of time.

The $6^{th}$ aspect of the present invention is the fuel cell system according to the $5^{th}$ aspect of the present invention, wherein the operation of the said oxidizing agent gas supplying means and the said fuel gas supplying means of supplying the said fuel gas and the said oxidizing agent gas into the said fuel cell is carried out by opening the said anode side off-gas on-off valve, opening the said fuel gas on-off valve, opening the said cathode side off-gas on-off valve, and then opening the said oxidizing agent gas on-off valve.

The $7^{th}$ aspect of the present invention is a method of starting a fuel cell system comprising a fuel cell which generates electric power from a fuel gas and an oxidizing agent gas, an oxidizing agent gas supplying means which supplies an oxidizing agent gas into the said fuel cell and a fuel supplying means which supplies the said fuel gas into the said fuel cell, wherein the said fuel cell at least on the cathode side thereof is purged with a raw material gas to be used in the production of the said fuel gas before the said fuel gas and the said oxidizing agent gas are supplied into the said fuel cell during the starting of electricity generation of the said fuel cell.

The $8^{th}$ aspect of the present invention is the method of starting a fuel cell system according to the $7^{th}$ aspect of the present invention, wherein the interior of the said fuel cell on the said anode side thereof is purged after purging on the said cathode side thereof.

The $9^{th}$ aspect of the present invention is a program of computer-controlling a step of purging the said fuel cell at least on the cathode side thereof with a raw material gas to be used in the production of the said fuel gas before the said fuel gas and the said oxidizing agent gas are supplied into the said fuel cell during the starting of electricity generation of the said fuel cell in the method of starting a fuel cell system according to the $7^{th}$ aspect of the present invention.

The $10^{th}$ aspect of the present invention is a recording medium carrying a program according to the $9^{th}$ aspect of the present invention which can be processed by a computer.

In accordance with the present invention, the interior of the fuel cell is exposed to an atmosphere of moistened raw material gas at a proper time, making it possible to properly cope with problems of acceleration of drying of electrolyte membrane and local reaction, etc. and hence attain the stabilization of performance of the fuel cell.

(Description of Reference Numerals and Signs)

Figure 1:
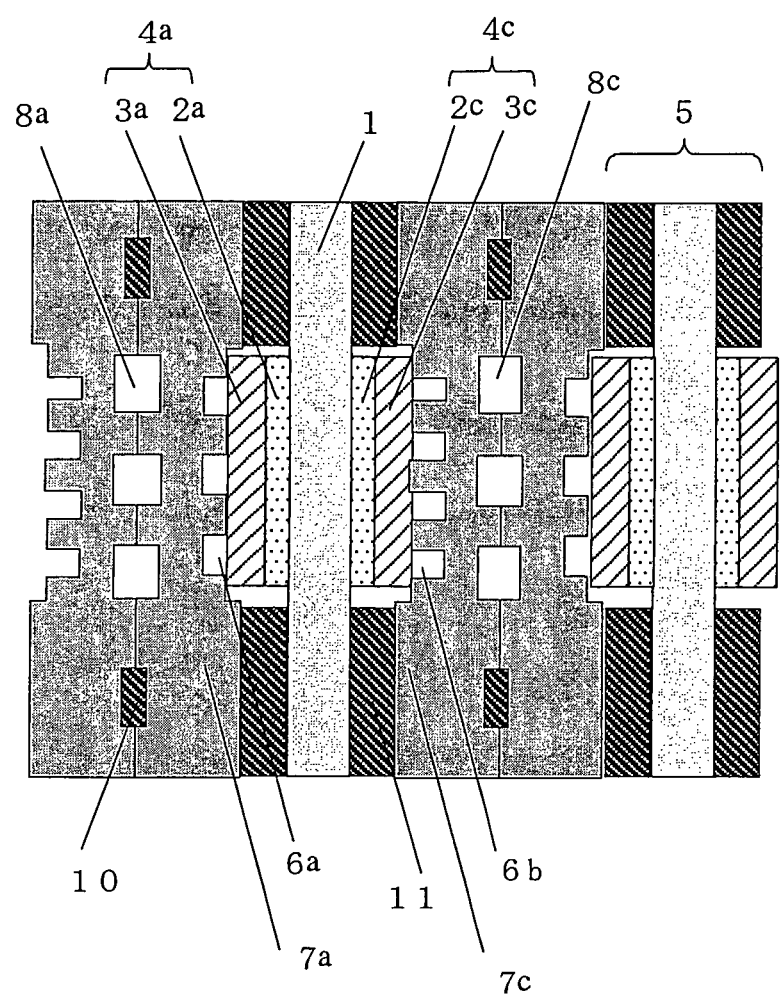
FIG. 1 depicts the structure of a part of a single unit of a polymer electrolyte type fuel cell according to Embodiments 1 to 3 of implementation of the present invention and conventional examples.

| | |
|---|---|
| 1 | Electrolyte |
| 2a | Catalytic reaction layer (anode side) |
| 2c | Catalytic reaction layer (cathode side) |
| 3a | Diffusion layer (anode side) |
| 3c | Diffusion layer (cathode side) |
| 4a | Electrode (anode side) |
| 4c | Electrode (cathode side) |

(Description of Reference Numerals and Signs) -continued

| | |
|---|---|
| 7a | Separator (anode side) |
| 7c | Separator (cathode side) |
| 32 | Purifying portion |
| 35 | Fuel generator |
| 41 | Humidifier |
| 43 | Electric power circuit portion |
| 44 | Control portion |
| 52 | Voltage measuring portion |
| 34, 49, 51, 57, 58 | On-off valve |
| 59, 60 | Pressure measuring portion |
| 81 | Fuel cell |
| 82 | Fuel generator |
| 83 | Water supplying unit |
| 84 | Combustor |
| 85 | Blower |
| 86 | Purging air supplying unit |
| 87 | Bypass pipe |
| 88 | Flow path switching unit |
| 89 | On-off valve |
| 810 | Raw material cathode supplying unit |
| 811 | Cathode closing unit |
| 812 | Anode closing unit |
| 111 | Electrolyte membrane |
| 112a | Anode catalytic reaction layer |
| 112c | Cathode catalytic reaction layer |
| 113a | Anode gas diffusion layer |
| 113c | Cathode gas diffusion layer |
| 114a | Anode |
| 114c | Cathode |
| 115a | MEA gasket on anode side |
| 115c | MEA gasket on cathode side |
| 116a | Electrically-conductive separator plate for anode |
| 116c | Electrically-conductive separator plate for cathode |
| 117 | MEA |
| 118a | Fuel gas flow path |
| 118c | Oxidizing agent gas flow path |
| 119a | Groove formed on electrically-conductive separator plate 116a |
| 119c | Groove formed on electrically-conductive separator plate 116c |
| 120 | Fuel cell unit |
| 121 | Fuel cell |
| 122 | Raw material gas supplying unit |
| 122p | Gas purifying portion |
| 123 | Fuel generator |
| 123e | Reformer |
| 123f | Shifter |
| 123g | CO purifying portion |
| 124 | Humidifier |
| 125 | Circuit portion |
| 126 | Measuring portion |
| 127 | Control portion |
| 128 | Blower |
| 129 | First switch valve |
| 130 | First cut-off valve |
| 131 | Second cut-off valve |
| 132 | Third cut-off valve |
| 133 | Water purifying portion |
| 134 | Total heat-exchange humidifier |
| 135 | Hot water humidifier |
| 141 | First check valve |
| 142 | Second switch valve |
| 143 | Third switch valve |
| 144 | Fourth switch valve |
| 145 | First circulating pipe |
| 146 | Second circulating pipe |
| 147 | Anode exhaust gas pipe |
| 148 | Second check valve |
| 151 | Raw material gas branched pipe |
| 152 | Fifth switch valve |
| 153 | Second connecting pipe |
| 154 | Sixth switch valve |
| 155 | Shunt valve |
| 160 | Cathode exhaust gas pipe |
| 161 | Fuel gas feed pipe |
| 162 | Oxidizing agent gas feed pipe |
| 163 | Raw material gas feed pipe |
| 164 | First connecting pipe |

-continued (Description of Reference Numerals and Signs)

| | |
|---|---|
| 170a | Anode mass flow meter |
| 170c | Cathode mass flow meter |
| 171 | Temperature detecting unit |
| 172a | Anode output terminal |
| 172c | Cathode output terminal |
| 173 | Impedance measuring device |
| 174 | First water supplying unit |
| 175 | Second water supplying unit |
| 201 | Fuel cell stack |
| 202 | Oxidizing agent gas controlling device |
| 203 | Fuel generator |
| 203b | Bypass |
| 204 | Voltage detecting device |
| 205 | Control portion |
| 206 | Electric power circuit portion |
| 2071-2079 | Electromagnetic valve |
| 208 | Gas purifying portion |
| 209 | Total heat-exchange humidifier |
| 2010 | Hot water type humidifier |
| 2011 | High frequency resistance meter |
| 2012 | Fuel gas feed pipe |
| 2012a | Connecting pipe |
| 2013 | Oxidizing agent gas feed pipe |
| 2021 | Hydrogen ionically-conductive polymer electrolyte membrane |
| 2022a, 22b | Catalyst layer |
| 2023a, 23b | Gas diffusion layer |
| 2024a | Anode |
| 2024b | Cathode |
| 2025 | Gasket |
| 2026a | Anode side separator plate |
| 2026b | Cathode side separator plate |
| 2027 | Membrane-electrode assembly |
| 2028a, 28b | Gas flow path |
| 2029 | Cooling water flow path |
| 2030 | Sealing portion |
| 301 | Electrolyte membrane |
| 302a, 302c | Catalytic reaction layer |
| 303a, 303c | Diffusion layer |
| 307a, 307c | Separator |
| 3021 | Collector plate |
| 3022 | Insulating plate |
| 3031 | Outer case |
| 3032 | Purifying portion |
| 3034 | Fuel generator |
| 3036 | Fuel cell stack |
| 3040 | Humidifier |
| 3044 | Electric power circuit portion |
| 3045 | Control portion |
| 3050, 3051 | Oxygen concentration detector |
| 3052 | Voltage detector |

BEST MODE FOR CARRYING OUT THE INVENTION

Embodiments of implementation of the present invention will be described hereinafter in connection with the drawings.

Embodiment 1

FIG. 1 depicts the basic configuration of a polymer electrolyte type fuel cell as an example of the fuel cell according to Embodiment 1 of implementation of the present invention. A fuel cell is an apparatus to cause a fuel gas containing at least hydrogen and an oxidizing agent gas containing oxygen such as air to react with each other electrochemically, thereby generating electricity and heat at the same time. As an electrolyte 1 there may be used, e.g., a polymer electrolyte membrane which selectively transports hydrogen ion. On the both surfaces of the electrolyte 1 is disposed a catalytic reaction layer 2 comprising as a main component a carbon powder having a platinum-based metal catalyst supported thereon.

Reactions represented by (chemical formula 1) and (chemical formula 2) occur on the catalytic reaction layers 2a and 2c. The fuel gas containing at least hydrogen undergoes reaction represented by (formula 1) (hereinafter referred to as "anode reaction") and the hydrogen ion which has moved through the electrolyte 1 undergoes reaction represented by (formula 2) with the oxidizing agent gas on the catalytic reaction layer 2 (hereinafter referred to as "cathode reaction") to produce water, thereby generating electricity and heat. The side on which the fuel gas such as hydrogen takes part in the reaction is called anode and is given a sign a in the drawings and the side on which the oxidizing agent gas such as air takes part in the reaction is called cathode and is given a sign c in the drawings. Further, diffusion layers 3a and 3c having both gas permeability and electrical conductivity are disposed in close contact with the outer surface of the catalytic reaction layers 2a and 2c, respectively. The diffusion layer 3a and the catalytic reaction layer 2a form an electrode 4a and the diffusion layer 3c and the catalytic reaction layer 2c form an electrode 4c. The membrane-electrode assembly (hereinafter referred to as "MEA") 5 is formed by the electrodes 4a and 4c and the electrolyte 1. A pair of electrically-conductive separators 7a and 7c which mechanically fix MEA 5 and electrically connect adjacent MEAs in serial, and have gas flow paths 6a and 6c formed on the surfaces thereof in contact with MEA 5 for supplying the reactive gas into the electrodes and carrying the gas produced by the reaction or extra gas away is provided. The electrolyte 1, the pair of catalytic reaction layers 2a and 2c, the pair of diffusion layers 3a and 3c, the pair of electrodes 4a and 4c and the pair of separators 7a and 7c form a basic fuel cell (hereinafter referred to as "cell"). The separators 7a and 7c have the separator 7c and 7a of the adjacent cell disposed in contact therewith, respectively, on the surface thereof opposite MEA 5. The separators 7a and 7c have a cooling water flow path 8 provided on the side thereof in contact with each other through which cooling water 9 flows. The cooling water 9 moves heat such that the temperature of MEA 5 is adjusted through the separators 7a and 7c. MEA 5 and the separator 7a or 7c are sealed to each other with an MEA gasket 10 and the separators 7a and 7c are sealed to each other with a separator gasket 11.

The electrolyte 1 has a fixed charge and as a counter ion for the fixed charge there is present hydrogen ion. The electrolyte 1 is required to be selectively permeable to hydrogen ion, and, to this end, it is necessary that the electrolyte 1 have water content retained therein. This is because when the electrolyte 1 contains water content, the fixed charge fixed in the electrolyte 1 is ionized, causing hydrogen which is a counter ion for the fixed charge to be ionized and movable.

Figure 2:
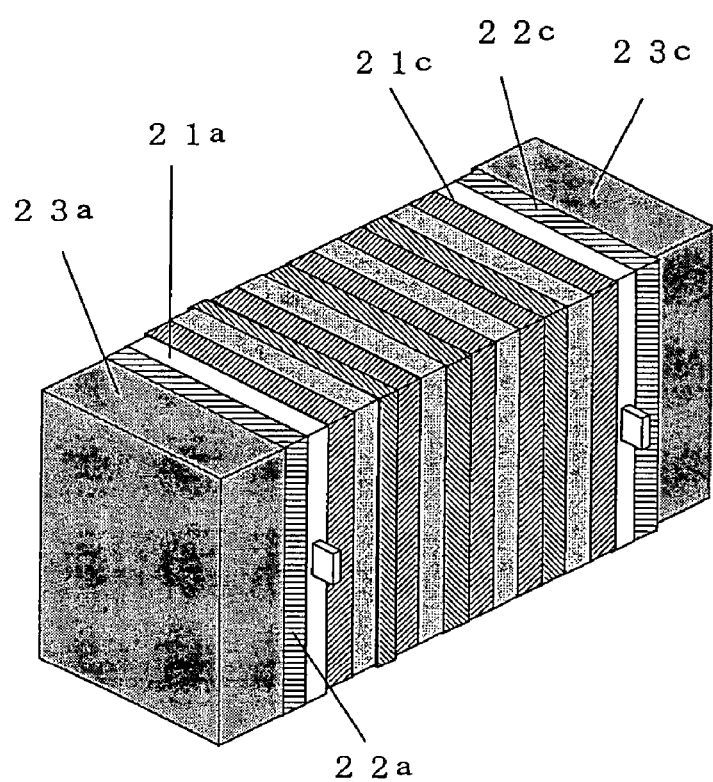
FIG. 2 depicts the structure of a stack obtained by laminating polymer electrolyte type fuel cells according to Embodiments 1 to 3 of implementation of the present invention and conventional examples.

FIG. 2 depicts a laminate of cells called stack. Since the voltage of a fuel cell unit is normally as low as about 0.75 v, a plurality of cell units are laminated in series with each other to give a high voltage. Current is taken out of the stack from a pair of collector plates 21, the cell and the exterior are electrically insulated from each other by a pair of insulating plates 22, and the stack having cell units laminated on each other is fastened and mechanically retained by a pair of end plates 23.

Figure 3:
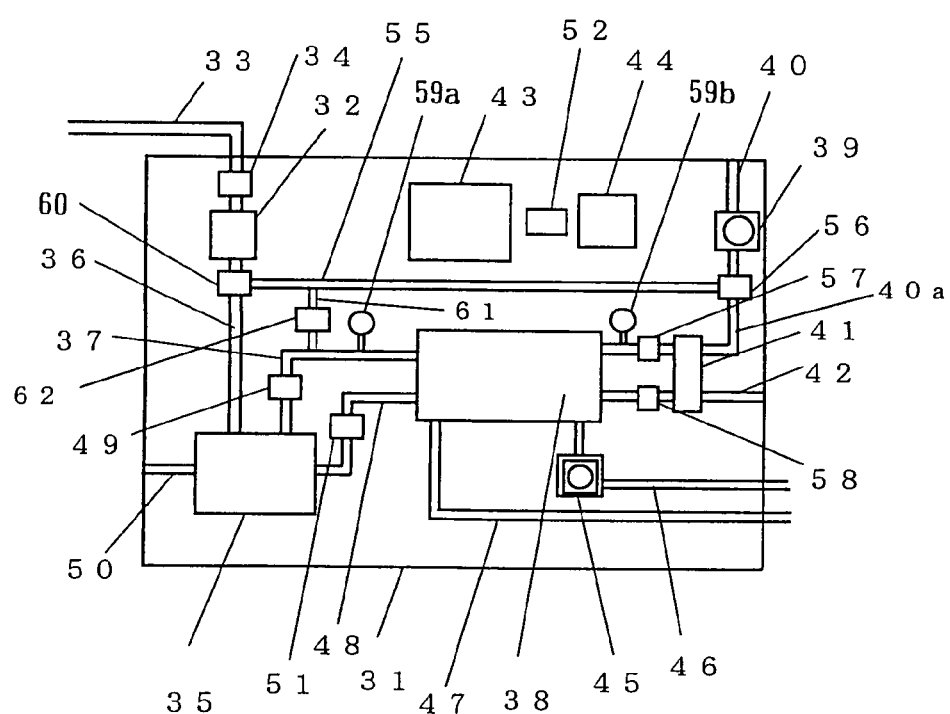
FIG. 3 is a configurational diagram illustrating a polymer electrolyte type fuel cell system according to Embodiments 1 to 3 of implementation of the present invention.

FIG. 3 is a configurational diagram of a fuel cell system according to an embodiment of implementation of the present invention. The fuel cell system is received in an outer case 31. A raw material gas which has been taken in from the exterior through a raw material gas pipe 33 is purified in a gas purifying portion 32 which removes materials adversely affecting the fuel cell, and then introduced into a fuel generator 35 through a purified gas pipe 36. In the route of the raw material gas pipe 33 is provided an on-off valve 34 by which the flow of the raw material gas is controlled. The fuel generator 35 generates a fuel gas containing at least hydrogen from the raw material gas. The reference numeral 38 indicates a stack which comprises a fuel cell and a stack the details of which are shown in FIG. 1 and FIG. 2. The fuel gas is introduced from the fuel generator 35 to the stack 38 on the anode side thereof through a fuel gas pipe 37.

Air as an oxidizing agent gas is introduced from the exterior to the stack on the cathode side thereof through a suction pipe 40 and an oxidizing agent gas pipe 40a connected to the suction pipe 40 via a dispensing valve 56 by a blower 39. The oxidizing agent gas which has not been used in the stack 38 is then discharged out of the fuel cell system through an exhaust gas pipe 42. Since a fuel cell needs water content, the oxidizing agent gas which is to flow into the stack 38 is moistened by a humidifier 41. The fuel gas which has not been used in the stack 38 is then again allowed to flow into the fuel generator 35 through an off-gas pipe 48. The gas from the off-gas pipe 48 is used in combustion or the like and used in an endothermic reaction for the production of fuel gas from raw material gas. The purified gas pipe 36 has a dispensing valve 60 provided thereon and the suction pipe 40, too, has a dispensing valve 56 provided thereon. The dispensing valve 60 and the dispensing valve 56 are connected to a bypass pipe 55. Further, between the bypass pipe 55 and the stack 38 and the dispensing valve 60 of the fuel gas pipe is provided a bypass pipe 61 having an on-off valve 62 provided thereon. The dispensing valve 60 adjusts the amount of raw material gas purified in the gas purifying portion 32 to be sent to the fuel generator 35 and the amount of gas to be sent to the bypass pipe 55 and the dispensing valve 56 can mix the oxidizing agent gas sent by the blower 39 and the purified raw material gas sent through the bypass pipe 55 at an arbitrary ratio and then send it to the stack 38. On the fuel gas pipe 37 is provided an on-off valve 49 which cuts the flow of gas or controls the flow rate of gas in the fuel gas feed path of the stack 38. The off-gas pipe 48 has an on-off valve 54 provided thereon which cuts the flow of gas in the fuel gas discharge path of the stack 38. An on-off valve 57 is provided on the oxidizing agent gas feed path from the humidifier 41 to the stack 38 to cut the flow of gas or control the flow rate of gas in the oxidizing agent gas feed path of the stack 38. An on-off valve 58 is provided on the oxidizing agent gas discharge path from the stack 38 to cut the flow of gas or control the flow rate of gas in the oxidizing agent gas discharge path of the stack 38. In the fuel gas feed path between the on-off valve 49 and the stack 38 is provide a pressure gauge 59a which measures the pressure in the fuel gas feed pipe and the fuel gas flow path in the stack 38. In the oxidizing agent gas feed path between the on-off valve 57 and the stack 38 is provided a pressure gauge 59b which measures the pressure in the oxidizing agent gas feed pipe and the oxidizing agent gas flow path in the stack 38. The voltage of the fuel cell stack 38 is measured by a voltage measuring portion 52, the electric power of the fuel cell stack 38 is taken out by an electric power circuit portion 43 and the valves provided in various pipes for raw material gas, fuel gas, oxidizing agent gas, off-gas and cooling water, various on-off valves, electric power circuit portions, etc. are controlled by a control portion 44. A pump 45 causes water to flow from a cooling water inlet pipe 46 to water flow path in the fuel cell stack 38 and water which has flown through the fuel cell stack 38 is then carried to the exterior through a cooling water outlet pipe 47. It is arranged that when water flows through the stack 38 of the fuel cell the heated stack 38 is cooled and kept at a constant temperature, and the heat obtained from the stack 38 can be used outside the fuel cell system.

The fuel cell system is formed by the stack 38 composed of fuel cells, the gas purifying portion 32, the fuel generator 35, the electric power circuit portion 43 and the control portion 44. The basic operation of the fuel cell system having the aforementioned configuration will be described. In FIG. 3, when the valve 34 is opened, the raw material gas flows into the gas purifying portion 32 through the raw material gas pipe 33. As the raw material gas there may be used a hydrocarbon-based gas such as natural gas and propane gas, but in the present embodiment, a city gas 13A which is a mixture of methane, ethane, propane and butane gas was used. As the gas purifying portion 32 there is used a member of removing a gas odorizer such as TBM (tertiary butyl mercaptane), DMS (dimethyl sulfide) and THT (tetrahydrothiophine) in particular. This is because a sulfur compound such as odorizer is adsorbed to the catalyst of the fuel cell to act as a catalyst poison that inhibits the reaction. The fuel generator 35 undergoes reaction represented by (chemical formula 9) or the like to produce hydrogen. Carbonmonoxide produced at the same time undergoes shifting reaction represented by (chemical formula 10) and carbon monoxide selective oxidation reaction represented by (chemical formula 11) so that it is removed to a concentration of 10 ppm or less.

$$CH_4 + H_2O \rightarrow 3H_2 + CO \quad (-203.0 \text{ KJ/mol}) \quad \text{(chemical formula 9)}$$

$$CO + nH_2O \rightarrow kCO_2 + (n-k)CO \quad \text{(chemical formula 10)}$$

$$CO + O_2 \rightarrow CO_2 \quad \text{(chemical formula 11)}$$

When water is introduced into the system in an amount of not smaller than the minimum value required for reaction, a fuel gas containing hydrogen and water content is then produced and then flows into the stack 38 of the fuel cell through the fuel gas pipe 37. The oxidizing agent gas is allowed to pass through the humidifier 41 by the blower 39, and then flows into the stack 38. The waste oxidizing agent gas is discharged out of the system through the exhaust gas pipe 42. As the humidifier 41 there may be used one allowing the flow of oxidizing agent gas through hot water or one allowing water to be blown into an oxidizing agent gas, but, in the present embodiment, a total heat-exchange type humidifier was used. This is adapted to cause water and heat in the exhaust gas to move to the oxidizing agent gas which has been sent from the suction pipe 40 as a raw material during the passage through the humidifier 41. The cooling water is allowed by the pump 45 to flow into the water flow path of the fuel cell stack 38 through the cooling water inlet pipe 46, and then carried out of the system through the cooling water outlet pipe 47.

Though not shown in the present figure, the cooling water inlet pipe 46 and the cooling water outlet pipe 47 normally have devices connected thereto which accumulate or utilize heat such as hot water dispenser. The heat generated by the stack 38 of the fuel cell can be taken and utilized for the supply of hot water. For the electricity generation in the stack 38, voltage is measured by the voltage measuring portion 52, and when the control portion 44 judges that sufficient electricity generation is being conducted, the electric power circuit portion 43 takes electric power out of the system. The electric power circuit portion 43 converts dc electric power taken out of the stack 38 to ac electric power which is then supplied into electric power line used in houses, etc. through a so-called grid connection.

The operation of the fuel cell in the stack 38 will be described in connection with FIG. 1. An oxygen-containing gas such as air flows through the gas flow path 6C and a fuel gas containing hydrogen flows through the gas flow path 6a. The hydrogen in the fuel gas diffuses through the diffusion layer 3a until it reaches the catalytic reaction layer 2a. In the catalytic reaction layer 2a, hydrogen decomposes to hydrogen ion and electron. The electron moves toward the cathode side through an external circuit. The hydrogen ion passes through the electrolyte 1 toward the cathode side until it reaches the catalytic reaction layer 2C. The oxygen in the oxidizing agent gas such as air diffuses in the diffusion layer 3C until it reaches the catalytic reaction layer 2C. In the catalytic reaction layer 2C, oxygen and electron react with each other to produce oxygen ion which then reacts with hydrogen ion to produce water. In other words, the oxygen-containing gas and the fuel gas react with each other around MEA 5 to produce water and cause electron to flow. Further, heat is generated during the reaction to raise the temperature of MEA 5. Therefore, water or the like is allowed to flow through the cooling water flow paths 8a, 8c to carry the heat generated by the reaction out of the system therewith. In other words, heat and current (electricity) are generated. It is herein important to control the humidity of the gas to be introduced and the amount of water produced by the reaction. When the water content is too small, the electrolyte 1 is dried to reduce the ionization of fixed charge and hence the movement of hydrogen, causing the reduction of the generation of heat and electricity. On the contrary, when the water content is too great, water is accumulated around MEA 5 or the catalytic reaction layers 2a, 2c to inhibit the supply of gas and hence the reaction, causing the reduction of the generation of heat and electricity. (This condition will be hereinafter referred to as "flatting".)

The operation after the reaction in the fuel cell unit will be described in connection with FIG. 3. The exhaust gas as an oxidizing agent gas which has not been used in the stack 38 is allowed to move its heat and water content to the oxidizing agent gas which has been sent from the blower 39 via the humidifier 41, and then discharged out of the system. The off-gas as a fuel gas which has not been used in the stack 38 is then allowed to again flow into the fuel generator 35 through the off-gas pipe 48. The gas from the off-gas pipe 48 is used for combustion or the like in the fuel generator 35. Since the reaction for the production of a fuel gas from a raw material gas is an endothermic reaction as shown in (chemical formula 6), it is used as a heat required for the reaction. The electric power circuit 43 acts to take out dc electric power from the stack 38 after the starting of electricity generation of the fuel cell. The control portion 44 is adapted to control to keep the control over other parts of the fuel cell system optimum. In the case where it is desired to suspend the operation of the fuel cell, the dispensing valve 56 and the dispensing valve 60 are operated to cause the raw material gas which has been purified in the gas purifying portion 32 to flow into the stack 38.

In the present embodiment, MEA 5 was prepared in FIG. 1 in the following manner. In some detail, an acetylene black (Denka Black, produced by DENKI KAGAKU KOGYO KABUSHIKI KAISHA; particle diameter: 35 nm) as a carbon powder was mixed with an aqueous dispersion (D1, produced by DAIKIN INDUSTRIES, Ltd.) of a polytetrafluoroethylene (PTFE) to prepare a water-repellent ink containing PTFE in a dried amount of 20% by weight. This ink was spread over a carbon paper (TGPH060H, produced by Toray Industries, Inc.) as a substrate of gas diffusion layer so that the carbon paper was impregnated therewith, and then subjected to heat treatment at 300° C. using a hot air drier to form a gas diffusion layer (about 200 µm) Separately, 66 parts by weight of a catalyst material (Pt content is 50% by weight) obtained by allowing a Pt catalyst to be supported on Ketjen Black (Ketjen Black EC, produced by Ketjen Black International Co., Ltd.; particle diameter: 30 nm) which is a carbon powder and 33 parts by weight (as calculated in terms of dried amount of polymer) of a perfluoro carbonsulfonic acid ionomer (5 wt-% Nafion dispersion produced by Aldrich Inc. of USA) as a hydrogen ionically-conductive material and a binder were mixed, and the mixture thus obtained was then molded to form a catalyst layer (10 to 20 µm).

The gas diffusion layer and the catalyst layer thus obtained were then bonded to the respective surface of a polymer electrolyte membrane (Nafion 112 membrane, produced by Du Pont Inc. of USA) to prepare MEA 5.

Subsequently, to the outer periphery of the electrolyte 1 of MEA 5 thus prepared was bonded a rubber gasket plate in which manifold holes for the passage of cooling water, fuel gas and oxidizing agent gas were then formed.

Separately, an electrically-conductive separator 7 made of a graphite plate impregnated with a phenolic resin having an external size of 20 cm×32 cm×1.3 mm and a gas flow path and a cooling water flow path with a depth of 0.5 mm was used.

Figure 4:
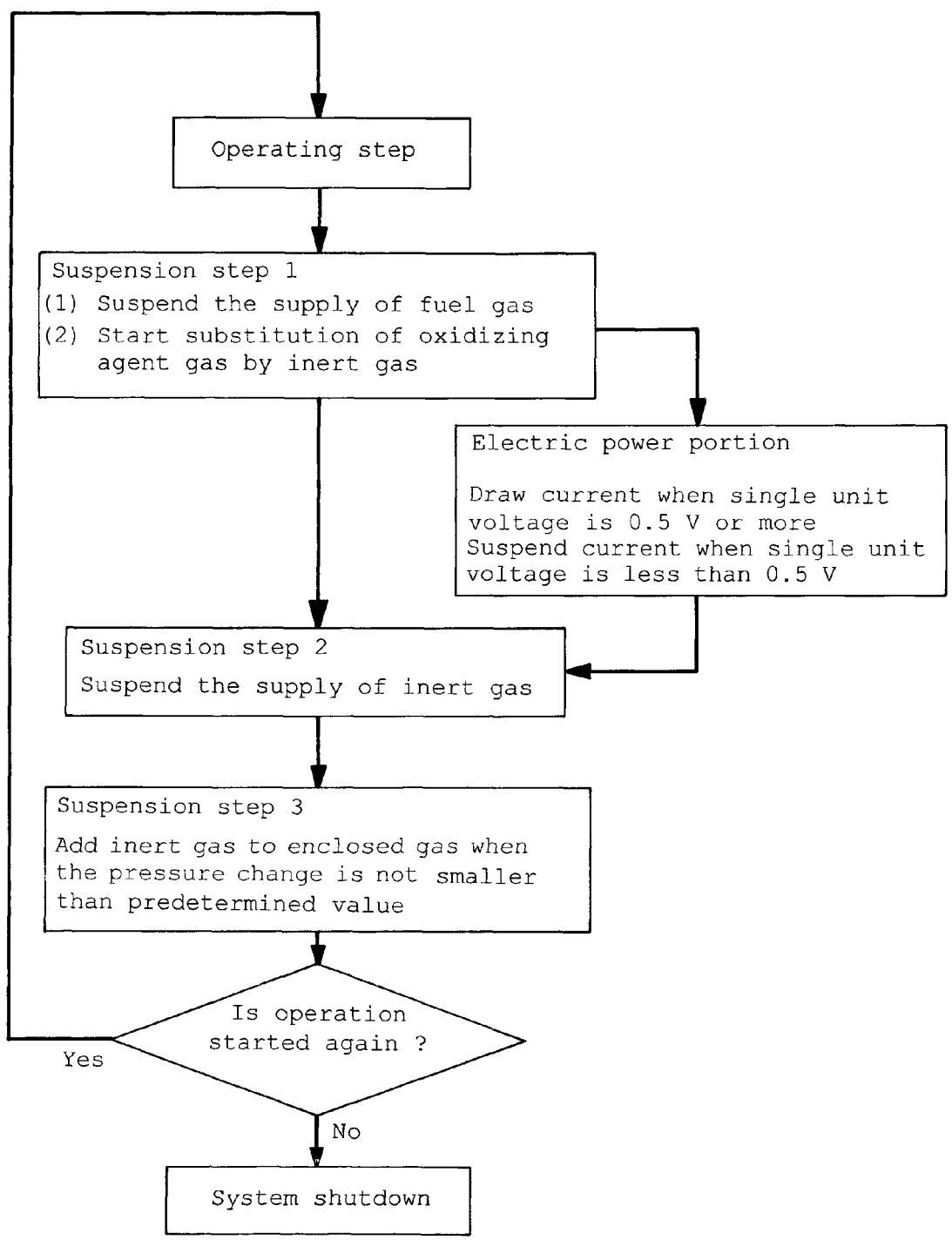
FIG. 4 is a diagram illustrating a flow chart of explaining the operation of the polymer electrolyte type fuel cell system according to Embodiment 1 of implementation of the present invention.

The operation of the fuel cell system according to the present embodiment having the aforementioned configuration will be described below, and an embodiment of the method of suspending the operation of the fuel cell system of the present invention will be thus described in connection with the flow chart shown in FIG. 4. In the present embodiment, as an inert gas there was used a raw material gas purified in the gas purifying portion 32. Since the main component of the raw material gas is methane gas, which is little reactive for the polymer electrolyte type fuel cell used in the present embodiment, the raw material gas can be used as an inert gas.

Firstly, an "operating step" at which electricity generation and heat generation are conducted in the fuel cell system of FIG. 3 was executed. At the "operating step", as the raw material gas there was used 13A gas which is a city gas and as the oxidizing agent gas there was used air. The conditions were such that the temperature of the fuel cell stack 38 is 70° C., the percent utilization of fuel gas (Uf) is 70% and the percent utilization of oxygen (Uo) is 40%. The fuel gas and air were moistened such that they have a dew point of 65° C. and 70° C., respectively, and a current having a certain voltage was then taken out of the electric power circuit portion 43 as an electric power. The current was adjusted such that a current density of 0.2 A/cm$^2$ is given per apparent area of electrode. The cooling water inlet pipe 46 and the cooling water outlet pipe 47 were each provided with a hot water storage tank, though not shown, and the pump 45 was adjusted such that the temperature of water in the cooling water inlet pipe 46 is 70° C. and the temperature of water in the cooling water outlet pipe 47 is 75° C.

Other various conditions were as follows. The "operating step" was followed by a "suspension step 1".

At the "suspension step 1", the electricity generation of the stack 38 is firstly suspended. Thereafter, the on-off valve 49 is closed to suspend the supply of the fuel gas into the stack 38. Alternatively, the operation of the blower 39 is suspended at the same time with the suspension of the supply of the fuel gas into the stack. Adjustment is made such that the dispensing valve 60 causes all the purified fuel gas to flow into the bypass pipe 55 and the dispensing valve 57 causes the gas flowing into the stack 38 to be all composed of the gas from the bypass pipe 55. In this manner, the oxidizing agent gas is substituted by the raw material which is an inert gas.

Figure 7:
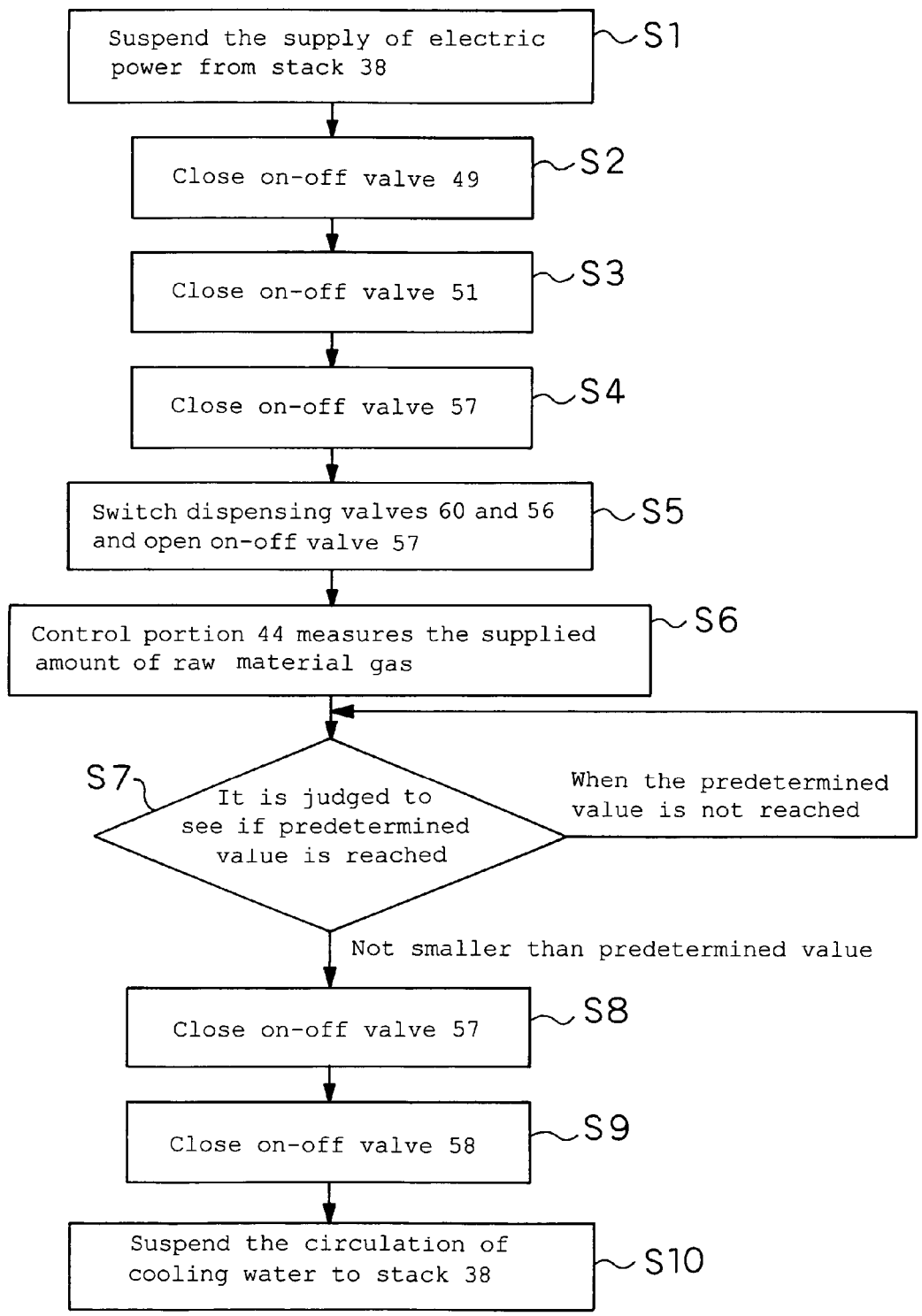
FIG. 7 is a diagram illustrating a flow chart of explaining the details of a step 1 of suspending the polymer electrolyte type fuel cell system according to Embodiment 1 of implementation of the present invention.

Next, a detailed flow chart of the "suspension step 1" will be shown in FIG. 7.

As shown in FIG. 7, control is made such that the electric power from the stack 38 is no longer supplied into an external load which is not shown (S1), and the on-off valve 49 is then closed such that the fuel gas is no longer supplied into the stack 38 (S2). After the closure of the on-off valve 49, the on-off valve 51 is then closed (S3). Subsequently, before the suspension of the blower 39, the on-off valve 57 is closed such that the oxidizing agent gas is no longer supplied into the stack 38 (S4).

Subsequently, the dispensing valves 60 and 56 are switched such that the raw material gas pipe 33 connects between the purified gas pipe 36 and the bypass pipe 55 and oxidizing agent gas pipe 40a, and the on-off valve 57 is then opened (S5). In this manner, the raw material gas which has passed through the gas purifying portion 32 is supplied into the stack 38 on the cathode side thereof so that the oxidizing agent gas in the stack 38 is purged with this raw material gas. Herein, the control portion 44 measures the amount of the raw material gas to be supplied (S6) and judges to see whether or not a predetermined value is reached or exceeded (S7). The supply of the raw material gas is continued until this value is reached, and when it is judged that this value is reached or exceeded, the on-off valve 57 is closed (S8), and the on-off valve 58 is then closed (S9). Subsequently, the pump 45 is suspended to suspend the circulation of cooling water through the stack 38 (S10).

In the aforementioned operation of S7, as the predetermined value, the supplied amount of the raw material gas to be substituted was twice to five times the volume to be substituted. This is determined by the following calculation.

Supposing that the volume to be substituted is V (L), the flow rate of gas to be substituted is v (L/min), the initial concentration of the desired component of the oxidizing agent gas is $c_o$ and the concentration after t (min) is c, the change dc of concentration in the volume V during a slight period of time dt is equal to the amount of the desired component to be extruded by the substituting gas during the slight period of time dt as shown by (calculation equation 1).

$$-Vdc = c \cdot v \cdot dt \quad \text{(calculation equation 1)}$$

The both sides of the equation are multiplied by −1. The both sides are then made logarithmic to give the following (calculation equation 2).

$$\int Vdc = -\int c \cdot v \cdot dt \quad \text{(calculation equation 2)}$$

The aforementioned equation is arranged to give (calculation equation 3) which is then integrated to give (calculation equation 4). Herein, x is an integral constant.

$$\int 1/c \, dc = -\int v/V \, dt \quad \text{(calculation equation 3)}$$

$$\log c = -(v/V) \cdot t + X \quad \text{(calculation equation 4)}$$

The (calculation equation 4) can be also expressed by the following (calculation equation 5).

$$c = \exp[-(v/V) \cdot t] \cdot \exp X \quad \text{(calculation equation 5)}$$

Since when t is 0, c is $c_o$, c is substituted in the (calculation equation 5) to give (calculation equation 6).

$$c_0 = \exp X \quad \text{(calculation equation 7)}$$

Therefore, the (calculation equation 6) is substituted in the (calculation equation 5) to give the following (calculation equation 7).

$$c = c_0 \exp(-v \cdot t/V) \quad \text{(calculation equation 8)}$$

In the (calculation equation 7), $v \cdot t/V$ represents the time of the volume of the substituting gas accounting for the volume to be substituted. It is demonstrated that when this value is 2, 86% or more of the volume is substituted, and when this value is 5, 99.3% or more of the volume is substituted. This is because when the volume of the substituting gas is twice or less the volume to be substituted, the remaining amount of the oxidizing agent gas is too great, and when the volume of the substituting gas is five times or more the volume to be substituted, the substituting gas is wasted.

At the "suspension step 1", since the supply of the fuel gas is suspended before or at the same time with the suspension of the supply of the oxidizing agent gas, the efficiency of electricity generation per fuel energy can be further enhanced without wasting the fuel gas.

After the termination of the aforementioned "suspension step 1", the process moves to a "suspension step 2". In some detail, the valve 34 is closed to suspend the supply of the raw material gas. The withdrawal of current from the stack 38 may be effected at the same time with the suspension of the blower 39 at the "suspension step 1", but the electric power circuit portion 43 may control it based on a predetermined voltage.

In the present embodiment, control was made such that when the voltage per single unit of stack 38 is 0.5 V or more, current is drawn at the electric power circuit portion 43, and when the voltage per single unit of stack 38 is less than 0.5 V, current is not drawn. When suspension remains at the "suspension step 2", the catalytic reaction layer 2a is filled with a gas containing hydrogen, giving a potential of 0 V (with respect to hydrogen electrode). The catalytic reaction layer 2c is filled with the raw material gas as an inert gas, but the hydrogen is diffused, thereby giving a potential of 0 V (with respect to hydrogen electrode). Accordingly, suspension can be made without putting both the electrodes at a high potential causing oxidation or dissolution, making it possible to eliminate deterioration and maintain desired performance over an extended period of time.

The process then moves to a "suspension step 3". In some detail, the on-off valve 62, which has been closed between the aforementioned "operating step" and "suspension step 2", is opened, and the on-off valve 51 is opened and the dispensing valves 60 and 57 are switched to make connection to the bypass pipe 55 and the oxidizing agent gas pipe 40a side. In this manner, the raw material gas can be supplied into the stack 38 on the cathode side thereof and on the anode side thereof as well via the bypass pipe 61. Subsequently, the on-off valve 51 is again closed and the valve 34 is closed. In this manner, the raw material gas is enclosed in the entire interior of the stack 38.

At the "suspension step 3", the change of the pressure gauges 59a and 59b is monitored. Since the on-off valves 49, 51, 57 and 58 have been closed, the volume of the raw material gas enclosed in the stack is reduced when the moisture content in the gas enclosed makes dew condensation due to the drop of the temperature of the stack 38 or the like, making the interior of the stack 38 negative in pressure. When the pressure in the interior of the stack 38 is negative, it is likely not only that a gas such as air can easily enter the stack 38 but also that the electrolyte 1 or various gaskets can break. Therefore, when the value measured by the pressure gauges 59a and 59b shows a change of not smaller than a predetermined value, the valve 34 is then opened to add the raw material gas. In the present embodiment, it was arranged such that when the pressure shows a change of 5 KPa, the system is operated. When the pressure in the interior of the stack 38 is not more than the predetermined value, the on-off valve 34 is opened to enclose the raw material gas in the stack 38. When the raw material gas is added to the fuel gas, the hydrogen concentration decreases, but, since the intrusion of a gas showing a high potential such as oxygen can be excluded, making it possible to keep the potential of the electrodes 4a and 4c low. This can not only inhibit deterioration due to electrode oxidation or dissolution but also prevent the damage of the constituent materials of the stack 38 due to pressure change, making it possible to maintain high performance over an extended period of time.

While the foregoing description has been made with reference to the case where the pressure in the stack 38 is directly measured by the pressure gauges 59a and 59b, a unit of measuring the temperature in the stack 38 such as thermometer may be provided so that the measurements thus obtained are used to determine indirectly the internal pressure of the stack 38. In some detail, when the temperature T2 during measurement is lower than the temperature T1 after the completion of purge on the cathode side by a difference ΔT of about 5° C., it is judged that the pressure falls, and the on-off valve 34 is then opened to enclose the raw material gas again in the stack 38.

Finally, after continuance of the "suspension step 3" for a predetermined period of time, judgment is then made to see whether or not the operation should be resumed. In the case where the operation is resumed according to cycle of DSS operation, the process returns again to the "operating step", but in the case where the operation is not resumed for the reason of suspension of use over an extended period of time or like reasons, the main power supply of the system is cut.

In the present embodiment, as the inert gas there was used the raw material gas purified in the gas purifying portion 32. Since the raw material gas can be prepared without any special device, it is convenient, but even when an inert gas such as nitrogen gas is supplied from a nitrogen gas bomb or the like mounted on the system, the same effect can be exerted. Further, in the present embodiment, the humidifier 41 provided on the passage of the oxidizing agent gas and fuel gas was used to moisten the raw material gas as an inert gas. The provision of the humidifier 41 on the passage common to the oxidizing agent gas and the fuel gas makes it possible to moisten different gases by a single humidifier and give further effects. Further, the raw material gas as an inert gas was moistened. Even when supplied left unmoistened, the raw material gas gives little effect so far as the volume to be supplied is relatively small, but when the volume of the raw material gas to be supplied is great, the electrolyte 1 is dried to reduce the hydrogen permeability, and therefore, in the present embodiment, the raw material gas was moistened. Accordingly, when the volume of the raw material gas to be supplied is relatively small, moistening may be omitted.

Moreover, in the aforementioned configuration, as a configuration in which the bypass pipe 61 and the on-off valve 62 are omitted there may be embodied one in which the suspension step 3 is omitted or the suspension step 3 involves the enclosure of the raw material gas only on the cathode side.

Embodiment 2

Figure 5:
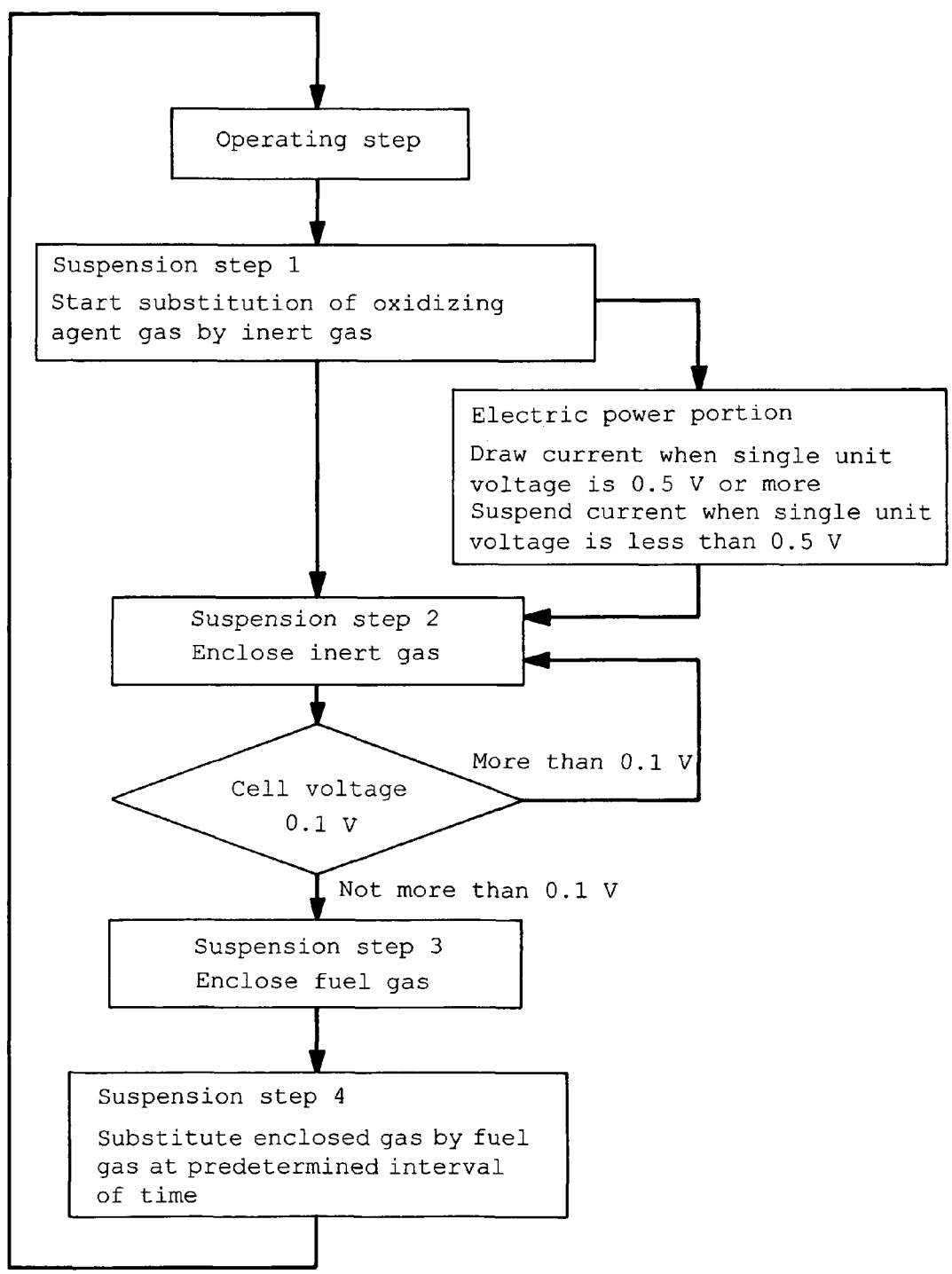
FIG. 5 is a diagram illustrating a flow chart of explaining the operation of the polymer electrolyte type fuel cell system according to Embodiment 2 of implementation of the present invention.

The operation of the fuel cell system according to Embodiment 2 of implementation of the present invention will be described below, and an embodiment of the method of suspending the fuel cell system of the present invention will be thus described in connection with the flow chart shown in FIG. 5. The basic configuration and operation of the present embodiment are the same as that of Embodiment 1. The operating method will be described in detail below. The "operating step" of the present embodiment is the same as that of Embodiment 1.

Subsequently, a "suspension step 1" was executed. At the "suspension step 1", the blower 39 is firstly suspended and adjustment is made such that the dispensing valve 60 causes the purified fuel gas to flow into both the bypass pipe 55 and the purified gas pipe 36 and the dispensing value is switched so that the gas flowing into the stack 38 is composed of only the gas from the bypass pipe 55.

In this manner, the oxidizing agent gas in the stack 38 can be substituted by the raw material gas as an inert gas while the fuel gas is being left flowing into the stack 38. After a predetermined period of time, the process moves to a "suspension step 2".

At the "suspension step 2", the on-off valves 57 and 58 are closed so that the raw material gas as an inert gas is enclosed in the interior of the stack 38. At the "suspension step 2", since the fuel gas is supplied, hydrogen, too, is supplied. Since the raw material gas is enclosed, the hydrogen, which is diffused via electrolyte 1 and moved from the fuel gas to the raw material side, resides in the vicinity of the catalytic reaction layer 2c. In this manner, it is assured that the potential of the electrode 4c can be lowered more quickly, making it possible to inhibit the deterioration of the electrode more certainly. The "suspension step 2" may be executed for a predetermined period of time, but in the present embodiment, the process moves to the "suspension step 3" after the drop of the voltage of the single unit of stack to 0.1 V or less. At the "suspension step 2" of the present embodiment, since the potential of the electrode 4a is always 0 V, the voltage of the cell is equal to the potential of the electrode 4c. This is because when the potential of the electrode 4c is 0.1 V, it is judged that the potential of the electrode 4c has been certainly reduced by the diffusing hydrogen, making it possible to utilize the fuel gas satisfactorily and hence raising the efficiency of electricity generation per energy.

At the subsequent "suspension step 3", the on-off valves 49 and 51 are closed to enclose the fuel gas in the stack 38. In the present embodiment, since the fuel gas and the raw material gas are enclosed in the stack 38 by the closure of the on-off valves 49 and 51, no gas incoming and outgoing occurs at the "suspension step 3", where no convection or the like occurs, making it possible to keep the potential of the electrodes 4a and 4c low. Accordingly, deterioration due to oxidation or dissolution occurs less often, making it possible to maintain desired performance over a longer period of time.

The process then moves to a "suspension step 4". By means of the on-off valves 49, 51, 57 and 58, in the stack 38 gas incoming and outgoing from and to the exterior due to convection does not occur, but a slight amount of oxygen diffuses from the exterior. Therefore, the raw material gas purified in the gas purifying portion 32 is allowed by the dispensing valve 60 to flow into both the bypass pipe 55 and the purified gas pipe 36. Herein, the on-off valves 57 and 58 are slightly opened to send the raw material gas which has passed through the bypass pipe 55 to the stack 38 to slightly replace the enclosed gas. The raw material gas which has passed through the purified gas pipe 36 is sent to the fuel generator 35, but the raw material gas can be passed through the fuel generator 35 as it is by selecting a predetermined period of time so as to establish a configuration or temperature such that no reaction occurs in the fuel generator 35. At this point, the on-off valves 49 and 51 are slightly opened to slightly replace the enclosed fuel gas by the raw material gas. In this manner, the concentration of gas such as oxygen which has externally entered by diffusion or the like during enclosure can be reduced to inhibit the rise of potential of the electrodes 4a and 4c for a long period of time and to inhibit deterioration of the electrodes 4a and 4c due to the oxidation or dissolution even during prolonged suspension and hence maintain desired performance over an extended period of time. Further, in the aforementioned configuration, the bypass pipe 61 and the on-off valve 62 may be omitted.

Embodiment 3

Figure 6:
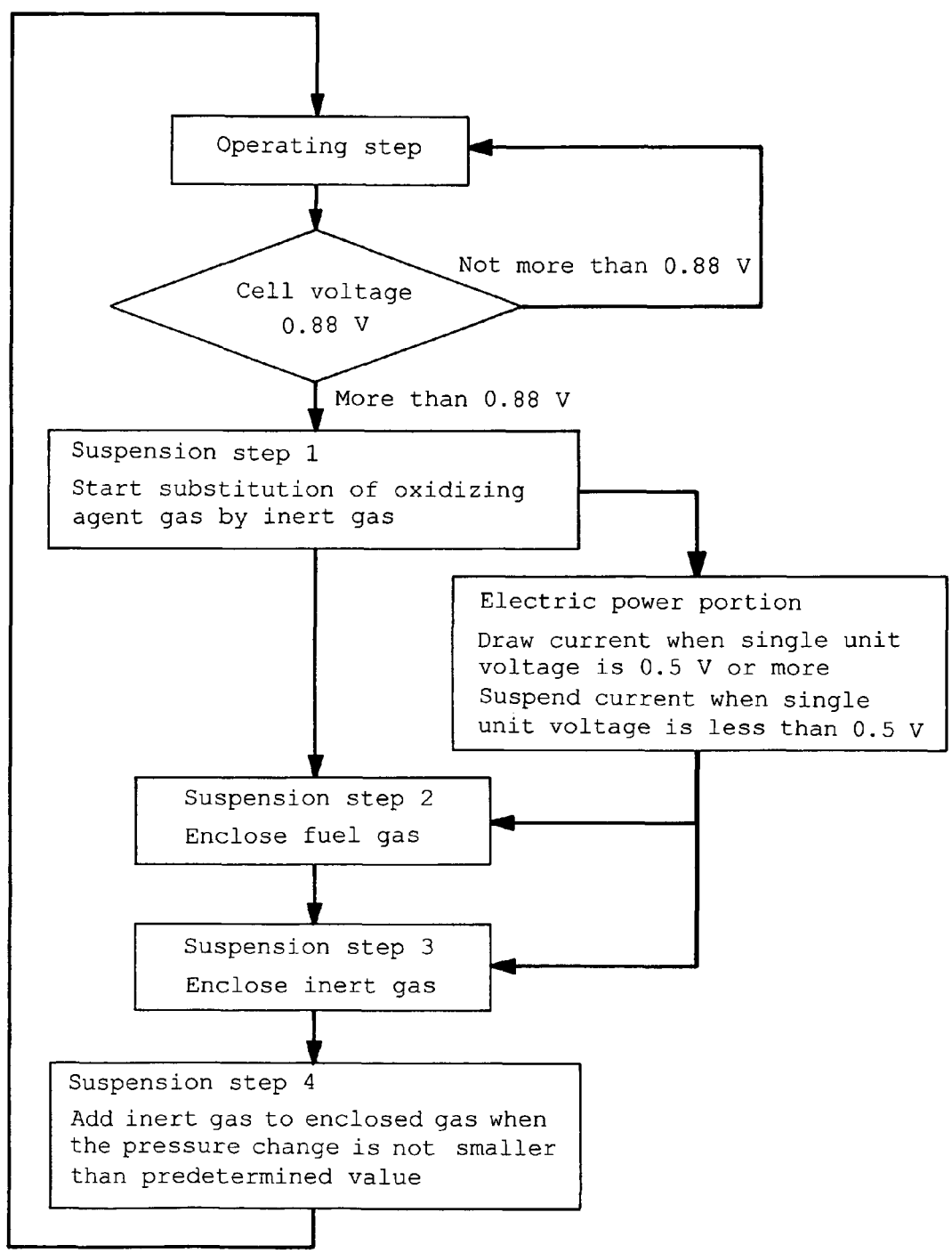
FIG. 6 is a diagram illustrating a flow chart of explaining the operation of the polymer electrolyte type fuel cell system according to Embodiment 3 of implementation of the present invention.

The operation of the fuel cell system according to Embodiment 3 will be described below, and an embodiment of the method of suspending the fuel cell system of the present invention will be thus described in connection with the flow chart shown in FIG. 6. The basic configuration and operation of Embodiment 3 are the same as that of Embodiment 1 or 2, but the configuration thereof is such that the bypass pipe 61 and the on-off valve 62 are omitted.

The operating method will be described in detail below. The basic conditions of "operating step" under which electricity generation and heat generation are conducted are the same as that of Embodiment 1. Herein, the current drawn from the stack 38 at the electric power circuit portion 43 is controlled by the control portion 44 according to the magnitude of consumption of electric power at houses, etc. When the electric power generated by the fuel cell system is no longer consumed, the current drawn from the stack 38 decreases, causing the rise of voltage. When the voltage exceeds the open circuit voltage of 0.88 V, the oxidation or dissolution of the electrode 4c occurs and the process then moves to the "suspension step 1". In other words, the operation under the conditions that the open circuit voltage of 0.88 V is exceeded can be eliminated, making it possible to maintain desired performance over an extended period of time.

The "suspension step 1" is similar to Embodiment 1, and the blower 39 is firstly suspended and adjustment is made such that the dispensing valve 60 causes the purified fuel gas to flow into both the bypass pipe 55 and the purified gas pipe 36 and the dispensing valve 57 causes the gas flowing into the stack 38 to be composed of only the gas from the bypass pipe 55. In this manner, the oxidizing agent gas in the stack 38 can be substituted by the raw material gas as an inert gas while the fuel gas is being left flowing into the stack 38.

After a predetermined period of time, the process moves to the "suspension step 2". At the "suspension step 2", the on-off valves 49 and 51 are closed to enclose the fuel gas in the stack 38 while the raw material gas being allowed to flow even after the completion of purge. In this manner, the use of the fuel gas can be minimized. The process then moves to the "suspension step 3". The on-off valves 57 and 58 are closed to enclose the raw material gas as an inert gas in the interior of the stack 38. In the stack 38, the hydrogen, which is diffused via electrolyte 1 and moved from the fuel gas to the raw material side, resides in the vicinity of the catalytic reaction layer 2c. In this manner, it is assured that the potential of the electrode 4c can be lowered more quickly, making it possible to inhibit the deterioration of the electrode certainly. Under the conditions of the "suspension step 3", no gas incoming and outgoing occurs due to convection or the like, making it possible to keep the potential of the electrodes 4a and 4c low. Accordingly, less deterioration due to oxidation or dissolution occurs, making it possible to maintain desired performance over an extended period of time. The process then moves to the "suspension step 4".

At the "suspension step 4", the change of the pressure gauges 59a and 59b is monitored. Since the on-off valves 49, 51, 57 and 58 have been closed, the volume of the raw material gas enclosed in the stack is reduced when the moisture content in the gas enclosed makes dew condensation due to the drop of the temperature of the stack 38 or the like, making the interior of the stack 38 negative in pressure. When the pressure in the interior of the stack 38 is negative, it is likely not only that a gas such as air can easily enter the stack 38 but also that the electrolyte 1 or various gaskets can break. Therefore, when the value measured by the pressure gauges 59a and 59b shows a change of not smaller than a predetermined value, the on-off valve 49 or 57 is then opened to add the raw material gas. In the present embodiment, it was arranged such that when the pressure shows a change of 5 KPa, the system is operated. The operation of allowing the raw material gas to flow into the stack 38 during suspension is the same as that of Embodiment 2. When the pressure in the interior of the stack 38 is not more than the predetermined value, the on-off valve 49 or 57 is opened to enclose the raw material gas in the stack 38. When the raw material gas is added to the fuel gas, the hydrogen concentration decreases, but, since the entrance of a gas showing a high potential such as oxygen can be excluded, making it possible to keep the potential of the electrodes 4a and 4c low. This can not only inhibit deterioration due to electrode oxidation or dissolution but also prevent the damage of the constituent materials of the stack 38 due to pressure change, making it possible to maintain high performance over an extended period of time.

While the foregoing description has been made with reference to the case where the pressure in the stack 38 is directly measured by the pressure gauges 59a and 59b, a unit of measuring the temperature in the stack 38 such as thermometer may be provided so that the measurements thus obtained are used to determine indirectly the internal pressure of the stack 38. In some detail, when the difference ΔT between temperature T1 after the completion of purge on the cathode side and temperature T2 during measurement shows the drop of about 5° C., it is judged that the pressure falls, and the on-off valve 49 or 57 is then opened to enclose the raw material gas again in the stack 38. In the aforementioned Embodiments 1 to 3, the stack 38 corresponds to the fuel cell of the present invention, the fuel gas pipe 37 corresponds to the fuel gas pipe of the present invention, the on-off valve 49 corresponds to the fuel gas on-off valve of the present invention, and they constitute the fuel gas supplying means of the present invention. Further, the oxidizing agent gas pipe 40a corresponds to the oxidizing agent gas pipe of the present invention, the on-off valve 57 corresponds to the oxidizing agent on-off valve of the present invention, and they constitute the oxidizing agent gas supplying means of the present invention. Moreover, the raw material gas pipe 33 and the bypass pipe 55 each correspond to the raw material gas pipe of the present invention, the dispensing valves 56, 60 each correspond to the raw material gas on-off valve of the present invention, and they correspond to the raw material gas supplying means of the present invention. Further, the control portion 44 corresponds to the controlling means of the present invention.

Further, the off-gas pipe 48 corresponds to the anode side exhaust pipe of the present invention, the on-off valve 51 corresponds to the anode side off-gas on-off valve of the present invention, the exhaust gas pipe 42 corresponds to the cathode side exhaust pipe of the present invention, and the on-off valve 58 corresponds to the anode side off-gas on-off valve of the present invention. Moreover, the bypass pipe 61 corresponds to the additional raw material gas pipe of the present invention and the on-off valve 62 corresponds to the additional raw material gas on-off valve of the present invention.

Further, the aforementioned Embodiments 1 to 3 may correspond also to the following embodiments of implementation of the present invention. In other words, the first invention concerns a fuel cell system comprising, a fuel cell provided with a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, wherein the fuel cell system is arranged such that the supply of the fuel gas and the oxidizing agent gas is suspended during the suspension of the fuel cell to replace the oxidizing agent gas in the interior of the fuel cell partly or entirely by a gas inert to the fuel cell, whereby there is little or no oxygen present in the interior of the fuel cell during suspension, putting the anode electrode at the hydrogen potential (about 0 V according to hydrogen electrode standard) and the cathode electrode, too, at the hydrogen potential due to the presence of hydrogen which has diffused from the anode and hence making it possible to keep both the electrodes low and inhibit the deterioration of performance due to suspension.

Further, the second invention concerns the fuel cell system of the first invention which is arranged such that there is provided a cut-off valve on the fuel gas and oxidizing agent gas feed and discharge paths so that during the suspension of the fuel cell, the supply of the fuel gas and the oxidizing agent gas is suspended to replace the oxidizing agent gas in the interior of the fuel cell partly or entirely by a gas inert to the fuel cell and the cut-off valve is closed to enclose the fuel gas and the gas inert to the fuel cell in the fuel cell, whereby the flow of gas between the interior of the fuel cell and the exterior is cut during the suspension of the fuel cell, making it possible to keep the potential of the electrode of the fuel cell low and hence inhibit the deterioration of performance due to suspension.

The third invention concerns the fuel, cell system of the first invention or second invention which is arranged such that there is provided a humidifier on the oxidizing agent gas and raw material gas passages so that moistened oxidizing agent gas and raw material gas can be supplied into the fuel cell, whereby when as the inert gas by which the oxidizing agent gas is partly or entirely replaced there is used a raw material gas from which components adversely affecting the fuel cell has been removed by the gas purifying portion, the moistened raw material gas is allowed to flow into the interior of the fuel cell, making it possible to prevent the polymer electrolyte membrane from being dried and hence inhibit the deterioration of performance due to the drying of the polymer electrolyte membrane occurring during suspension.

Further, the fourth invention concerns an operating method of a fuel cell provided with a fuel cell system comprising a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, wherein the operation of the fuel cell system is arranged such that during the suspension of the fuel cell, when the voltage of the fuel cell exceeds 0.88 V, the supply of the fuel gas and the oxidizing agent gas is suspended to replace the oxidizing agent gas in the interior of the fuel cell partly or entirely by a gas inert to the fuel cell, whereby it is assured that the potential of the various electrodes of the fuel cell can be always 0.88 V or less (according to hydrogen electrode standard), making it possible to prevent the oxidation or dissolution of catalyst such as Pt and hence maintain desired performance over an extended period of time.

Further, the fifth invention concerns a fuel cell system comprising a fuel cell provided with a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, wherein the operation of which is arranged such that during the suspension of the fuel cell, the supply of the fuel gas and the oxidizing agent gas is simultaneously suspended or the supply of the oxidizing agent gas is suspended after the suspension of the supply of the fuel gas to replace the oxidizing agent gas in the interior of the fuel cell partly or entirely by a gas inert to the fuel cell, whereby the anode electrode is filled with hydrogen and thus is put at a potential of about 0 V (according to hydrogen electrode standard) and the cathode electrode is put at a potential of about 0 V (according to hydrogen electrode standard) due to the presence of hydrogen which has diffused from the anode after the substitution by the inert gas even if the oxidizing agent gas is supplied by the reduction of pressure in the passage or the inertia of the blower, making it possible to inhibit the deterioration of performance even if suspension is made. Further, the amount of hydrogen which is not used in electricity generation can be minimized by suspending the supply of the fuel gas earlier than the supply of the oxidizing agent gas, making it possible to realize a fuel cell system having a higher electricity-generation efficiency per energy.

Further, the sixth invention concerns an operating method of a fuel cell provided with a fuel cell system comprising a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, wherein the operation of which is arranged such that during the suspension of the fuel cell, the supply of the fuel gas is suspended after the suspension of the supply of the oxidizing agent gas to replace the oxidizing agent gas in the interior of the fuel cell partly or entirely by a gas inert to the fuel cell, whereby hydrogen flows through the anode at least during the first stage of substitution of the oxidizing agent gas by the inert gas on the cathode, making it possible to keep the potential of the anode electrode at about 0 V (according to hydrogen electrode standard) without being subject to change even if oxygen diffuses from the cathode to the anode, and a sufficient amount of hydrogen flows through the cathode, making it possible to lower the potential of the cathode electrode to about 0 V (according to hydrogen electrode standard) rapidly and certainly and hence enhance the performance of the cathode electrode certainly and inhibit the deterioration of performance even if suspension is made.

Further, the seventh invention concerns an operating method of a fuel cell provided with a fuel cell system comprising a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, whereby the operation of which is arranged such that during the suspension of the fuel cell, the fuel gas is suspended in its supply and then enclosed in the interior of the fuel cell by the action of a cut-off valve and the oxidizing agent gas is suspended in its supply and then the oxidizing agent gas in the interior of the fuel cell is replaced partly or entirely by a gas inert to the fuel cell, followed by the enclosure of the inert gas by the action of a cut-off valve and then, after a predetermined period of time, the injection of the inert gas into the fuel gas-enclosed portion and the inert gas-enclosed portion, whereby even when the volume of the gas in the interior of the fuel cell is reduced due to dew condensation or shrinkage or reaction of remaining oxygen and hydrogen to make the internal pressure negative or make difference in pressure between the anode and the cathode during suspension, the negative internal pressure or the pressure difference between the anode and the cathode can be eliminated by injecting the inert gas into the fuel gas-enclosed portion or the inert gas-enclosed portion, making it possible to eliminate the application of stress to the polymer electrolyte membrane, etc. and hence inhibit the deterioration of performance even if suspension is made. Further, by opening the cut-off valve on the fuel gas or oxidizing agent gas discharge path during the injection of the inert gas, the enclosed gas can be replaced by the inert gas. Even when oxygen in the air gradually enters the fuel cell system through the gasket or separator material during the suspension of the fuel cell, the oxygen can be discharged out of the fuel cell.

Further, the eighth invention concerns an operating method of a fuel cell system comprising a fuel cell provided with a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, wherein the operation of which is arranged such that during the suspension of the fuel cell, the fuel gas is suspended in its supply and then enclosed in the interior of the fuel cell by the action of a cut-off valve and the oxidizing agent gas is suspended in its supply and then the oxidizing agent gas in the interior of the fuel cell is replaced partly or entirely by a gas inert to the fuel cell, and the inner gas is enclosed by the action of a cut-off value and when the internal pressure of the fuel cell shows a change of not smaller than a predetermined value, the inert gas is injected into the fuel gas-enclosed portion and the inert gas-enclosed portion or the cut-off valve is opened to make the internal space of the fuel cell open to the exterior, whereby even when the volume of the gas in the interior of the fuel cell is reduced due to dew condensation or shrinkage or reaction of remaining oxygen and hydrogen to make the internal pressure negative or make difference in pressure between the anode and the cathode during suspension, the negative internal pressure or the pressure difference between the anode and the cathode can be eliminated by injecting the inert gas into the fuel gas-enclosed portion or the inert gas-enclosed portion, making it possible to eliminate the application of stress to the polymer electrolyte membrane, etc. and hence inhibit the deterioration of performance even if suspension is made. Further, by opening the cut-off valve on the fuel gas or oxidizing agent gas discharge path during the injection of the inert gas, the enclosed gas can be replaced by the inert gas, and even when oxygen in the air gradually enters the fuel cell system through the gasket or separator material during the suspension of the fuel cell, the oxygen can be discharged out of the fuel cell.

Further, the ninth invention concerns an operating method of a fuel cell system comprising a fuel cell provided with a polymer electrolyte membrane, a pair of electrodes having the polymer electrolyte membrane interposed therebetween and a pair of separators having gas flow paths through which a fuel gas containing at least hydrogen is supplied into and discharged from one of the electrodes and an oxidizing agent gas containing oxygen is supplied into and discharged from the other, a fuel generator which produces a fuel gas to be supplied into the fuel cell from a raw material gas, a gas purifying portion which removes components adversely affecting the fuel cell from the raw material gas, an electric power circuit portion which draws electric power from the fuel cell, a voltage measuring portion which measures the voltage of the fuel cell and a control portion which controls gas or electric power circuit portion, wherein the operation of which is arranged such that during the suspension of the fuel cell, the fuel gas is suspended in its supply and then enclosed in the interior of the fuel cell by the action of the cut-off valve, the oxidizing agent gas is suspended in its supply and a gas inert to the fuel cell is allowed to flow through the oxidizing agent gas path in the fuel cell, and when the voltage of the fuel cell reaches a predetermined value, the cut-off valve then causes the inert gas to be enclosed in the fuel cell, whereby the anode electrode can be certainly kept at about 0 V (according to hydrogen electrode standard), the voltage can be determined by detecting the potential of the cathode and the substitution by the inert gas can be certainly made until the potential of the cathode reaches a predetermined value, making it possible to inhibit the deterioration of performance even if suspension is made.

Further, the tenth invention concerns a fuel cell system or a method of operating a fuel cell system according to any one of the first to ninth inventions, wherein as the gas inert to the fuel cell there is used a raw material gas from which components adversely affecting the fuel cell have been removed by the gas purifying portion, whereby the oxidizing agent gas can be easily replaced by the inert gas without having any special device such as bomb, making it possible to inhibit the deterioration of performance even if suspension is made by a simple configuration.

Embodiment 4

Figure 8:
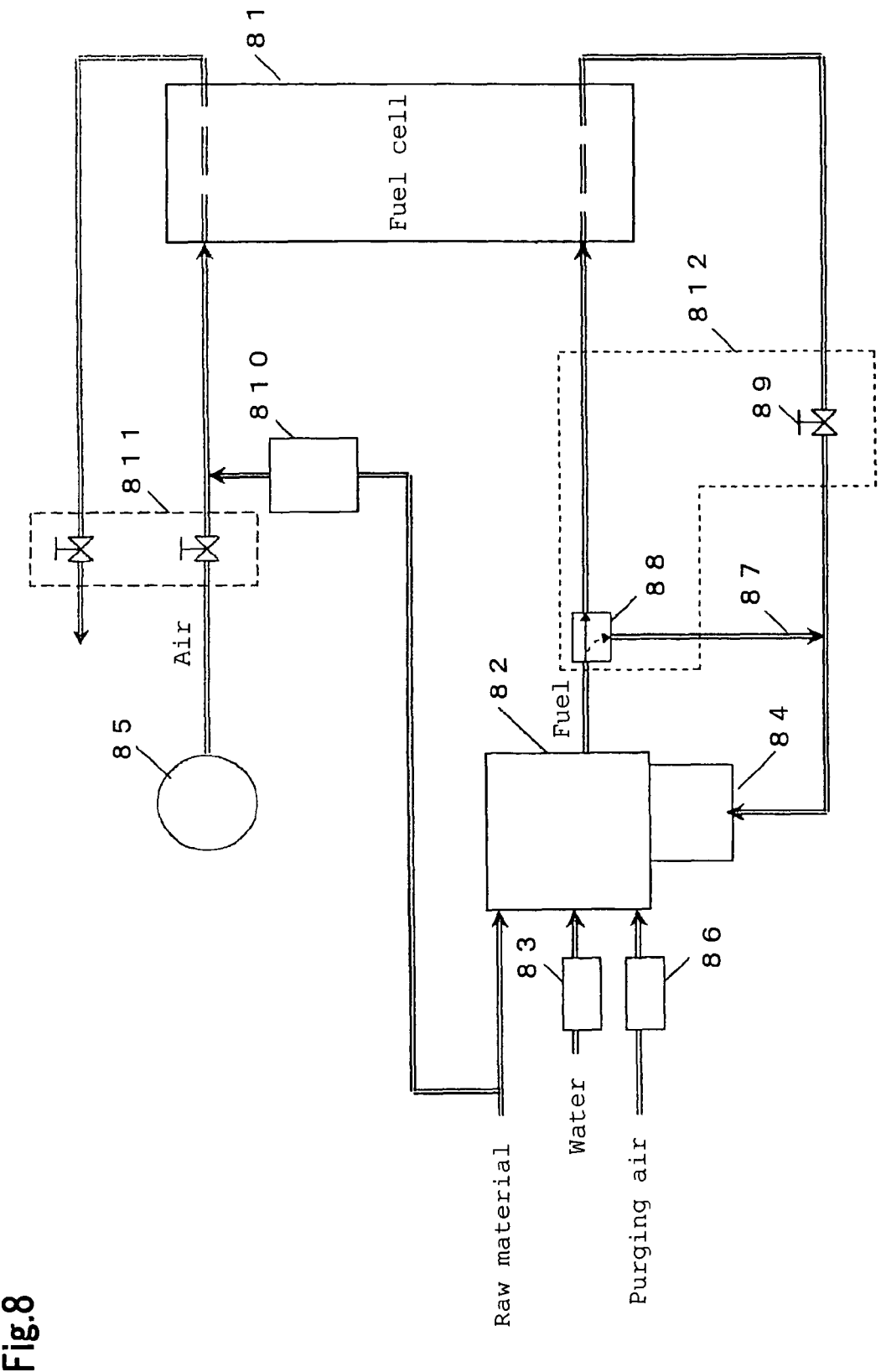
FIG. 8 is a configurational diagram illustrating the fuel cell system according to Embodiment 4 of implementation of the present invention.

FIG. 8 is a configurational diagram of the fuel cell system according to Embodiment 4 of implementation of the present invention.

The fuel cell system according to the fourth embodiment of implementation of the present invention comprises a solid polymer type fuel cell 81 which makes electricity generation from a fuel gas and an oxidizing agent gas, a fuel generator 82 which modifies a raw material gas by adding water to produce a hydrogen-rich fuel gas, a water supplying unit 83 which supplies water into the fuel generator 82, a combustor 84 which combusts an exhaust fuel gas from the fuel cell 81, a blower 85 which supplies air as an oxidizing agent gas into the cathode of the fuel cell 81, a purging air supplying unit 86, a fuel gas feed path through which the fluid delivered from the fuel generator 82 is supplied into the anode of the fuel cell 81, a flow path switching unit 88 which switches the flow of the fluid delivered from the fuel generator 82 to a bypass pipe 87 bypassing the fuel cell to introduce the exhaust fuel gas into a passage to the combustor, an on-off valve 89 on a passage through which the remaining fuel gas from the fuel cell 81 is discharged, a raw material cathode supplying unit 810 which supplies a raw material into the cathode of the fuel cell 81 and a cathode closing unit 811 having an on-off valve which opens and closes the cathode on the inlet side thereof through which air comes in the fuel cell 81 from the blower 85 and on the outlet side thereof through which air is discharged from the fuel cell 81. The aforementioned raw material is not limited to natural gas, and any material may be used so far as it is a compound composed of at least carbon and hydrogen exemplified by hydrocarbon such as city gas, methane and propane or alcohol such as methanol and ethanol. However, if a liquid raw material such as alcohol is used, it is preferably used in vaporized gas form.

Further, in the case where the flow path switching unit 88 forms a bypass flow path so that the fluid delivered from the fuel generator 82 is supplied into the bypass pipe 87, since the inlet side from which the fuel gas is supplied into the fuel cell 81 is closed, the anode closing unit 812 is composed of the flow path switching unit 88 and the on-off valve 89. Moreover, the internal configuration of the fuel cell 81 is similar to that shown in FIGS. 1 and 2.

The operation of the fuel cell system according to the present embodiment having the aforementioned configuration will be described below, and an embodiment of the method of suspending the fuel cell system of the present invention will be thus described.

During the operation of the fuel cell system, the fuel generator 82 is kept at a temperature of about 640° C. to produce from a natural gas and water a hydrogen-rich fuel gas which is then passed to the fuel cell 81 via the flow path switching unit 88 forming a feed path. In the fuel cell 81, the hydrogen in the fuel gas and the oxygen in the air which has been supplied from the blower 85 via the cathode closing unit which is opened are used to make electricity generation, and the residual fuel gas left unconsumed in electricity generation is passed via the on-off valve 89 which is opened to the combustor 84 where it is then combusted and used as a heat source for maintaining the temperature of the fuel generator 82.

In order to suspend electricity generation of the fuel cell system, the blower 85 is suspended to suspend the supply of air into the cathode of the fuel cell 81 and the raw material cathode supplying unit 810 begins to supply the raw material into the cathode of the fuel cell 81 before the voltage of the fuel cell 81 reaches the open circuit voltage. When the raw material has driven substantially all the amount of air out of the cathode of the fuel cell 81, the cathode closing unit 811 is then kept closed and the raw material cathode supplying unit 810 suspends the supply of the raw material into the cathode of the fuel cell 81.

Further, the flow path switching unit 88 is switched to the bypass pipe 87 to form a bypass flow path and keep the on-off valve 89 closed, causing the fuel gas present in the anode of the fuel cell 81 to be enclosed and the supply of the raw material into the fuel generator 82 to be suspended.

On the other hand, the supply of water into the fuel generator 82 by the water supplying unit 83 is continued. The water which has been supplied into the fuel generator 82 then becomes water vapor when heated by the fuel generator 82 to drive the hydrogen-rich fuel gas left in the fuel generator 82 to move through the flow path switching unit 8 and the bypass pipe 87 to the combustor 84 where it is then combusted. Thereafter, the amount of the hydrogen-rich fuel gas gradually decreases, causing the suspension of combustion in the combustor 84, but the thermal inertia of the fuel generator 82 causes the production of water vapor to continue.

When the amount of water vapor produced in the fuel generator 82 reaches a value great enough to drive the hydrogen-rich fuel gas out of the fuel generator 82 and the temperature of the fuel generator 82 decreases to about 400° C., the supply of water by the water supplying unit 83 is suspended and air is supplied by the purging air supplying unit 86, causing the water vapor to be driven out of the fuel generator 82 and discharged from the combustor 84 via the flow path switching unit 88 and the bypass pipe 87. When the water vapor is completely driven out of the fuel generator 82 and the various pipes, the purging air supplying unit 86 suspends the supply of air to complete the suspension of the fuel cell system.

The aforementioned temperature of 400° C. is a value predetermined taking into account some percent safety against the occurrence of deterioration of performance of catalyst by oxidation due to contact with oxygen at high temperature on the supposition that the catalyst to be used in the fuel generator 82 is mainly composed of ruthenium. It is thus natural that the predetermined temperature should vary with the percent safety, and it should be predetermined to different temperatures with different catalysts.

Subsequently, in order to start the fuel cell system, while the flow path switching unit 88 forming a bypass flow path, the raw material is supplied via the fuel generator 82, the flow path switching unit 88 and the bypass pipe 87 into the combustor 84 where it is then combusted. At the same time, the water supplying unit 3 supplies water into the fuel generator 82. Then, the combustor 84 causes the fuel generator 82 to be heated to about 640° C. so that the raw material is converted to a hydrogen-rich fuel gas. At the time when the temperature of the carbon monoxide purifying portion (not shown) included in the fuel generator 82 is stabilized and the concentration of carbon monoxide contained in the fuel gas reaches to an extent such that it doesn't deteriorate the anode electrode of the fuel cell 81 (about 20 ppm), the on-off valve 89 is opened and the flow path switching unit 88 is switched to the fuel gas feed path side so that the fuel gas is supplied to the combustor 84 via the flow path switching unit 88, the fuel cell 81 and the on-off valve 89.

At the same time, the cathode closing unit 811 is kept opened, and the blower 85 begins to supply air into the cathode of the fuel cell 81 to start the generation of electricity in the fuel cell 81.

As mentioned above, in accordance with the present embodiment, during the suspension of the fuel cell system, as in Embodiments 1 to 3, while the flow path switching unit 88 forming a bypass flow path and the on-off valve 89 is being kept closed, the fuel gas is enclosed in the anode of the fuel cell 1, making it possible to make safe suspension without allowing air to flow into the cathode of the fuel cell 1 even if nitrogen is not used and hence prevent the anode of the fuel cell 81 from being exposed to an oxidizing atmosphere containing oxygen. Further, since the raw material cathode supplying unit 810 supplies the raw material into the cathode of the fuel cell 1 to drive the air out of the cathode before suspension, air doesn't enter the anode even if the fuel cell 81 undergoes diffusion of gas from the cathode to the anode through the polymer electrolyte membrane, making it possible to keep the anode potential low and hence prevent the anode catalyst from being eluted and avoid the deterioration of durability of the fuel cell system.

Further, since the aforementioned operation of discharge of air from the cathode by the raw material begins before the fuel cell 81 reaches the open circuit voltage, the elution of the cathode catalyst due to high cathode potential doesn't occur, causing no deterioration of durability of the fuel cell system.

Moreover, since the raw material which has been supplied into the cathode of the fuel cell 81 by the raw material cathode supplying unit 810 is enclosed by keeping the cathode closing unit 811 closed, it is not likely that the air can reach the fuel cell 81 from the exterior even if suspension is prolonged, making it possible to eliminate the possibility of deterioration of durability of the fuel cell system during prolonged suspension, etc.

On the other hand, since the fuel generator 82 firstly drives the internal fuel gas by water vapor and then, after sufficient drop of temperature, drives the water vapor by air, it is not likely that combustible gas can reside therein at high temperature and water can reside therein during suspension, making it possible to prevent the accumulation of water in the pipe during the subsequent starting and hence the instabilization of supply of fuel gas.

Then, during starting, after starting of combustion in the combustor 84, the flow path switching unit 88 is switched to the fuel gas feed path side and the on-off valve 89 is opened so that the fuel gas enclosed in the fuel cell 1 is combusted in the combustor 84, making it possible to prevent the fuel gas enclosed in the fuel cell 81 from being released to the exterior and hence making it no likely that the fuel gas can be discharged to the exterior.

Embodiment 5

Figure 9:
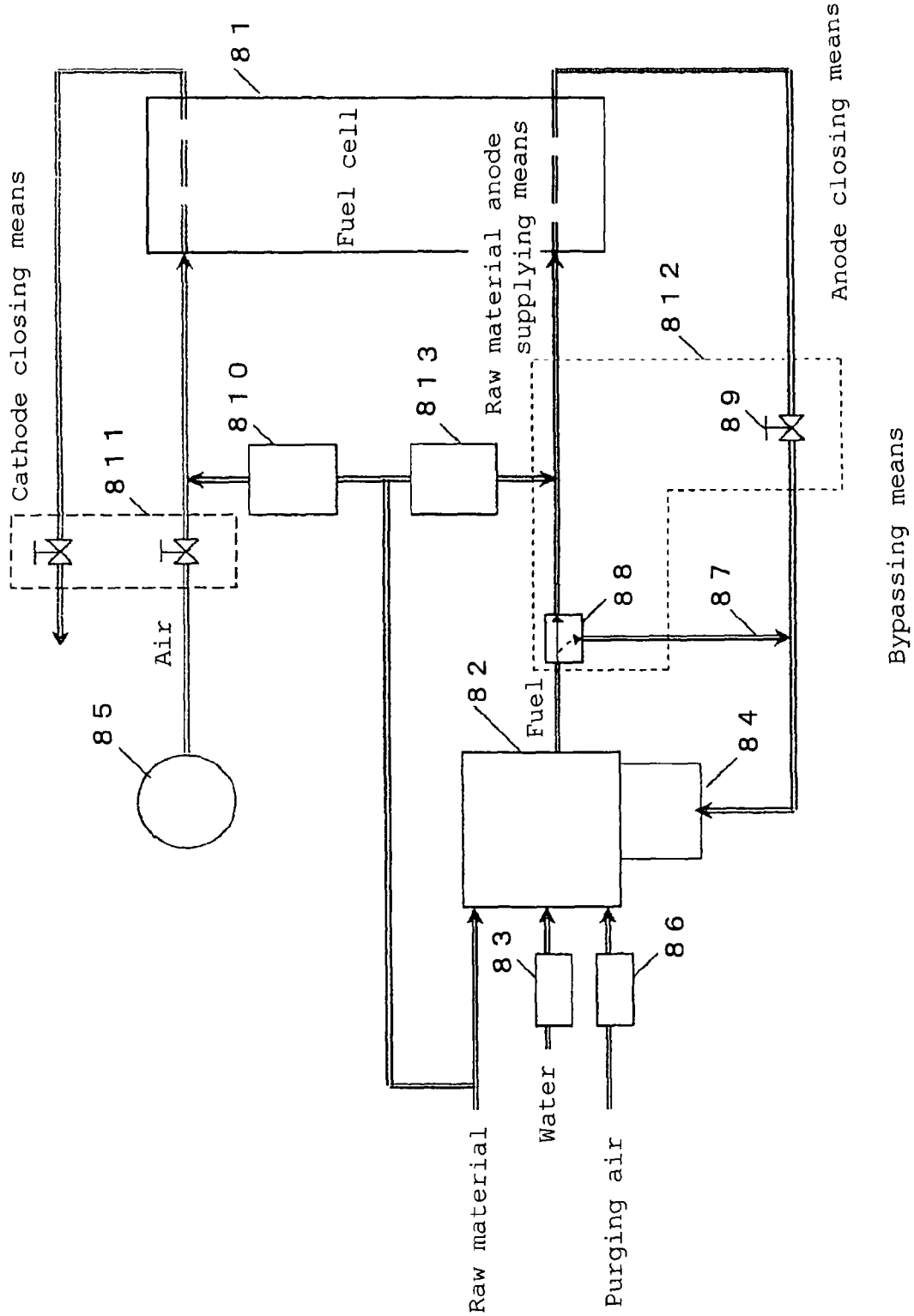
FIG. 9 is a configurational diagram illustrating the fuel cell system according to Embodiment 5 of implementation of the present invention.

FIG. 9 is a configurational diagram of the fuel cell system according to Embodiment 5 of implementation of the present invention. The same constituent elements as used in the conventional examples or Embodiment 4 of implementation of the present invention are given the same numerals.

The fuel cell system according to Embodiment 5 of implementation of the present invention differs from Embodiment 4 in that there is further provided a raw material anode supplying unit 813 which supplies the raw material into the anode of the fuel cell 1.

The operation of the fuel cell system according to the present embodiment having the aforementioned configuration will be described below, and an embodiment of the method of suspending the fuel cell system of the present invention will be thus described.

During the operation of the fuel cell system, the fuel generator 82 is kept at a temperature of about 640° C. to produce from a natural gas and water a hydrogen-rich fuel gas which is then passed to the fuel cell 81 via the flow path switching unit 88 forming a feed path. In the fuel cell 81, the hydrogen in the fuel gas and the oxygen in the air which has been supplied from the blower 85 via the cathode closing unit which is opened are used to make electricity generation, and the residual fuel gas left unconsumed in electricity generation is passed via the on-off valve 89 which is opened to the combustor 84 where it is then combusted and used as a heat source for maintaining the temperature of the fuel generator 82.

In order to suspend electricity generation of the fuel cell system, the blower 85 is suspended to suspend the supply of air into the cathode of the fuel cell 81 and the raw material cathode supplying unit 810 begins to supply the raw material into the cathode of the fuel cell 81 before the voltage of the fuel cell 81 reaches the open circuit voltage. When the raw material has driven substantially all the amount of air out of the cathode of the fuel cell 81, the cathode closing unit 811 is then kept closed and the raw material cathode supplying unit 810 suspends the supply of the raw material into the cathode of the fuel cell 81.

Subsequently, the flow path switching unit 88 is switched to the bypass pipe 87 to form a bypass flow path and keep the on-off valve 89 closed and the anode closing unit 812 supplies the raw material into the anode of the fuel cell 1. When the raw material drives substantially all the amount of the fuel gas out of the anode of the fuel cell 81, the on-off valve 89 is kept closed and the raw material anode supplying unit 813 suspends the supply of the raw material into the anode of the fuel cell 81.

On the other hand, the supply of the raw material into the fuel generator 82 is suspended and the supply of water into the fuel generator 82 by the water supplying unit 83 is continued. The water which has been supplied into the fuel generator 82 then becomes water vapor when heated by the fuel generator 82 to drive the hydrogen-rich fuel gas left in the fuel generator 82 to move through the flow path switching unit 88 and the bypass pipe 87 to the combustor 84 where it is then combusted. Thereafter, the amount of the hydrogen-rich fuel gas gradually decreases, causing the suspension of combustion in the combustor 84, but the thermal inertia of the fuel generator 82 causes the production of water vapor to continue.

When the amount of water vapor produced in the fuel generator 82 reaches a value great enough to drive the hydrogen-rich fuel gas out of the fuel generator 82 and the temperature of the fuel generator 82 decreases to about 400° C., the supply of water by the water supplying unit 83 is suspended and air is supplied by the purging air supplying unit 86, causing the water vapor to be driven out of the fuel generator 82 and discharged from the combustor 84 via the flow path switching unit 88 and the bypass pipe 87. When the water vapor is completely driven out of the fuel generator 82 and the various pipes, the purging air supplying unit 86 suspends the supply of air to complete the suspension of the fuel cell system.

The aforementioned temperature of 400° C. is a value predetermined taking into account some percent safety against the occurrence of deterioration of performance of catalyst by oxidation due to contact with oxygen at high temperature on the supposition that the catalyst to be used in the fuel generator 82 is mainly composed of ruthenium. It is thus natural that the predetermined temperature should vary with the percent safety, and it should be predetermined to different temperatures with different catalysts.

Subsequently, in order to start the fuel cell system, while the flow path switching unit 88 forming a bypass flow path, the raw material is supplied via the fuel generator 82, the flow path switching unit 88 and the bypass pipe 87 into the combustor 84 where it is then combusted. At the same time, the water supplying unit 83 supplies water into the fuel generator 82. Then, the combustor 84 causes the fuel generator 82 to be heated to about 640° C. so that the raw material is converted to a hydrogen-rich fuel gas. At the time when the temperature of the carbon monoxide purifying portion (not shown) included in the fuel generator 82 is stabilized and the concentration of carbon monoxide contained in the fuel gas reaches to an extent such that it doesn't deteriorate the anode electrode of the fuel cell 1 (about 20 ppm), the on-off valve 89 is opened and the flow path switching unit 88 is switched to the fuel gas feed path side so that the fuel gas is supplied to the combustor 84 via the flow path switching unit 88, the fuel cell 81 and the on-off valve 89.

At the same time, the cathode closing unit 811 is kept opened, and the blower 85 begins to supply air into the cathode of the fuel cell 81 to start the generation of electricity in the fuel cell 81.

As mentioned above, during the suspension of the fuel cell system, the anode closing unit 812 supplies the raw material into the anode of the fuel cell 81 and, when the raw material drives substantially all the amount of the fuel gas out of the fuel cell 81, the raw material is enclosed while the on-off valve 89 is being kept closed, making it possible to make safe suspension without allowing air to flow into the cathode of the fuel cell 1 even if nitrogen is not used and hence prevent the anode of the fuel cell 1 from being exposed to an oxidizing atmosphere containing oxygen.

Further, since in the first stage of suspension of electricity generation, the raw material cathode supplying unit 810 supplies the raw material into the cathode of the fuel cell 81 to drive the air out of the cathode before suspension, air doesn't enter the anode even if the fuel cell 81 undergoes diffusion of gas from the cathode to the anode through the polymer electrolyte membrane, making it possible to prevent the deterioration of durability of the fuel cell system. Moreover, since the aforementioned operation of discharge of air from the cathode by the raw material begins before the fuel cell 81 reaches the open circuit voltage, a high potential difference occurs between the cathode and the anode of the fuel cell 1, making it possible to prevent the elution of the electrode due to the flow of slight current and hence the deterioration of durability of the fuel cell system.

Moreover, since the raw material which has been supplied into the cathode of the fuel cell 81 by the raw material cathode supplying unit 810 is enclosed by keeping the cathode closing unit 811 closed, it is not likely that the air can reach the fuel cell 81 from the exterior even if suspension is prolonged, making it possible to eliminate the possibility of deterioration of durability of the fuel cell system during prolonged suspension, etc.

On the other hand, since the fuel generator 82 firstly drives the internal fuel gas by water vapor and then, after sufficient drop of temperature, drives the water vapor by air, it is not likely that combustible gas can reside therein at high temperature and water can reside therein during suspension, making it possible to prevent the accumulation of water in the pipe during the subsequent starting and hence the instabilization of supply of fuel gas.

Then, during starting, after starting of combustion in the combustor 84, the flow path switching unit 88 forms a fuel gas feed path and the on-off valve 89 is opened so that the fuel gas enclosed in the fuel cell 1 is combusted in the combustor 84, making it possible to prevent the fuel gas enclosed in the fuel cell 81 from being released to the exterior and hence making it no likely that the fuel gas can be discharged to the exterior.

In the aforementioned Embodiments 4 and 5, the fuel cell 81 corresponds to the fuel cell of the present invention and the fuel generator 82 corresponds to the fuel generator of the present invention. Further, the pipe connecting between the fuel generator 82 and the fuel cell 81 corresponds to the fuel gas pipe of the present invention, the flow path switching means corresponds to the fuel gas on-off valve of the present invention, and they constitute the fuel gas supplying means of the present invention. Further, the on-off valve on the air inlet side of the cathode closing means 811 corresponds to the oxidizing agent gas on-off valve of the present invention, the pipe connecting this to the fuel cell corresponds to the oxidizing agent gas pipe of the present invention, and they constitute the oxidizing agent gas supplying means of the present invention.

Further, the raw material cathode supplying means corresponds to the raw material gas on-off valve of the present invention, the pipe connecting this to the fuel cell 81 corresponds to the raw material gas pipe of the present invention, and they constitute the raw material gas supplying means of the present invention.

Further, the on-off valve 89 on the fuel gas outlet side of the anode closing means 812 corresponds to the anode side off-gas on-off valve of the present invention and the pipe connecting this to the fuel cell corresponds to the anode side exhaust pipe of the present invention. Further, the on-off valve 89 on the air outlet side of the cathode closing means 811 corresponds to the cathode side off-gas on-off valve of the present invention and the pipe connecting this to the fuel cell corresponds to the cathode side exhaust pipe of the present invention.

Further, the bypass pipe 87 corresponds to the bypassing means of the present invention and the combustor 84 corresponds to the combustor of the present invention.

In Embodiments 4 and 5, the suspension step 3 of Embodiment 1 may be executed by using the raw material supplying unit 813 as the additional raw material gas on-off valve of the present invention and the pipe connecting between the raw material anode supplying unit 813 and the fuel cell 81 as the additional raw material gas pipe of the present invention.

The aforementioned Embodiments 4 and 5 correspond to the following embodiments of implementation of the present invention. In other words, the first invention may be a fuel cell system comprising a fuel cell which generates electricity from a fuel gas containing hydrogen and an oxidizing agent gas, a fuel generator which produces the aforementioned fuel gas from a raw material, a purging air supplying unit which supplies air into the aforementioned fuel generator, a raw material cathode supplying unit which supplies a raw material into the cathode of the aforementioned fuel cell, a bypassing unit which bypasses the aforementioned fuel cell to a fuel gas path from the aforementioned fuel generating unit to the aforementioned fuel cell, a switching unit which switches the path of gas to be discharged from the aforementioned fuel generator to either the aforementioned fuel gas path or the bypassing unit and an anode closing unit which closes the inlet and outlet of the anode of the aforementioned fuel cell, wherein during the suspension of electricity generation of the aforementioned fuel cell, the aforementioned raw material cathode supplying unit supplies the raw material into the cathode of the aforementioned fuel cell, the aforementioned anode closing unit closes the inlet and outlet of the anode, the aforementioned switching unit switches to the bypassing unit side and the aforementioned water supplying unit supplies water, followed by the supply of air by the aforementioned purging air supplying unit.

Further, the second invention may be a fuel cell system comprising a fuel cell which generates electricity from a fuel gas containing hydrogen and an oxidizing agent gas, a fuel generator which produces the aforementioned fuel gas from a raw material, a water supplying unit which supplies water into the said fuel generator a purging air supplying unit which supplies air into the aforementioned fuel generator, a raw material cathode supplying unit which supplies a raw material into the cathode of the aforementioned fuel cell, a raw material anode supplying unit which supplies a raw material into the anode of the aforementioned fuel cell, a bypassing unit which bypasses the aforementioned fuel cell to a fuel gas path from the aforementioned fuel generating unit to the aforementioned fuel cell, and a switching unit which switches the path of gas to be discharged from the aforementioned fuel generator to either the aforementioned fuel gas path or the bypassing unit, wherein during the suspension of electricity generation of the aforementioned fuel cell, the aforementioned raw material cathode supplying unit supplies the raw material into the cathode of the aforementioned fuel cell, the aforementioned raw material anode supplying unit supplies the raw material into the anode of the aforementioned fuel cell, the aforementioned switching unit switches to the bypassing unit side and the aforementioned water supplying unit supplies water, followed by the supply of air by the aforementioned purging air supplying unit.

Further, the third invention may be a fuel cell system of the first or second invention, wherein the operation of suspending the aforementioned fuel cell begins at latest before the voltage of the aforementioned fuel cell reaches the open circuit voltage.

Further, the fourth invention may be a fuel cell system of the second invention, wherein the aforementioned raw material anode supplying unit begins the supply of the raw material into the anode of the aforementioned fuel cell after the aforementioned raw material cathode supplying unit begins the supply of the raw material into the cathode of the aforementioned fuel cell.

Further, the fifth invention may be a fuel cell system of any one of the second to fourth inventions, wherein there is provided an anode closing unit which closes the inlet and outlet of the anode of the aforementioned fuel cell and the aforementioned anode closing unit closes the inlet and the outlet of the anode of the aforementioned fuel cell after the aforementioned raw material anode supplying unit supplies the raw material into the anode of the aforementioned fuel cell.

Further, the sixth invention may be a fuel cell system of any one of the first to fifth inventions, wherein there is provided a cathode closing unit which closes the inlet and outlet of the cathode of the aforementioned fuel cell and the aforementioned cathode closing unit closes the inlet and the outlet of the cathode of the aforementioned fuel cell after the aforementioned raw material cathode supplying unit supplies the raw material into the cathode of the aforementioned fuel cell.

Further, the seventh invention may be a fuel cell system of the first, fifth or sixth invention, wherein there is provided a combustor which combusts at least one of the raw material, the remaining fuel discharged from the anode of the aforementioned fuel cell and the fuel supplied from the aforementioned fuel generator via the aforementioned bypassing unit and during the starting of the device, after the beginning of combustion in the aforementioned combustor, the aforementioned anode closing unit opens the inlet and the outlet of the anode of the aforementioned fuel cell.

Embodiment 6

Prior to the description of the fuel cell system of the present invention and its suspending method, the basic principle of electricity generation of a solid polymer electrolyte type fuel cell will be again generally described, and the necessity of controlling water retention of electrolyte membrane will be also described to understand the purpose of preventing the drying of electrolyte membrane by moistened raw material gas.

A fuel cell is adapted to supply a fuel cell such as hydrogen gas to the anode and an oxidizing agent gas such as air to the cathode so that they undergo electrochemical reaction to generate electricity and heat at the same time.

As an electrolyte membrane there is used a polymer electrolyte membrane which selectively transports hydrogen ion, and the porous catalytic reaction layer disposed on the both surfaces of this electrolyte membrane comprises as a main component a carbon powder having a platinum-based metallic catalyst supported thereon and undergoes reaction of the following formula (12) on the anode catalytic reaction layer and reaction of the following formula (13) on the cathode catalytic reaction layer, i.e., reaction of the following formula (14) on the whole of the fuel cell.

$H_2 \rightarrow 2H^+ + 2e^-$ (chemical formula 12)

$\frac{1}{2}O_2 + 2H^+ + 2e^- \rightarrow H_2O$ (chemical formula 13)

$H_2 + \frac{1}{2}O_2 \rightarrow H_2O$ (chemical formula 14)

In other words, the hydrogen ion produced in the reaction of the formula (12) is transported from the anode to the cathode via the electrolyte membrane, electron is moved from the anode to the cathode via an external circuit and the oxygen gas, hydrogen ion and electron are reacted on the cathode according to the formula (13) to produce water while obtaining reaction heat by catalytic reaction.

Thus, the electrolyte membrane needs to be able to selectively transport hydrogen ion, and it is thought that by allowing the electrolyte membrane to retain water, the water contained in the electrolyte membrane can be a moving path by which ionic conduction allowing the transport of hydrogen ion from the anode to the cathode can be realized.

Accordingly, in order to attain hydrogen ion transporting capability, it is dispensable to allow the electrolyte membrane to retain water, and it is an important technical factor concerning the basic performance of electrolyte membrane to prevent the drying of the electrolyte membrane and to perform properly control of water retention of the electrolyte membrane.

Next, the configuration of an existing polymer electrolyte type fuel cell will be described in connection with the drawings.

Figure 10:
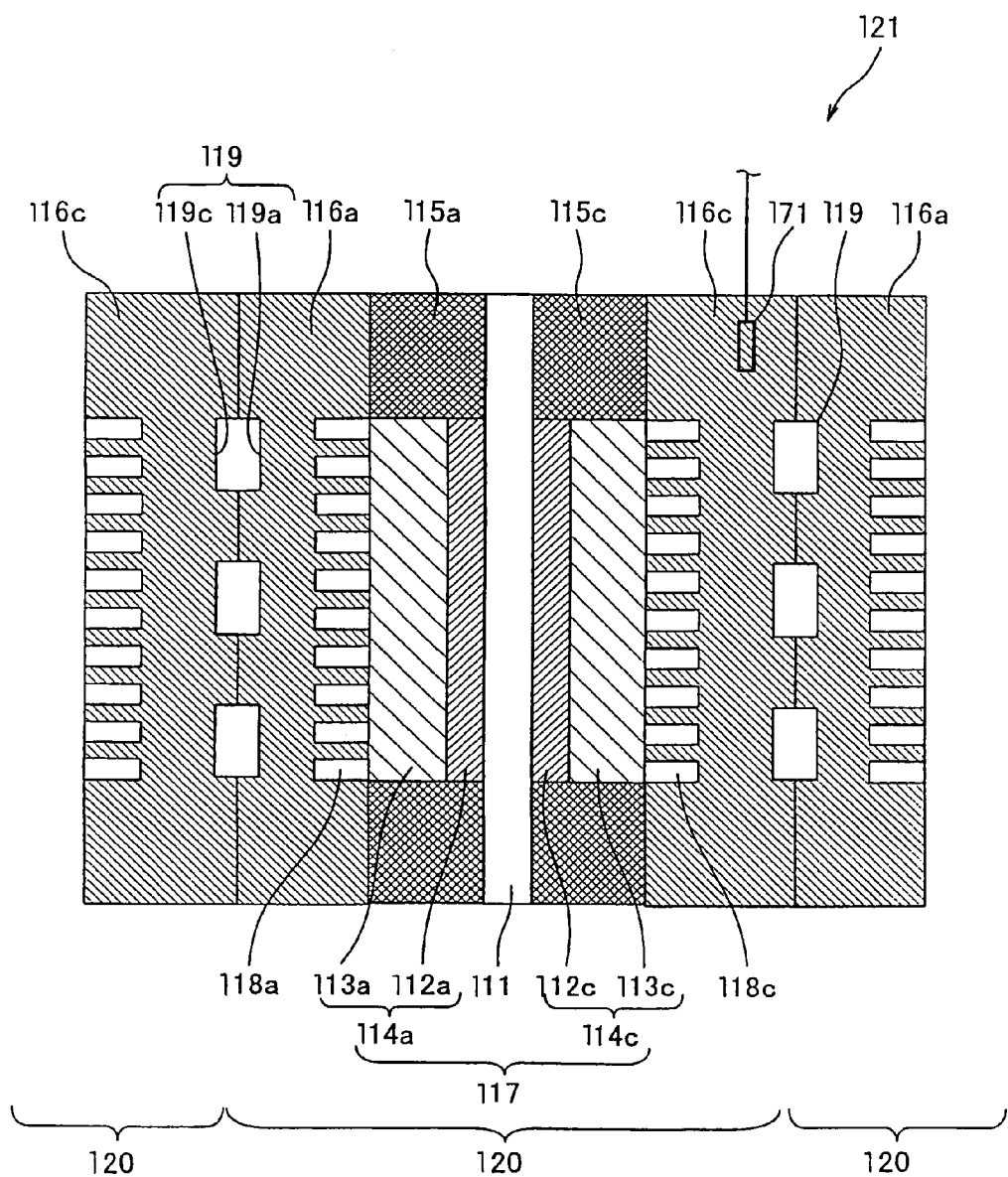
FIG. 10 is a sectional view of a solid polymer electrolyte type fuel cell comprising an electrode assembly (MEA; Membrane-Electrode Assembly).

FIG. 10 depicts a sectional view of a solid polymer electrolyte type fuel cell comprising MEA: Membrane-Electrode Assembly.

On the respective surface of a polymer electrolyte membrane 111 made of a perfluoro carbonsulfonic acid having hydrogen ionic conductivity are disposed an anode 114a and a cathode 114c having the electrolyte membrane 111 disposed therebetween. The suffix a in the reference numerals indicates those related to the anode 114a on the side where the fuel gas such as hydrogen gas takes part in the reaction and the suffix c in the reference numerals indicates those related to the anode 114c on the side where the oxidizing agent gas such as air takes part in the reaction.

Both the anode 114a and cathode 114c have a double-layer structure, and the first layers in contact with the electrolyte membrane 111 are a catalytic reaction layer 112a of anode 114a made of a mixture of a catalyst having a noble metal such as platinum supported on a porous carbon and a polymer electrolyte having hydrogen ion conductivity (hereinafter referred to as "catalytic reaction layer 112a") and a catalytic reaction layer 112c of cathode 114c made of the same structure (hereinafter referred to as "catalytic reaction layer 112c") and the second layers laminated in contact with the outer surface of the catalytic reaction layers 112a, 112c are a gas diffusion layer 113a of anode 114a having both air permeability and electrical conductivity (hereinafter referred to as "gas diffusion layer 113a") and a gas diffusion layer 113c of cathode 114c having the same characteristics (hereinafter referred to as "gas diffusion layer 113c").

MEA 117 is formed by the electrolyte membrane 1111, the anode 114a and the cathode 114c, and this MEA 117 is mechanically fixed and adjacent MEA 117 units are electrically connected in series to each other.

An electrically-conductive separator plate 116 for the anode 114a (hereinafter referred to as "electrically-conductive separator plate 116a") is disposed in contact with the outer surface of the anode 114a and an electrically-conductive separator plate 116c for the cathode 114c (hereinafter referred to as "electrically-conductive separator plate 116c") is disposed in contact with the outer surface of the cathode 114c.

Further, a fuel gas flow path 18a for the anode 114a (hereinafter referred to as "gas flow path 18a") and an oxidizing agent gas flow path 18c for the cathode 114c (hereinafter referred to as "gas flow path 18c") formed by a groove (depth: 0.5 mm) which supply a reactive gas to the anode 114a and the cathode 114c and carry away the reacted reaction product gas or extra reactive gas which has not take part in the reaction are formed on the electrically-conductive separator plates 116a, 116c on the surface thereof in contact with MEA 117.

In this arrangement, a fuel cell unit (single cell) 20 is formed by MEA 117 and separator plates 116a and 116c.

In the interior of the fuel cell 121, about 160 fuel cell units 120 are laminated for example, and in some detail, the fuel cell units 120 are laminated in such an arrangement that two adjacent fuel cell units come in contact with each other with the outer surface of the electrically-conductive separator plate 116a of one of the fuel cell units being opposed to the outer surface of the electrically-conductive separator plate 116c of the other.

Further, the electrically-conductive separator plate 116a and the adjacent electrically-conductive separator plate 116c have a cooling water passage 119 formed on the surface thereof in contact with each other, which cooling water passage being formed by a groove 119a (depth: 0.5 mm) formed on the electrically-conductive separator plate 116a and a groove 119c (depth: 0.5 mm) formed on the electrically-conductive separator plate 116c.

In this arrangement, the cooling water flowing through the interior of the cooling water passage 119 causes the temperature of the electrically-conductive separator plates 116a, 116c to be adjusted, making it possible to adjust the temperature of MEA 117 via these electrically-conductive separators 116a, 116c.

As the electrically-conductive separator plates 116a, 116c there are used, e.g., graphite plate having an external size of 20 cm×32 cm×1.3 mm impregnated with a phenolic resin.

On the other hand, on the anode side main surface and cathode side main surface of the periphery of MEA 117 are provided an annular rubber MEA gasket 115a on the anode 114a side (hereinafter referred to as "MEA gasket 115a") and an annular rubber MEA gasket 115c on the cathode 114c side (hereinafter referred to as "MEA gasket 115c"), respectively, so that the gap between the electrically-conductive separator plates 116a and 116c and MEA 117 are sealed with MEA gaskets 115a, 115c, respectively. In this arrangement, MEA gaskets 115a, 115c makes it possible to prevent the mixing or leakage of gas flowing through the gas flow paths 118a, 118c. Further, MEA gaskets 115a, 115c each have manifold holes (not shown) formed on the outer side thereof for the passage of cooling water, the passage of fuel gas and the passage of oxidizing agent gas.

Figure 11:
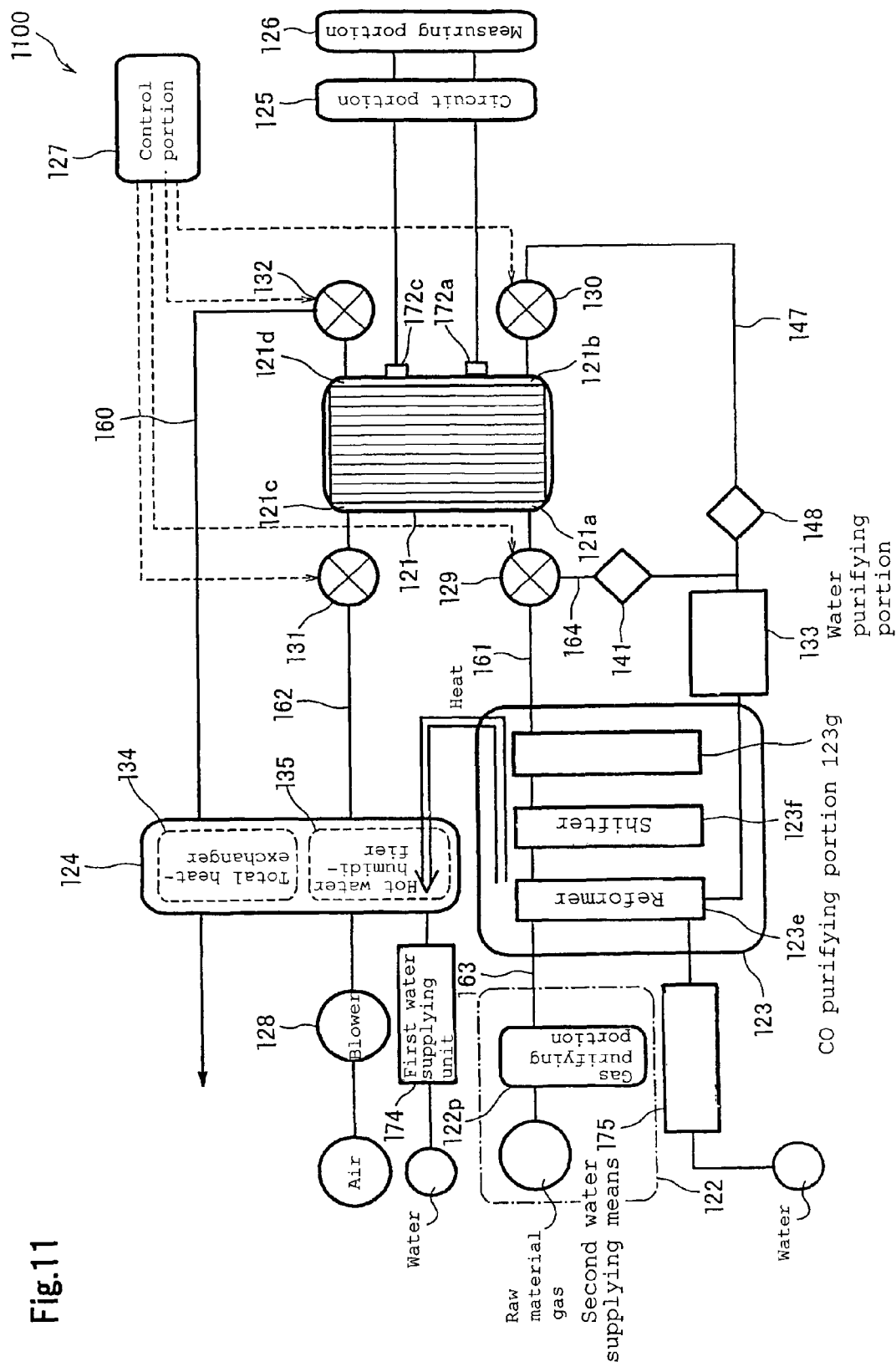
FIG. 11 is a block diagram illustrating the basic configuration of a fuel cell electricity-generating device.

The configuration and operation of the gas supplying system of the fuel cell electricity-generating device comprising the aforementioned fuel cell will be described in connection with the drawings. FIG. 11 is a block diagram illustrating the basic configuration of a fuel cell electricity-generating device.

Firstly, the basic configuration of a fuel cell electricity-generating device 1100 according to Embodiment 6 of implementation of the present invention will be described in connection with FIGS. 11 and 12.

The fuel cell electricity-generating device 1100 is essentially composed of a raw material gas supplying unit 122 of supplying a raw material gas into a fuel generator 123, a second water supplying unit 175 of supplying water into the fuel generator 123, a fuel generator 123 of producing a hydrogen-rich fuel gas from a raw material gas supplied from the raw material gas supplying unit 122 and water supplied from the second water supplying unit 175 by modification reaction, a blower 128 as an air supplying unit of supplying an oxidizing agent gas (air) into a humidifier 123, a first water supplying unit 174 of supplying water into a humidifier 124, a humidifier 134 of moistening air supplied from the blower 128 with heat supplied from the fuel generator 123 and water supplied from the first water supplying unit 174, a fuel cell 121 of generating electricity and heat from a fuel gas supplied from the fuel generator 123 to the anode 114a and a moistening oxidizing agent gas supplied from the humidifier 124 to the cathode 114a, a control portion 127 of making proper control over the raw material gas supplying unit 122, the first and second water supplying units 174, 175, the fuel generator 123, the blower 128 and the fuel cell 121, a circuit portion 125 of withdrawing electric power generated in the fuel cell 121 and a measuring portion 126 of measuring the voltage (generated electric power) of the circuit portion 125.

Further, the fuel cell electricity-generating device 1100 comprises a first switching valve 129 and first, second and third cut-off valves 130, 131 and 132 described in detail later, which are controlled by the control portion 127. The dotted line in FIG. 11 indicates a control signal.

Next, the operation of gas supply during normal operation (electricity generation) of the fuel cell electricity-generating device will be described.

In the gas purifying portion 122p of the raw material gas supplying unit 122, materials contained in the raw material gas causing deterioration of performance of fuel cell are removed to purify the raw material gas, and then the purified raw material gas is supplied into the fuel generator 123 through a raw material gas feed pipe 163. Herein, since as the city gas there is used city gas 13A containing methane gas, ethane gas, propane gas and butane gas, impurities such as tertiary butyl mercaptane (TBM), dimethyl sulfide (DMS) and tetrahydrothiophine (THT), which are odorizers, contained in city gas 13A are adsorbed and removed in the gas purifying portion 122*p*.

On the other hand, water is supplied from a second water supplying unit 175 (e.g., water supplying pump) into the interior of the fuel generator 23.

In this manner, the raw material gas and water vapor are subjected to modification reaction in the reformer 123*e* of the fuel generator 123 to produce a hydrogen-rich fuel gas (reformed gas). With the fuel gas feed pipe 161 and the anode side inlet 121*a* being connected to each other by the action of a first switching valve 129, the fuel gas delivered from the fuel generator 123 is supplied through the fuel gas feed pipe 161 into the anode side inlet 121*a* of the fuel cell 121, and then used in the reaction of the formula (1) on the anode 114*a*. The first switching valve 129 is disposed along the fuel gas feed pipe 161 extending between the anode side inlet 121*a* and the fuel generator 123.

Further, among the fuel gas supplied into the fuel cell 121, the part which has not been used in electricity generation in the fuel cell 121 is delivered from the anode side outlet 121*b* and then introduced to the exterior of the fuel cell 121 through the anode exhaust pipe 147 and the first cut-off valve 130 which is kept opened.

The first cut-off valve 130 is disposed along the anode exhaust pipe 147 extending between the anode side outlet 121*b* and the water purifying portion 133. The remaining fuel gas which has been introduced to the exterior is allowed to pass through a second check valve 148 (second check valve 148 allows the flow) disposed along the anode exhaust pipe 147 while being prevented from flowing backward toward the first connecting pipe 164 by the first check valve 141. Then, the remaining fuel gas is freed of water by the water purifying portion 133 disposed on the anode exhaust pipe 147, and then sent to a combustion portion (not shown) in the fuel generator 123 where it is then combusted. The heat generated by this combustion is used as a heat for endothermic reaction such as modification reaction.

On the other hand, the oxidizing agent gas (air) which has been supplied into the humidifier 124 from the blower 128 as an oxidizing agent gas supplying unit through the oxidizing agent gas feed pipe 162 is moistened in the humidifier 124, and then supplied through the second cut-off valve 131 which is kept opened and the oxidizing agent gas feed pipe 162 into the cathode side inlet 121*c* of the fuel cell 121 where it is then used in the reaction of the formula (2) on the cathode 114*c*. The second cut-off valve 131 is disposed along the oxidizing agent gas feed pipe 162 extending between the humidifier 124 and the cathode side inlet 121*c*.

Water required for moistening is supplied from the first water supplying unit 174 (e.g., water supplying pump) into the interior of the humidifier 124 and heat required for moistening is supplied from the fuel generator 123 shown by a double line in FIG. 11 into the humidifier 124. Among the moistened oxidizing agent gas supplied into the fuel cell 121, the part which has not been used in electricity generation reaction in the fuel cell 121 is introduced to the exterior of the fuel cell 121 from the cathode side outlet 121*d* through a third cut-off valve 132 which is kept opened and the remaining oxidizing agent gas is refluxed through the cathode exhaust pipe 160 to the humidifier 124 where water and heat contained in the refluxed oxidizing agent gas are then given to fresh oxidizing agent gas delivered from the blower 128. The third cut-off valve 132 is disposed along the cathode exhaust pipe 160 extending between the cathode side outlet 121*d* and the humidifier 124. As the humidifier 124 there is used a total heat-exchange humidifier 134 comprising an ion-exchange membrane in combination with a hot water humidifier 135.

Herein, the operation of the raw material gas supplying unit 122, the blower 128, the first and second water supplying units 174, 175, the fuel generator 123 and the fuel cell 121, the switching operation of the first switching valve 129 and the on-off operation of the first, second and third cut-off valves 130, 131, 132 are controlled by the control portion 127 on the basis of detection signal (e.g., temperature signal) of various equipments to execute proper DSS operation.

In this manner, to the output terminal 172*a* of the anode 114*a* (hereinafter referred to as "output terminal 172*a*") and the output terminal 172*c* of the cathode 114*c* (hereinafter referred to as "output terminal 172*c*") is connected the circuit portion 125 where electric power generated in the interior of the fuel cell 121 is withdrawn and the generated electric power voltage of the circuit portion 125 is then monitored by the measuring portion 126.

Herein, inside the fuel generator 123 are provided, besides a reformer 123*e* which reforms the raw material gas such as methane gas with water vapor, a CO shifter 123*f* which removes part of carbon monoxide (CO gas) contained in the fuel gas delivered from the reformer 123*e* and a CO purifying portion 123*g* capable of lowering the concentration of CO gas in the fuel gas delivered from the CO shifter 123*f* to 10 ppm or less. By lowering the CO gas concentration to a predetermined level or less, the poisoning of platinum contained in the anode 114*a* by CO gas can be prevented within the working temperature range of the fuel cell 121, making it possible to avoid the deterioration of the catalytic activity thereof. Of course, a countermeasure against CO gas poisoning has been made also from the standpoint of catalyst material by incorporating a CO gas-resistant catalyst such as platinum-ruthenium in the anode 114*a*.

Referring further to the change of reaction in the interior of the fuel generator 123 with methane gas as an example of raw material gas, the following reaction occurs.

In the reformer 123*e*, a water vapor modification reaction represented by the formula (4) occurs to produce a hydrogen gas (about 90%) and a CO gas (about 10%).

$$CH_4 + H_2O \rightarrow CO + 3H_2 \quad (4)$$

Subsequently, in the CO shifter 123*f*, this CO gas is oxidized to carbon dioxide and decreased to a concentration of about 5,000 ppm (see the formula (5)). CO gas can be oxidized away also in the CO purifying portion 123*g* disposed downstream from the shifter 123*f*, but since the CO purifying portion 123*g* oxidizes useful hydrogen gas also besides CO gas, it is desired that the concentration of CO gas be lowered in the CO shifter 123*f* as much as possible.

$$CO + H_2O \rightarrow CO_2 + H_2 \quad (5)$$

The remaining CO gas which could not be completely removed in the shifter 123*f* is oxidized away in the CO purifying portion 123*g* and decreased to a concentration of about 10 ppm or less (see the formula (6)). In this manner, the CO gas concentration can reach a level at which the resulting fuel gas can be used for the fuel cell 121. For reference, the total reaction formula of the fuel generator 123 will be represented by the following formula (7).

$$CO + \tfrac{1}{2}O_2 \rightarrow CO_2 \quad (6)$$

$$CH_4 + 2H_2O \; CO_2 + 4H_2 \quad (7)$$

Next, the operation during the starting of the fuel cell electricity-generating device 100 will be described.

So far as the temperature of the fuel generator 123 (reformer 123e) is 640° C. or less, the modification reaction of the formula (4) doesn't occur in the fuel generator 123 (reformer 123e). Therefore, during starting, the gas delivered from the fuel gas is not introduced to the anode side inlet 121a, and the switching action of the first switching valve 129 causes the fuel gas feed pipe 161 to be connected to the anode exhaust pipe 147 via the first connecting pipe 164 and the first check valve 141 disposed along the first connecting pipe 164 so that the gas delivered from the fuel generator 123 is introduced into the anode exhaust pipe 147 through the first check valve 141 (first check valve allows the flow). Thereafter, this gas is prevented from flowing backward toward the anode side outlet 121b by the second check valve 148, freed of water in the water purifying portion 133, and then supplied into the combustor of the fuel generator 123 where it is then combusted. In this manner, the temperature rise of the fuel generator 123 (reformer 123e) can be rapidly conducted, making it possible to reduce the time between starting and electricity generation.

Further, the operation during the suspension of starting of the fuel cell electricity-generating device 1100 will be described.

During the suspension of starting of the fuel cell electricity-generating device 1100, the first switching valve 129 is operated to connect the fuel gas feed pipe 161 to the anode exhaust pipe 147 and block the fuel gas feed pipe 161 and the anode side inlet 121a. Further, the first, second and third cut-off valves 130, 131, 132 are each closed. In this manner, after the suspension of starting, the fuel gas can be enclosed in the anode 114a of the fuel cell 121 and the oxidizing agent gas can be enclosed in the cathode 14c of the fuel cell 121.

The operation of the gas supplying system having a basic configuration of the fuel cell electricity-generating device during normal operation (electricity generation), starting and suspension of operation has been generally described above, but in a fuel cell electricity-generating device having a suspension period and an electricity generation period and showing frequent alternate repetition of suspension and electricity generation (e.g., household fuel cell electricity-generating device), the interior of the fuel cell can be exposed to an atmosphere of moistened raw material gas for a transition period between suspension of fuel cell and electricity generation, making it possible to solve technical problems concerning the repetitive operation of starting and suspension of fuel cell, that is, drying of the electrolyte membrane during suspension of fuel cell and local combustion in fuel cell attributed to the entrance of oxygen gas caused by prolonged storage.

Herein, the moistening of the raw material gas means that the atmosphere of raw material gas is maintained to keep the dew point of the raw material gas not lower than the working temperature of the fuel cell.

Examples of the configuration and operation of the gas supplying system of the fuel cell electricity-generating device characterized by the exposure of the interior of the fuel cell to moistened raw material gas during the aforementioned transition period will be described below, and an embodiment of the starting method of the fuel cell system of the present invention will be thus described.

Figure 12:
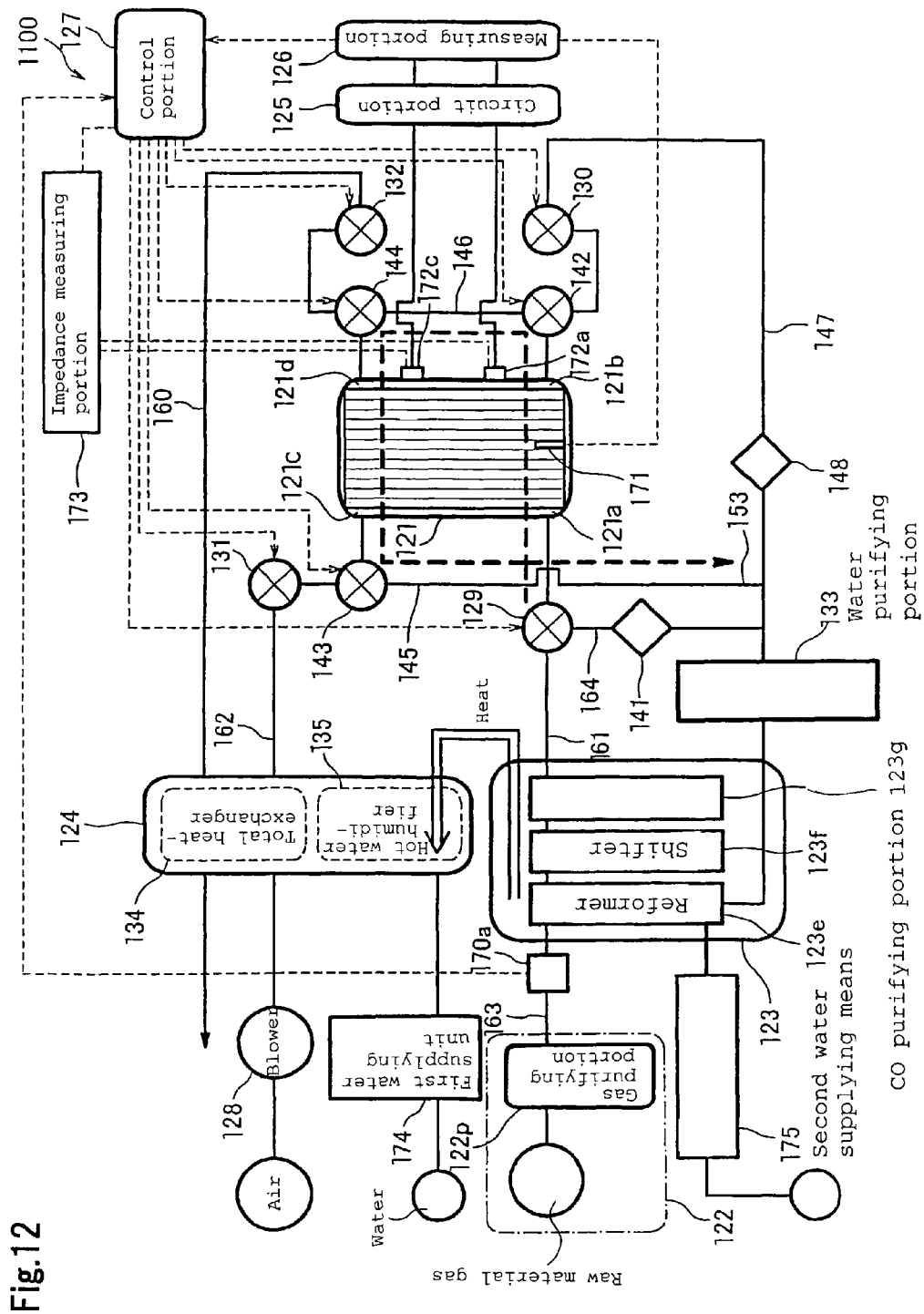
FIG. 12 is a block diagram illustrating the basic configuration of a fuel cell electricity-generating device according to Embodiment 6 of implementation of the present invention.
Figure 13:
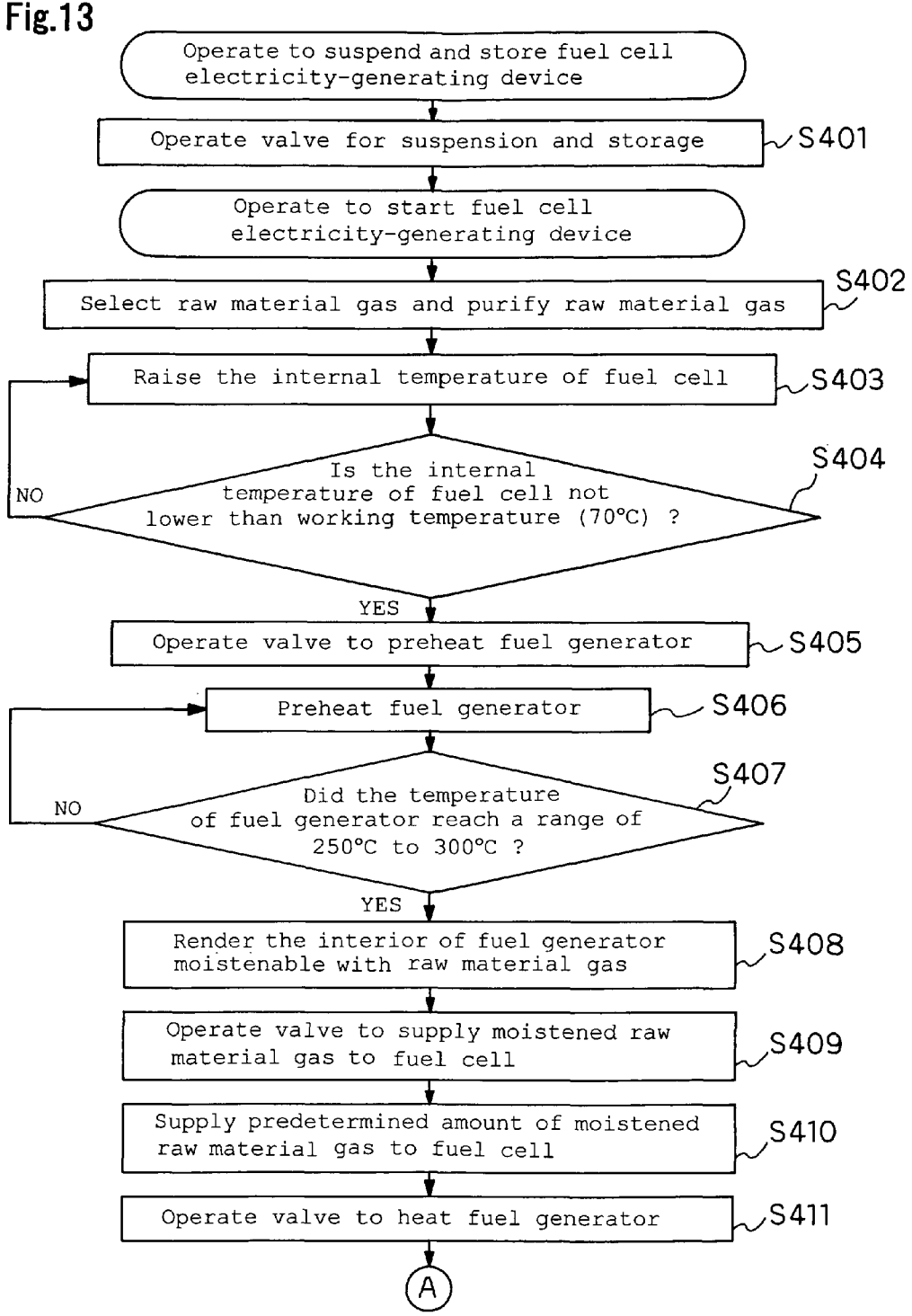
FIG. 13 is a diagram of the former half of a flow chart of explaining a gas supplying operation according to Embodiment 6 of implementation of the present invention.
Figure 14:
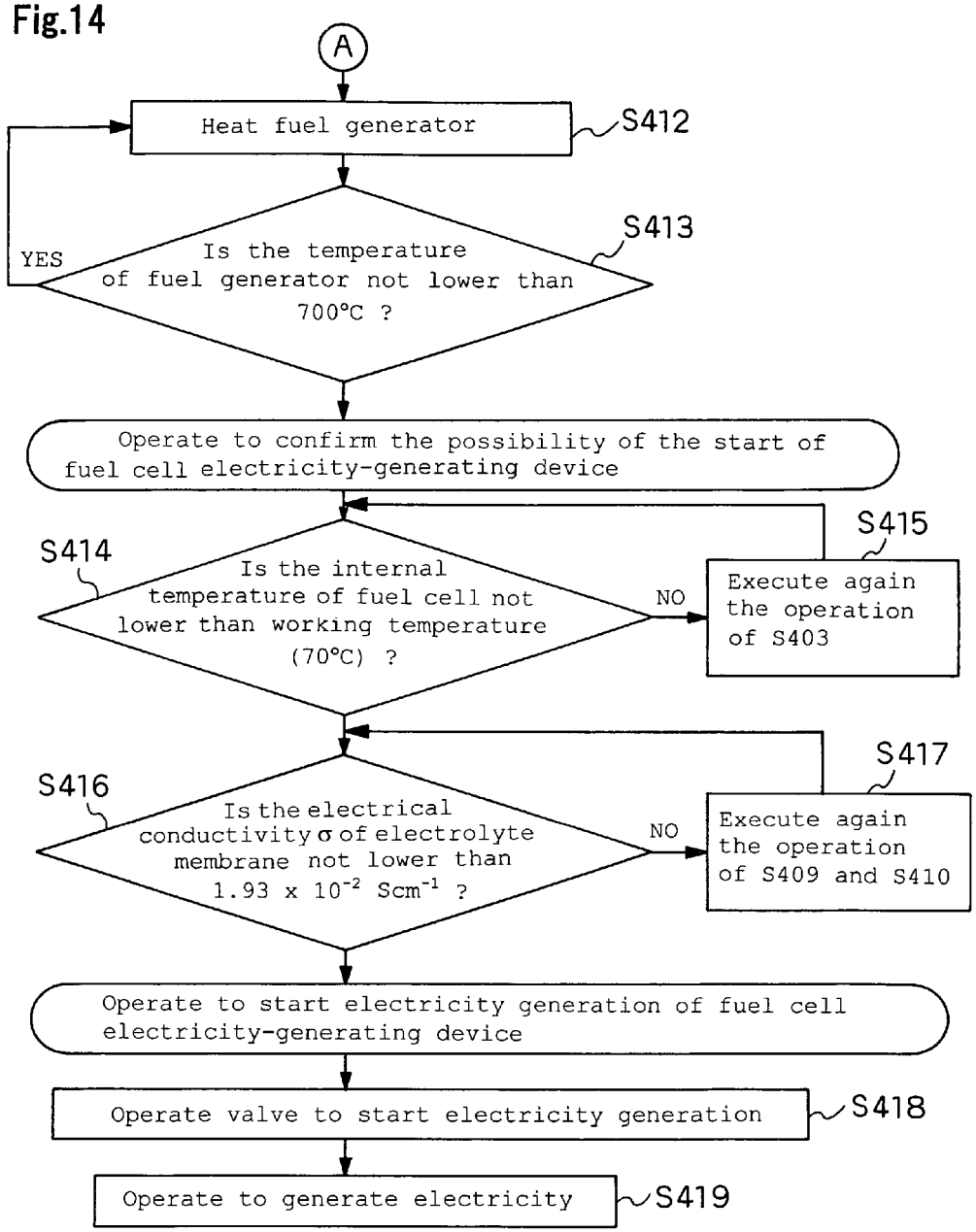
FIG. 14 is diagram of the latter half of a flow chart of explaining a gas supplying operation according to Embodiment 6 of implementation of the present invention.

FIG. 12 is a block diagram illustrating the configuration of the fuel cell electricity-generating device according to Embodiment 1 and FIGS. 13 and 14 each are a flow chart illustrating the operation of gas supply of the fuel cell electricity-generating device of FIG. 12.

The configuration of the fuel cell 121, the first water supplying unit 174, the second water supplying unit 175, the raw material gas supplying unit 122, the fuel generator 123, the humidifier 124, the impedance measuring device 173 the circuit portion 125, the measuring portion 126 and the control portion 127 are the same as described in the basic configuration (see FIG. 10 and FIG. 11).

However, the fuel cell electricity-generating device described below differs from the basic configuration in that the pipe for the introduction of moistened raw material gas to the fuel cell 121, the switching valve therefore, the cut-off valve and the input sensor for the control portion 127 such as mass flow meter are arranged as follows, and the following description will be made focusing on the change of the pipe, the switching valve, the cut-off valve and the input sensor such as mass flow meter.

In FIG. 12, a mass flow meter 170a for the anode 114a of measuring the gas flow rate (hereinafter referred to as "mass flow meter 170a") is disposed along the fuel gas feed pipe 161 shortly after the fuel generator 123. The first switching valve 129 disposed at the anode side inlet 121a of the fuel cell 121 downstream from the mass flow meter 170a is disposed along the fuel gas feed pipe 161 which extends from the fuel generator 123 and connects to the anode side inlet 121a.

Further, the first switching valve 129 is connected to the anode exhaust pipe 147 through the first connecting pipe 164 having the first check valve 141 disposed thereon as in FIG. 11. The position at which the first connecting pipe 164 and the anode exhaust pipe 147 are connected to each other is disposed between the water purifying portion 133 and the second check valve 148.

The second switching valve 142 is disposed along the anode exhaust pipe 147 extending from the anode outlet side 121b to the fuel generator 123, and the first cut-off valve 130 and the second check valve 148 are disposed in this order along the anode exhaust pipe 147 downstream from the second switching valve 142 and upstream from the water purifying portion 133.

Further, the second cut-off valve 131 and the third switching valve 143 are disposed in this order along the oxidizing agent gas feedpipe 162 extending from the humidifier 124 to the cathode side inlet 121c and the fourth switching valve 144 and the third cut-off valve 132 are disposed in this order along the cathode exhaust pipe 160 extending from the cathode side outlet 121d to the humidifier 121.

In addition, the third switching valve 143 is connected to the anode exhaust pipe 147 through the first circulation pipe 145 and the fourth switching valve 144 is connected to the second switching valve 142 through the second circulating pipe 146. The position at which the first circulating pipe 145 and the anode exhaust pipe 147 are connected to each other is disposed between the water purifying portion 133 and the second check valve 148.

Further, the temperature detecting unit 171 (preferably a thermocouple of Pt resistor) which detects the internal temperature of the fuel cell 121 is disposed in the vicinity of substantially central position of the fuel cell 21 as shown in FIG. 12 and embedded in the interior of the electrically-conductive separator 116c of the cathode 114c in the fuel cell unit 120 (see FIG. 10).

Further, in order to measure the resistivity (electrical conductivity) of the electrolyte membrane 111 of the fuel cell 121 as described in detail later, an impedance measuring device 173 connected to the output terminals 172a, 172c is provided.

To the output terminals 172a, 172c is connected the circuit portion 125 where electric power generated in the interior of the fuel cell 121 is withdrawn and the voltage (generated electric power voltage) of the circuit portion 125 is monitored by the measuring portion 126.

Herein, the output signal of the mass flow meter 170a, the output signal of the temperature detecting unit 171 (via the measuring portion 126) and the output signal of the output terminals 172a, 172c (via the impedance measuring device 173) are inputted to the control portion 127. In this manner, the flow rate of the raw material gas is monitored by the control portion 127 on the basis of the output signal of the mass flow meter 170a, the internal temperature of the fuel cell 121 is monitored by the control portion 127 on the basis of the processing signal obtained by processing the output signal of the temperature detecting unit 171 at the measuring portion 126, and the resistivity of the electrolyte membrane 111 is monitored by the control portion 127 on the basis of the processing signal obtained by processing the output signal of the output terminals 172a, 172c by the impedance measuring device 173. Further, the control portion 127 controls the switching operation of the first, second, third and fourth switching valves 129, 142, 143, 144 and the on-off operation of the first, second and third cut-off valves 130, 131, 132 as described later.

The operation of supply of fuel gas and oxidizing agent gas will be described in detail below with reference to the operation of suspension and storage, the operation of starting, the operation of confirming to see if the start of the electricity generation is made possible and the operation of electricity generation of fuel cell electricity-generating device in connection with the block diagram of FIG. 12 and the flow chart of FIGS. 13 and 14.

[Operation of Suspension and Storage of Fuel Cell Electricity-Generating Device]

After the suspension of the fuel cell electricity-generating device 1100, the fuel cell electricity-generating device 1100 is stored over an extended period of time with the interior of the fuel cell 121 kept filled with the raw material gas. Herein, in order to suspend and store the fuel cell electricity-generating device 1100, the switching valves and the cut-off valves are operated as follows (Step S401).

The first cut-off valve 130 connected to the second switching valve 142, the second cut-off valve 131 connected to the third switching valve 143 and the third cut-off valve 132 connected to the third switching valve 144 are each closed.

Under these conditions, the first switching valve 129 is operated to connect the fuel gas feed pipe 161 to the anode exhaust pipe 147 while blocking the fuel gas feed pipe 161 off the anode side inlet 121a. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the first circulating pipe 145. Further, the fourth switching valve 144 is operated to connect the cathode side outlet 121d to the third cut-off valve 132 while blocking the cathode side outlet 121d off the second circulating pipe 146.

It is thus assured that the fuel gas and the oxidizing agent gas can be enclosed in the interior of the fuel cell 21. The interior of the fuel cell 21 is kept not higher than the working temperature of the fuel cell (70° C.), normally around room temperature (about 20° C. to 30° C.)

[Operation of Starting of Fuel Cell Electricity-Generating Device]

In order to purge the interior of the fuel cell 121 with moistened raw material gas as described later, the selection of a raw material gas having no adverse effect on the catalyst of the fuel cell 121 and the purification of the raw material are conducted at first (Step S402).

In some detail, for the purpose of adsorbing the platinum catalyst of the fuel cell 121 to the surface to prevent the rise of hydrogen overvoltage, the removal of impurities, particularly sulfur components, from the raw material gas is an indispensable purifying process. In order to select the raw material gas itself, it is necessary that a gas causing no activity inhibition of the platinum catalyst of the fuel cell 121 be selected, and in this respect, any of methane gas, propane gas, butane gas and ethane gas (or mixture thereof) is preferably used.

Subsequently, the temperature of the interior of the fuel cell 121 is raised to the working temperature (70° C.) (Step S403).

As a specific temperature raising method there is used, e.g., a heater (not shown) or stored hot water from cogeneration hot water dispenser (not shown) of the fuel cell electricity-generating device 1100. The internal temperature of the fuel cell 121 is monitored by the control portion 127 on the basis of the detection signal of the temperature detecting unit 171 to control the proper temperature rising operation of the fuel cell 121.

Herein, it is judged to see if the internal temperature of the fuel cell 121 reached the working temperature (70° C.) or more (Step S404), and if the temperature rise is insufficient (No at S404), the temperature rising operation at S403 is continued, and if the internal temperature of the fuel cell 121 reached 70° C. or more (Yes at S404), the process moves to the next step.

Subsequently, in order to pre-heat the interior of the fuel generator 123, the switching valves and the cut-off valves are operated as follows (Step S405).

The first cut-off valve 130 connected to the second switching valve 142, the second cut-off valve 131 connected to the third switching valve 143 and the third cut-off valve 132 connected to the fourth switching valve 144 are each closed.

Under these conditions, the first switching valve 129 is operated to connect the fuel gas feed pipe 161 to the anode exhaust pipe 147 while blocking the fuel gas feed pipe 161 off the anode side inlet 121a. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the first circulating pipe 145. Further, the fourth switching valve 144 is operated to connect the cathode side outlet 121d to the third cut-off valve 132 while blocking the cathode side outlet 121d off the second circulating pipe 146.

In this manner, the gas which has been delivered from the fuel generator 123 and flown through the fuel gas feed pipe 161 is then refluxed through the first connecting pipe 164 (first check valve 141 allows the flow) and the anode exhaust pipe 147 to the combusting portion of the fuel generator 123 where it is then combusted.

In this manner, the fuel generator 123 can be preheated to a predetermined temperature range (a temperature range within which no CO gas is produced from the raw material gas and water vapor and the raw material gas undergoes no carbon precipitation in the fuel generator 123 (reformer 123e)) (Step S406)

The specific range of temperature rise of the fuel generator 123 is 300° C. or less for the following reasons. From the standpoint of most effective heating and moistening of raw material gas, the range of temperature rise is preferably 250° C. or more.

When the temperature of the fuel generator 123 exceeds 640° C., the modification reaction in the fuel generator 123 (reformer 123e) causes the production of hydrogen gas from the raw material gas and water vapor, and if the interior of the fuel cell 21 is purged with such a hydrogen gas, it is likely that local combustion can occur with hydrogen gas in the interior of the fuel cell 21 as electricity generation begins.

When the temperature of the fuel generator 123 (reformer 123e) is 640° C. or less, the modification reaction causes no generation of hydrogen, but when the temperature of the fuel generator 123 ranges from not lower than 500° C. to not higher than 640° C., it is likely that the raw material gas can be carbonized in the fuel generator 123 (reformer 123e) to cause carbon precipitation, and it is thus not preferred that the fuel generator 123 (reformer 123e) be kept at a temperature of not lower than 500° C. In addition, when the temperature of the fuel generator 123 (reformer 123e) is 300° C. or less, there occurs no generation of carbon monoxide, which acts to poison the catalyst of MEA 117, from the raw material gas and water vapor in the fuel generator 123 (reformer 123e).

For the aforementioned reasons, it is desired that the temperature of the fuel generator 123 (reformer 123e) be kept at 300° C. or less and the raw material gas which is moistened at this temperature be used as a purging gas.

The temperature of the fuel generator 123 (reformer 123e) is monitored by the control portion 127 on the basis of the detection signal of the modifying temperature measuring portion (not shown) to make proper temperature rise of the fuel generator 123 (reformer 123e).

Herein, it is judged to see if the temperature of the fuel generator 123 (reformer 123e) rose to a range of from 250° C. to 300° C. (Step S407), and if the temperature rise is insufficient (No at S407), the preheating operation at S406 is continued, and if the temperature of the fuel generator 123 (reformer 123e) rose to a range of from 250° C. to 300° C. (Yes at S407), the process moves to the next step.

After the preheating of the fuel generator 123, the interior of the fuel generator 123 is conditioned such that the raw material gas can be moistened to keep the dew point of the raw material gas supplied from the raw material gas supplying unit 122 not lower than the working temperature of the fuel cell 121 (70° C.) (Step S408). Since the fuel generator 123 has already been heated close to 300° C. and the water required for moistening can be supplied from the second water supplying unit 175 to the fuel generator 123, the heat and water thus obtained make it possible to moisten the raw material gas in the interior of the fuel generator 123.

Subsequently, in order to supply the moistened raw material gas, the switching valves and the cut-off valves are operated as follows (Step S409).

The first cut-off valve 130 connected to the second switching valve 142, the second cut-off valve 131 connected to the third switching valve 143 and the third cut-off valve 132 connected to the fourth switching valve 144 are each closed.

Under these conditions, the first switching valve 129 is operated to block the fuel gas feed pipe 161 off the anode exhaust pipe 147 while connecting the fuel gas feed pipe 161 to the anode side inlet 121a. Further, the second switching valve 142 is operated to block the anode side outlet 121b off the first cut-off valve 130 while connecting the anode side outlet 121b to the second circulating pipe 146. Moreover, the third switching valve 143 is operated to block the cathode side inlet 121c off the second cut-off valve 131 while connecting the cathode side inlet 121c to the first circulating pipe 145. Further, the fourth switching valve 144 is operated to block the cathode side outlet 121d off the third cut-off valve 132 while connecting the cathode side outlet 121d to the second circulating pipe 146.

The aforementioned valve operation is followed by a purging process involving the moistening of the interior of the fuel cell 121 with the moistened raw material gas delivered from the fuel generator 123 which is then introduced to the exterior and hence the substitution of the interior of the fuel cell 121 by the atmosphere of the moistened raw material gas as described below (Step S410).

The raw material gas supplied from the raw material gas supplying unit 122 is purified in the gas purifying portion 122p, and then sent through the raw material gas feed pipe 163 to the fuel generator 123 where it is then moistened. Thereafter, the moistened raw material gas is delivered from the fuel generator 123, allowed to flow through the fuel gas feed pipe 161 and the anode side inlet 121a of the fuel cell 121 to the interior of the fuel cell 121 where the anode 114a is then exposed to the atmosphere of moistened raw material gas, and then delivered through the anode side outlet 121d to the exterior of the fuel cell 121. Subsequently, the second switching valve 142 switches the direction of flow of the moistened raw material gas to the second circulating pipe 146 so that the moistened raw material gas passes through the second circulating pipe 146, and the fourth switching valve 144 switches the direction of low of the moistened raw material gas to the fuel cell cathode side outlet 121d so that the moistened raw material gas then flows again into the interior of the fuel cell 121. In this manner, the cathode 114c is exposed to an atmosphere of moistened raw material gas and the raw material gas is delivered from the cathode side inlet 121c and then again flows out of the fuel cell 121.

Thereafter, the third switching valve 143 switches the direction of flow of the raw material gas to the first circulating pipe 145 so that the raw material gas reaches the anode exhaust pipe 147. The raw material gas which has reached the anode exhaust pipe 147 is prevented from flowing backward by the first and second check valves 141, 148, introduced toward the water purifying portion 133 where the moistened raw material gas is then freed of water, and then sent to the combusting portion of the fuel generator 123.

In some detail, as shown by the solid line in FIG. 12, the moistened raw material gas passes through the anode side inlet 121a and the anode side outlet 121b and the cathode side outlet 121d and the cathode side inlet 121c of the fuel cell 121 in this order, flows annularly around the fuel cell 121, and then reaches the anode exhaust pipe 147. The fuel gas supplied to the combusting portion is combusted in the interior of the combusting portion and the heat generated by this combustion is used to heat the fuel generator 123.

The total supplied amount of moistened raw material gas needs to be at least three times the volume of the inner space of the fuel cell 121 that can be filled by gas, and if the volume that can be filled by gas is 1.0 L for example, the moistened raw material gas may be supplied into the interior of the fuel cell 121 at a flow rate of 1.5 L/min for about 5 minutes, and this total supplied amount of moistened raw material gas is monitored by the control portion 127 on the basis of the output signal of the mass flow meter 170a.

In this manner, the interior of the fuel cell 121 can be exposed to the moistened raw material gas for the transition period between suspension and electricity generation of the fuel cell 121, making it possible to moisten the electrolyte membrane 111 of the fuel cell 121 which has been dried during suspension and storage and prevent local combustion of fuel gas with oxygen gas which possibly entered the interior of the fuel cell 121 during suspension and storage.

Further, since it is arranged such that the moistened raw material gas is introduced into the interior of the fuel cell 121 for the transition period between suspension and electricity generation of the fuel cell 121, the interior of the fuel cell 121 can be prevented from being exposed to an atmosphere of moistened raw material gas over an extended period of time, making it possible to prevent the loss of water repellency of the electrode of the fuel cell.

In addition, since if the oxygen gas which has entered the anode 114a during suspension and storage of the fuel cell 121 remains, it causes elution of ruthenium that impairs the catalytic action, the raw material gas supplying method involving the use of the feed path of moistened raw material gas from the anode 114a to the cathode 114c for the purpose of preferentially excluding oxygen gas from the anode 114a, which can be easily oxidized and deteriorated, is reasonable from the standpoint of prevention of deterioration of catalyst.

Further, the use of the single moistened raw material gas feed path shown with a solid line in FIG. 12 makes it possible to moisten both the anode 114a and the cathode 114c and hence simplify the gas feed pipe.

After sufficiently supplying the moistened raw material gas into the interior of the fuel cell 121, the switching valves and the cut-off valves are operated in the following manner (Step S411) to make acceleration of heating of the fuel generator 123 of the fuel cell electricity-generating device 1100 by which the internal temperature of the fuel generator 123 (reformer 123e) is rapidly raised to the value at which the modification reaction of the formula (4) can occur (about 640° C. or more)

The first cut-off valve 130 connected to the second switching valve 142, the second cut-off valve 131 connected to the third switching valve 143 and the third cut-off valve 132 connected to the third switching valve 144 are each closed.

Under these conditions, the first switching valve 129 is operated to connect the fuel gas feed pipe 161 to the anode exhaust pipe 147 while blocking the fuel gas feed pipe 161 off the anode side inlet 121a. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the first circulating pipe 145. Further, the fourth switching valve 144 is operated to connect the cathode side outlet 121d to the third cut-off valve 132 while blocking the cathode side outlet 121d off the second circulating pipe 146.

In this manner, the gas delivered from the fuel generator 123 to the fuel gas feed pipe 161 is refluxed through the first connecting pipe 164 (first check valve 141 allows the flow) and the anode exhaust pipe 147 to the combusting portion of the fuel generator 123 where it is then combusted. In this manner, the fuel generator 123 is heated to a predetermined temperature range (temperature range where the modification reaction causes the production of hydrogen gas from the raw material gas and water vapor; 640° C. or more) (Step S412).

Herein, it is judged to see if the temperature of the fuel generator 123 (reformer 123e) rose to 640° C. or more (Step S413), and if the temperature rise is insufficient (No at S413), the heating operation at S412 is continued, and if the temperature of the fuel generator 123 (reformer 123e) rose to 640° C. or more (Yes at S413), the process moves to the next step.

[Operation of Confirming the Possibility of the Start of the Electricity Generation of Fuel Cell Electricity-Generating Device]

After raising the temperature of the interior of the fuel cell 123 to 640° C. or more, the internal temperature of the fuel cell 121 and the electrical conductivity of the electrolyte membrane 11 of the fuel cell 21 are then confirmed to judge to see if the electricity generation of the fuel cell electricity-generating device 1100 may be started.

In the first confirming operation, it is judged to see if the internal temperature of the fuel cell 121 is not lower than the working temperature (70° C.) (Step S414), and if the temperature rise is insufficient (No at S414), the temperature raising operation at S404 is executed again, and if the temperature of the fuel cell 121 is 70° C. or more (Yes at S414), the process moves to the next step in the second confirming operation, the electrical conductivity of the electrolyte membrane 111 of the fuel cell 121 is determined, and it is then judged to see if this electrical conductivity a is not smaller than $1.93 \times 10^{-2}$ Scm$^{-1}$ (Step S416), and if this electrical conductivity σ is less than $1.93 \times 10^{-2}$ Scm$^{-1}$ (No at Step S416), it is then judged that the electrolyte membrane 111 is under-moistened, and the operation at S409 and S410 are executed again (Step S417), and if this electrical conductivity a is not smaller than $1.93 \times 10^{-2}$ Scm$^{-1}$ (Yes at Step S416), the process then moves to the next step.

Herein, the method of calculating the electrical conductivity of the electrolyte membrane and the relationship between the electrical conductivity and the relative humidity of the electrolyte membrane will be described in connection with the drawings.

Figure 15:
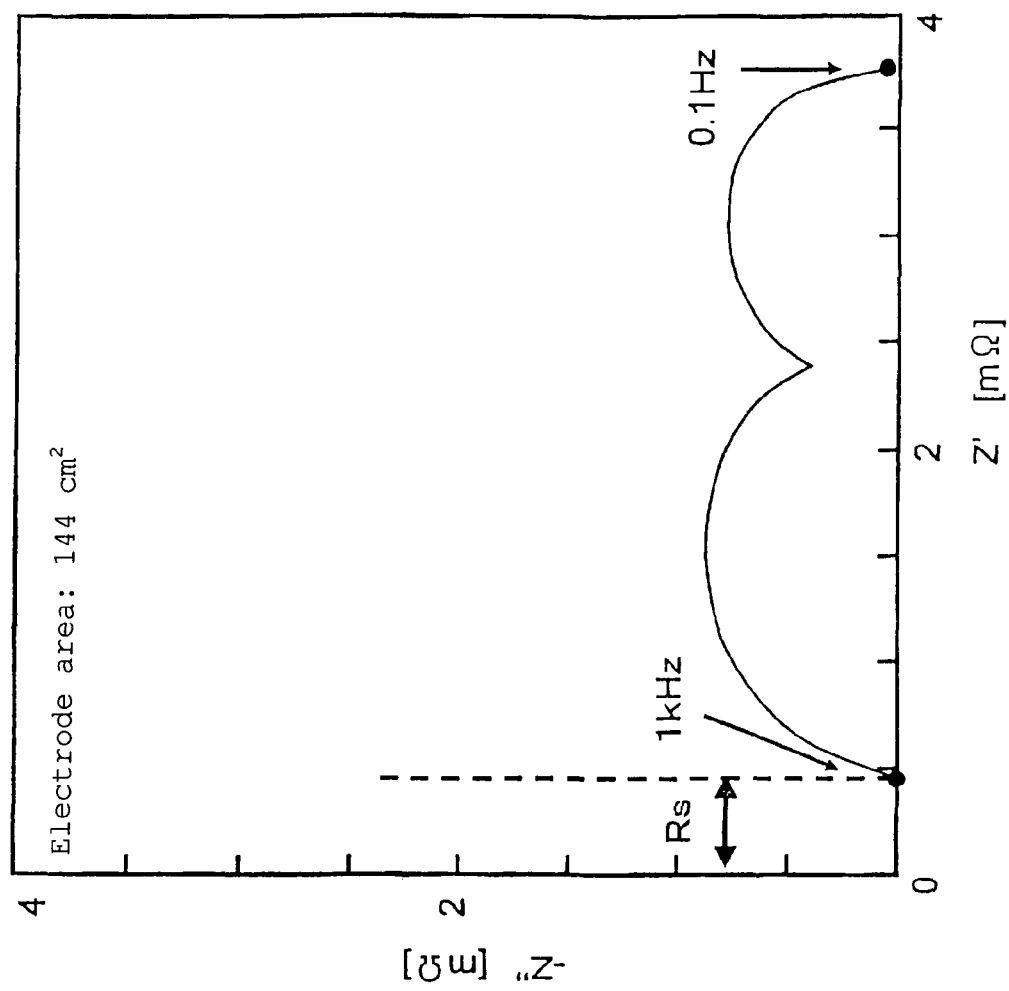
FIG. 15 is a profile diagram of ac impedance of fuel cell measured at a frequency varying from 0.1 Hz to 1 kHz applied thereto.

FIG. 15 depicts an ac impedance profile diagram of the fuel cell 121 (electrode area: 144 cm$^2$) measured with an ac current the frequency of which varies from 0.1 Hz to 1 kHz shown with real resistivity component Z' plotted as abscissa and reactance component Z" plotted as ordinate (impedance measurement by ac method). As estimated in FIG. 15, since the ac impedance profile crosses the abscissa (Z') at ac current having a frequency of 1 kHz, the impedance at ac current having a frequency of 1 kHz indicates the resistivity Rs of the electrolyte membrane 111. In other words, FIG. 15 is a schematic diagram of so-called Cole-Cole plot of measurement of ac impedance, and in this case, the one of intersections of semicircle with abscissa having a smaller resistivity (Rs shown in FIG. 15) means the resistivity of the electrolyte membrane 11.

A measuring ac voltage (1 kHz) from the impedance measuring device 173 is applied to the output terminals 172a, 172c of the fuel cell 121 connected to the impedance measuring device 173 (see FIG. 12) controlled by the control portion 127. The electrical conductivity of the electrolyte membrane 111 can be estimated on the basis of the ac impedance of the electrolyte membrane 111 of the fuel cell 121 thus obtained. In some detail, the electrical conductivity of the electrolyte membrane 111 is calculated from the measurements of ac impedance made by applying ac voltage (1 kHz) to the fuel cell 121 every 110 units for example and the thickness and area of the electrolyte membrane 111.

Figure 16:
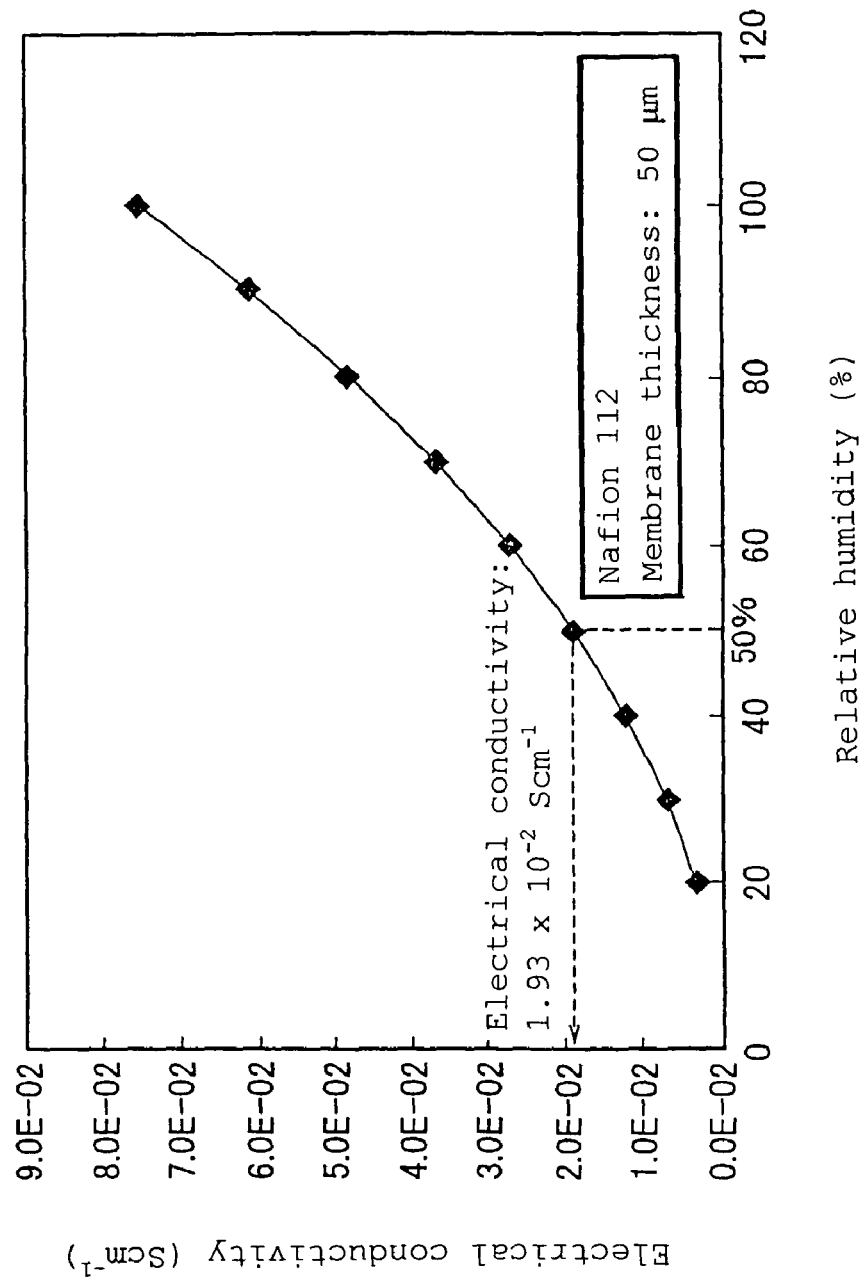
FIG. 16 is a diagram illustrating the relationship between the relative humidity and the electrical conductivity of electrolyte membrane.

When the electrical conductivity σ obtained by this calculation method is not smaller than $1.93 \times 10^{-2}$ Scm$^{-1}$, it can be judged for the following reasons on the basis of FIG. 16 that the fuel cell 121 is capable of starting electricity generation.

FIG. 16 depicts the relationship between the relative humidity of the polymer electrolyte membrane (Nafion 112 electrolyte membrane of Du Pont Inc. of USA; thickness: 50 μm) plotted as abscissa and the electrical conductivity of the electrolyte membrane plotted as ordinate in the case where the temperature of the electrolyte membrane 11 is kept at 80° C. and describes how the electrical conductivity of the electrolyte membrane depends on the relative humidity of the electrolyte membrane.

As observed in FIG. 16, there is a tendency that as the electrolyte membrane is dried, the electrical conductivity of the electrolyte membrane gradually approaches zero (relative humidity: close to 20%) while the humidity of the electrolyte membrane increases, the electrical conductivity of the electrolyte membrane, too, increases monotonously. Herein, if the relative humidity of the electrolyte membrane having a sufficient water retention is considered to be 50%, the electrical conductivity σ corresponding to this relative humidity is $1.93 \times 10^{-2}$ Scm$^{-1}$ from the standpoint of performance of electrolyte membrane.

Accordingly, the electrical conductivity of the electrolyte membrane ($\sigma = 1.93 \times 10^{-2}$ Scm$^{-1}$ in the case of Nafion 112 electrolyte membrane by way of example) can be thus used as a simple index for the determination of water retention of the electrolyte membrane and it can be said that the possibility of starting of electricity generation of the fuel cell 121 can be predicted on the basis of electrical conductivity.

Thus, in addition to the judgment of the time of starting of electricity generation of a fuel cell having a suspension period and an electricity generation period on the basis of the temperature of the fuel cell, a judgment on the basis of the electrical conductivity of the electrolyte membrane of the fuel cell unit is executed, making it possible to accurately predict the water retention of the electrolyte membrane and hence enhance the reliability of judgment of the time of starting of electricity generation of the fuel cell electricity-generating device.

[Operation of Electricity Generation of Fuel Cell Electricity-Generating Device]

After the reaching of the numerical value of the aforementioned confirmation operation to a predetermined value (in some detail, the temperature of the fuel cell 121 is 70° C. or more and the electrical conductivity σ of the electrolyte membrane is $1.93 \times 10^{-2}$ Scm$^{-1}$ or more), the switching valves and the cut-off valves are then operated in the following manner to cause the fuel cell 121 to generate electricity (Step S418 and Step S419).

The first cut-off valve 130 connected to the second switching valve 142, the second cut-off valve 131 connected to the third switching valve 143 and the third cut-off valve 132 connected to the fourth switching valve 144 are all opened.

Under these conditions, the first switching valve 129 is operated to block the fuel gas feed pipe 161 off the anode exhaust pipe 147 while connecting the fuel gas feed pipe 161 to the anode side inlet 121a. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the first circulating pipe 145. Further, the fourth switching valve 144 is operated to connect the cathode side outlet 121d to the third cut-off valve 132 while blocking the cathode side outlet 121d off the second circulating pipe 146.

The aforementioned operation of the switching valves and the cut-off valves causes the hydrogen-rich fuel gas delivered from the fuel generator 123 through the fuel gas feed pipe 161 to be introduced into the anode side inlet 121a of the fuel cell 121 and delivered from the anode side outlet 121b and the remaining fuel gas which has not been consumed in the anode 114a to be refluxed to the fuel generator 123 of the fuel cell 121 through the anode exhaust pipe 147.

On the other hand, the moistened raw material gas (moistened oxidizing agent gas) delivered from the humidifier 123 through the oxidizing agent gas feed pipe 162 is introduced into the cathode side inlet 121c of the fuel cell 121 while the remaining oxidizing agent gas which has been delivered from the cathode side outlet 121d but has not been consumed in the cathode 114c is refluxed to the humidifier 124 of the fuel cell 121 through the cathode exhaust pipe 160.

In this manner, the fuel gas is supplied into the anode 114a while the oxidizing agent gas is supplied into the cathode 114c, whereby hydrogen ion and electron are produced in the interior of the fuel cell 121 and current can be withdrawn at the circuit portion 125 through the output terminals 172a, 172c, and the generated electric power voltage is monitored at the measuring portion 126.

Embodiment 7

Another example of the configuration of the gas supplying system of the fuel cell electricity-generating device 1100 arranged such that the interior of the fuel cell 121 is exposed to moistened raw material gas during the transition period between suspension period and electricity generation period will be described below, and an embodiment of the starting method of the fuel cell of the present invention will be thus described.

Figure 17:
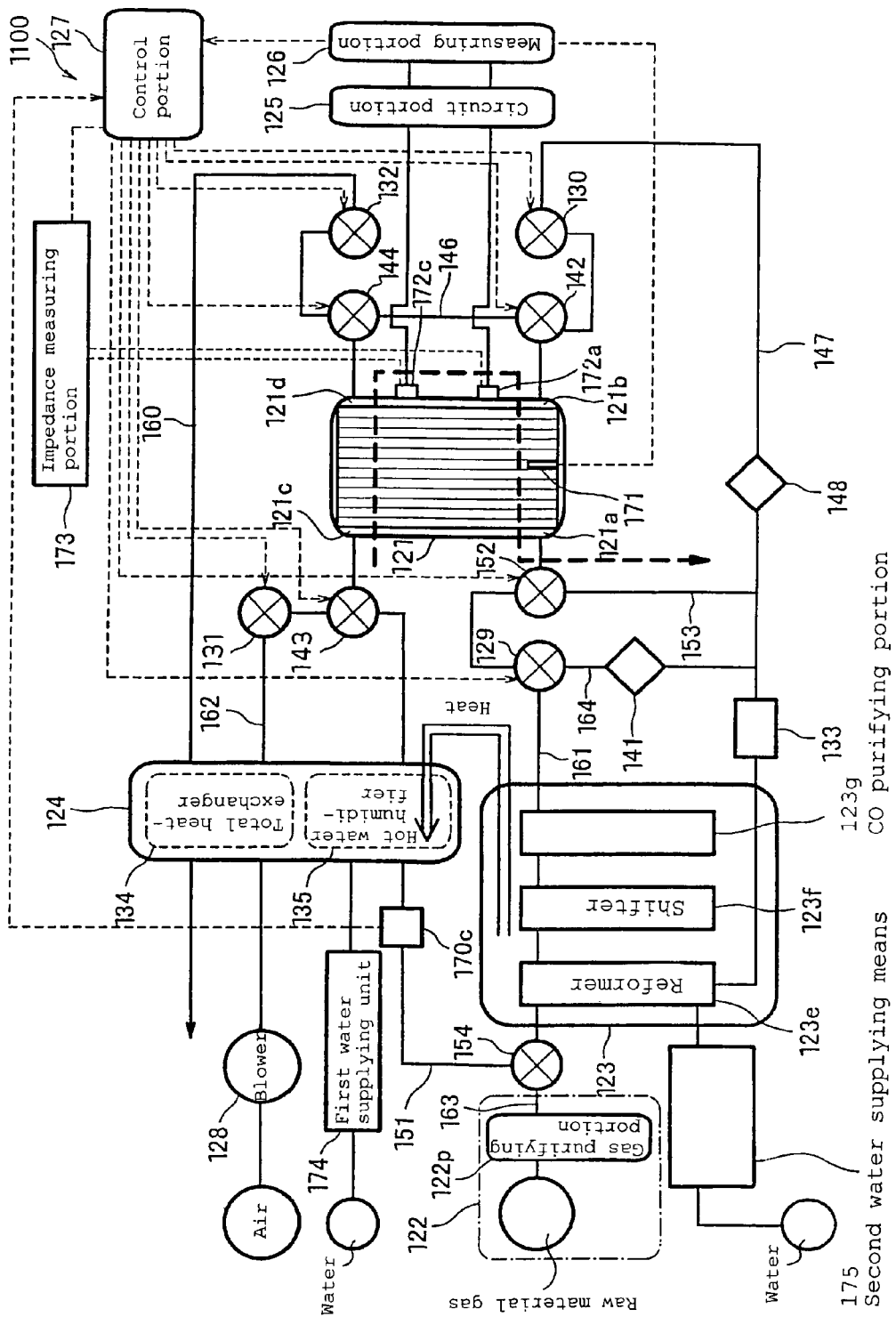
FIG. 17 is a block diagram illustrating the configuration of the fuel cell electricity-generating device according to Embodiment 7 of implementation of the present invention.

FIG. 17 is a block diagram illustrating the configuration of the fuel cell electricity-generating device according to Embodiment 7.

The configuration of the fuel cell 121, the first water supplying unit 174, the second water supplying unit 175, the raw material gas supplying unit 122, the fuel generator 123, the humidifier 124, the impedance measuring device 173, the circuit portion 125, the measuring portion 126 and the control portion 127 are the same as described in Embodiment 6.

However, Embodiment 7 differs from Embodiment 6 (FIG. 12) in that the disposition of the pipe for the introduction of moistened raw material gas to the fuel cell 121, the switching valve therefore, the cut-off valve and the mass flow meter are changed as follows, and the following description will be made focusing on the change of the pipe, the switching valve, the cut-off valve and the mass flow meter.

The first circulating pipe 145 connecting between the third switching valve 143 and the anode exhaust pipe 147 shown in FIG. 12 is removed. Further, a sixth switching valve 154 is disposed shortly after the outlet of the gas purifying portion 122p, whereby switching is made to the case where the purified raw material gas is sent to the humidifier 124 (raw material gas branched pipe 151) or the case where the purified raw material gas is sent to the fuel generator 123. In addition, a raw material gas branched pipe 151 extending through the interior of the humidifier 124 and connecting between the third switching valve 143 and the sixth switching valve 154 is provided. Further, a fifth switching valve 152 is additionally provided along the fuel gas feed pipe 161 connecting to downstream from the first switching valve 129 and upstream from the anode side inlet 121a of the fuel cell 121 and a second connecting pipe 153 connecting between the fifth switching valve 152 and the anode exhaust pipe 147 is provided. The position at which the second connecting pipe 153 and the anode exhaust pipe 147 are connected to each other is disposed between the second check valve 148 and the water purifying portion 133. Further, the mass flow meter 170a (see FIG. 12) is removed and a mass flow meter 170c of cathode 114c of measuring the gas flow rate (hereinafter referred to as "mass flow meter 170c") is disposed along the raw material gas branched pipe 151 between the humidifier 124 and the third switching valve 143.

Figure 18:
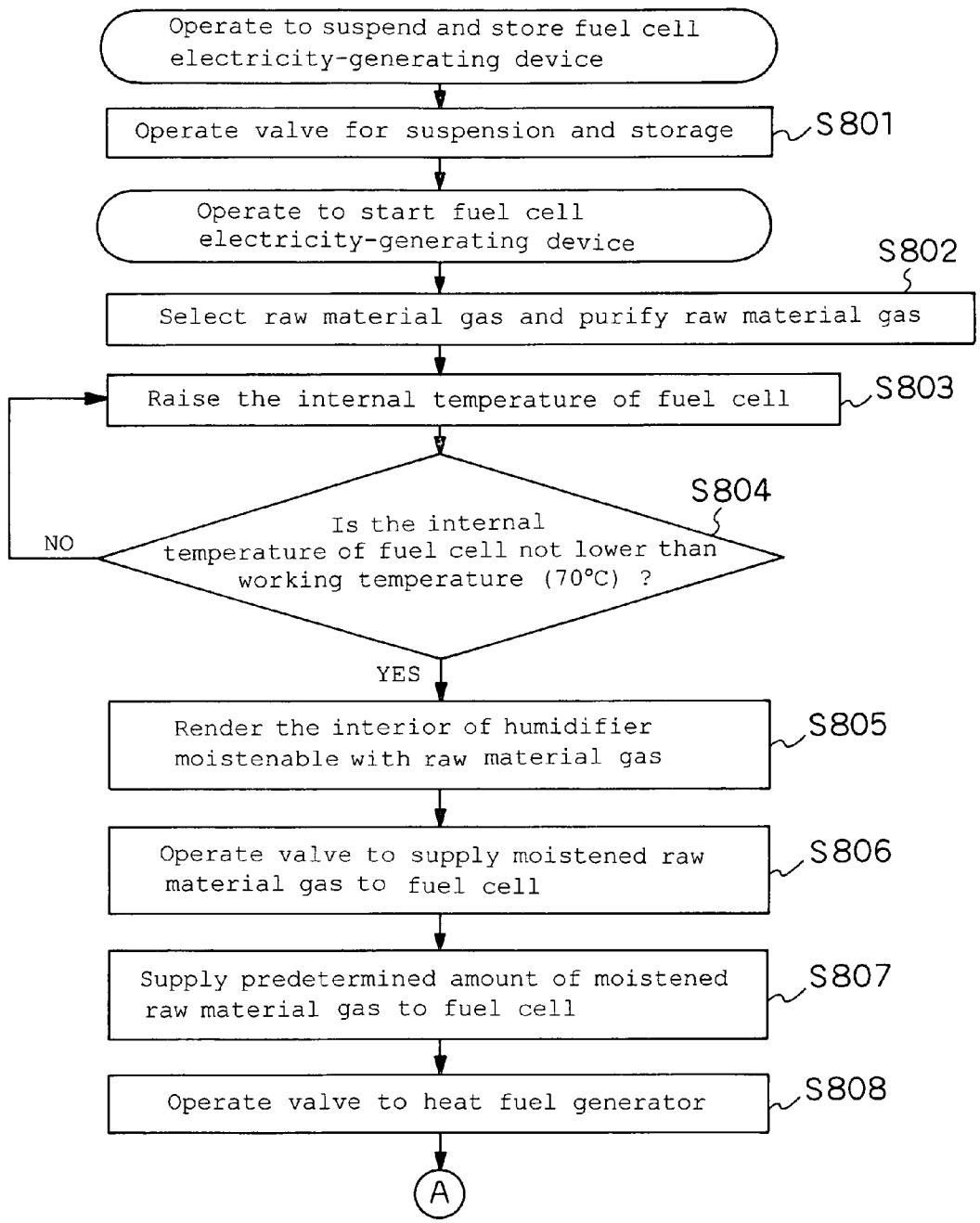
FIG. 18 is a diagram of the former half of a flow chart of explaining a gas supplying operation according to Embodiment 7 of implementation of the present invention.
Figure 19:
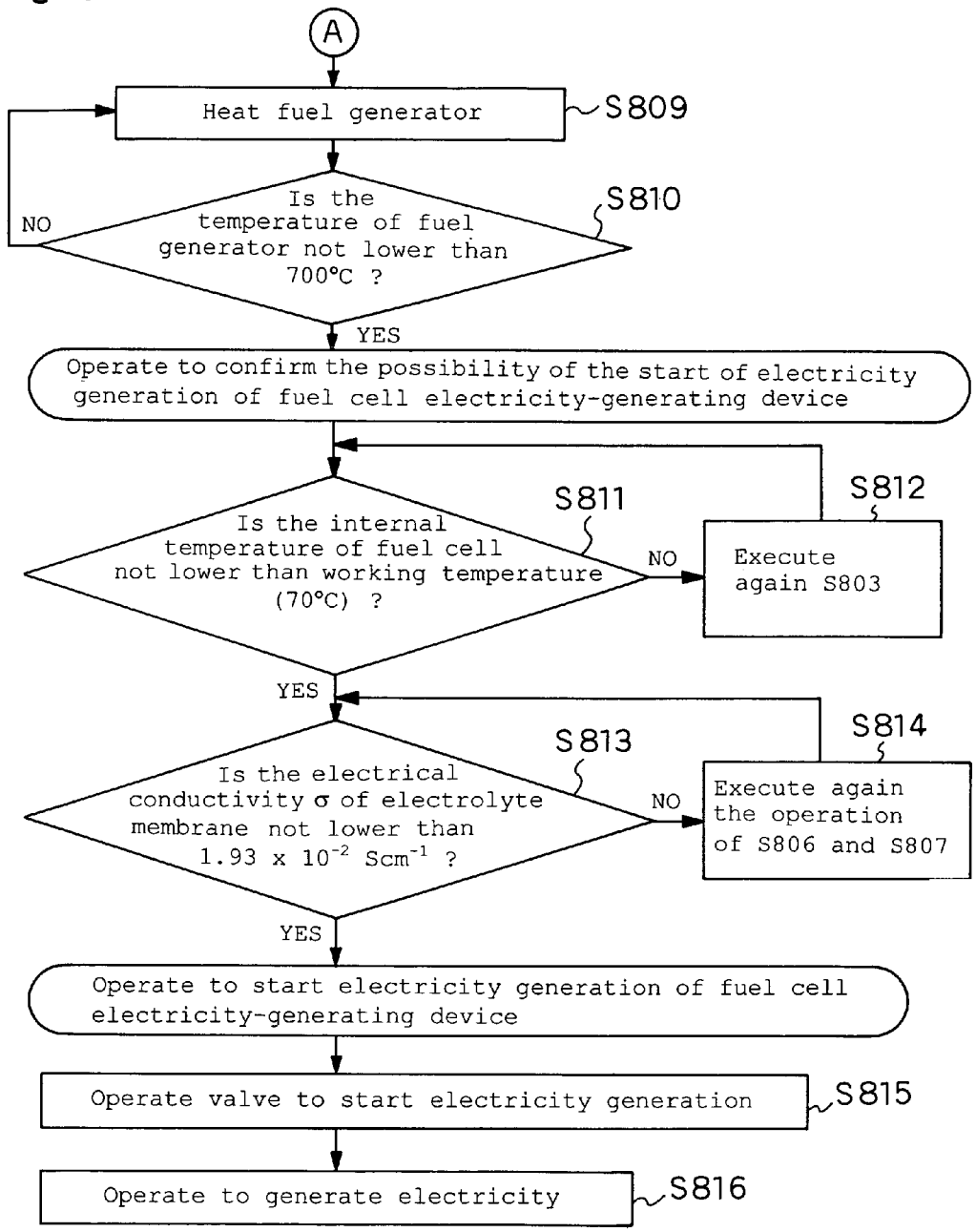
FIG. 19 is a diagram of the latter half of a flow chart of explaining a gas supplying operation according to Embodiment 7 of implementation of the present invention.

The operation of supply of fuel gas and oxidizing agent gas will be described in detail below with reference to the operation of suspension and storage, the operation of starting, the operation of confirming to see if the start of the electricity generation is made possible and the operation of electricity generation in connection with the block diagram of FIG. 17 and the flow chart of FIG. 18 and FIG. 19.

[Operation of Suspension and Storage of Fuel Cell Electricity-Generating Device]

After the suspension of the fuel cell electricity-generating device, the fuel cell electricity-generating device is stored over an extended period of time with the interior of the fuel cell 121 kept filled with the raw material gas. Herein, in order to suspend and store the fuel cell electricity-generating device 1100, the switching valves and the cut-off valves are operated as follows (Step S801).

The first cut-off valve 130 connected to the second switching valve 142, the second cut-off valve 131 connected to the third switching valve 143 and the third cut-off valve 132 connected to the third switching valve 144 are each closed.

Under these conditions, the first switching valve 129 is operated to connect the fuel gas feed pipe 161 to the fifth switching valve 152 while blocking the fuel gas feed pipe 161 off the anode exhaust pipe 147. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the raw material gas branched pipe 151. Further, the fourth switching valve 144 is operated to connect the cathode side outlet 121d to the third cut-off valve 132 while blocking the cathode side outlet 121d off the second circulating pipe 146. In addition, the fifth switching valve 152 is operated to connect the anode side inlet 121a to the first switching valve 129 while blocking the anode side inlet 121a off the anode exhaust pipe 127.

It is thus assured that the fuel gas and the oxidizing agent gas can be enclosed in the interior of the fuel cell 121. The internal temperature of the fuel cell 121 is normally close to room temperature (from about 20° C. to 30° C.) and this is kept lower than the working temperature of the fuel cell (70° C.).

[Operation of Starting of Fuel Cell Electricity-Generating Device]

At first, the selection of a raw material gas having no adverse effect on the catalyst of the fuel cell 121 and the purification of the raw material are conducted (Step S802). The contents of the method of purifying the raw material gas and the selection of raw material gas are the same as in Embodiment 6.

Subsequently, the temperature of the interior of the fuel cell 121 is raised to the working temperature (70° C.) (Step S803). The method of raising the internal temperature of the fuel cell 121 is the same as described in Embodiment 6.

Herein, it is judged to see if the internal temperature of the fuel cell 121 reached the working temperature (70° C.) or more (Step S804), and if the temperature rise is insufficient (No at S804), the temperature rising operation at S803 is continued, and if the internal temperature of the fuel cell 121 reached 70° C. or more (Yes at S804), the process moves to the next step.

Subsequently, the water supplied from the first water supplying unit 174 to the humidifier 124 and the heat given by the fuel generator 123 to the humidifier 124 are used to condition the system such that the raw material gas can be moistened in the interior of the humidifier 124 (Step S805).

In some detail, although the moistening of the raw material gas requires hot water, the humidifier 124 has no combustor as a heat source, requiring that heat be properly obtained from the exterior of the humidifier 124. In Embodiment 7, as the line of heat supply from the fuel generator 123 to the humidifier 124 is shown by a double line in FIG. 17, the heat generated in the combustor of the fuel generator 123 is given to the humidifier 124 to raise the temperature of the humidifier 124.

Subsequently, the various cut-off valves and switching valves are operated in the following manner to supply the moistened raw material gas into the interior of the fuel cell 121 (Step S806).

The first cut-off valve 130 connected to the second switching valve 142, the second cut-off valve 131 connected to the third switching valve 143 and the third cut-off valve 132 connected to the third switching valve 144 are each closed.

Under these conditions, the second switching valve 142 is operated to block the anode side outlet 121b off the first cut-off valve 130 while connecting the anode side outlet 121b to the second circulating pipe 146. Further, the third switching valve 143 is operated to connect the cathode side inlet 121c to the raw material gas branched pipe 151 while blocking the cathode side inlet 21c off the cut-off valve 131. Moreover, the fourth switching valve 144 is operated to block the cathode side outlet 121d off the second cut-off valve 131 while connecting the cathode side outlet 121d to the second circulating pipe 146. In addition, the fifth switching valve 152 is operated to block the anode side inlet 121a off the first switching valve 129 while connecting the anode side inlet 121a to the anode exhaust pipe 147. Further, the sixth switching valve 154 is operated to connect the gas purifying portion 122p to the raw material gas branched pipe 151 while blocking the gas purifying portion 122p off the fuel generator 123.

In this manner, the purified raw material gas is supplied into the interior of the fuel cell 121 through the following routes (Step S807) to perform purging by which the interior of the fuel cell 121 is substituted by an atmosphere of moistened raw material gas.

The raw material gas which has been supplied from the raw material gas supplying unit 122 and then purified in the gas purifying portion 122p is passed through the raw material gas feed pipe 163, directed toward the raw material branched pipe 151 by the sixth switching valve 154, and then allowed to flow through the raw material gas branched pipe 151 into the humidifier 124 where it is then moistened (hot water humidifier to be accurate).

Subsequently, the moistened raw material gas is switched by the third switching valve 143 in its flow direction toward the cathode side inlet 121c of the fuel cell 121 so that it flows into the interior of the fuel cell 121. In this manner, the cathode 114c is exposed to an atmosphere of moistened raw material gas, and the moistened raw material gas is then allowed to flow out from the cathode side outlet 121d.

The moistened raw material gas is switched by the fourth switching valve 144 in its flow direction toward the second circulating pipe 146 so that it flows through the second circulating pipe 146 along one side of the fuel cell 121 and then switched by the second switching valve 142 in its flow direction toward the anode side outlet 121b of the fuel cell 121 so that it flows again into the interior of the fuel cell 121. In this manner, the anode 114a is exposed to an atmosphere of moistened raw material gas, and this moistened raw material gas is then allowed to flow again out from the anode side inlet 121a.

The moistened raw material gas which has again flown out is switched by the fifth switching valve 152 in its flow direction toward the second connecting pipe 153 so that it flows through the second connecting pipe 153 and reaches the anode exhaust pipe 147. The raw material gas which has reached the anode exhaust pipe 147 is prevented by the first and second check valves 141, 148 from flowing backward so that it is introduced toward the water purifying portion 133 where the moistened raw material gas is then freed of water, and then sent to the combusting portion of the fuel generator 123 where it is then combusted.

In other words, as shown by the solid line in FIG. 17, the moistened raw material gas passes through the cathode side inlet 121c, the cathode side outlet 121d, the anode side outlet 121b and the anode side inlet 121a of the fuel cell 121 in this order to flow in U-shaped from around the fuel cell 121 until it reaches the anode exhaust pipe 471. The total supplied amount of moistened raw material gas needs to be at least three times the volume of the inner space of the fuel cell 121 that can be filled by gas, and if the volume that can be filled by gas is 1.0 L for example, the moistened raw material gas may be supplied into the interior of the fuel cell 121 at a flow rate of 1.5 L/min for about 5 minutes, and this total supplied amount of moistened raw material gas is monitored by the control portion 127 on the basis of the output signal of the mass flow meter 70c.

In this manner, the interior of the fuel cell 121 can be exposed to the moistened raw material gas for the transition period between suspension and electricity generation of the fuel cell 121, making it possible to moisten the electrolyte membrane 111 of the fuel cell 21 which has been dried during suspension and storage and prevent local combustion of fuel gas with oxygen gas which possibly entered the interior of the fuel cell 121 during suspension and storage.

Further, since it is arranged such that the moistened raw material gas is introduced into the interior of the fuel cell 121 for the transition period between suspension and electricity generation of the fuel cell 121, the interior of the fuel cell 121 can be prevented from being exposed to an atmosphere of moistened raw material gas over an extended period of time, making it possible to prevent the loss of water repellency of the electrode of the fuel cell 121.

In addition, as shown by the solid line in FIG. 17, both the anode 114a and the cathode 114c can be moistened through a single route, making it possible to simplify the gas feed pipe.

After sufficiently supplying the moistened raw material gas into the interior of the fuel cell 121, the switching valves and the cut-off valves are operated in the following manner to heat the fuel generator 123 (Step S808).

The first cut-off valve 130 connected to the second switching valve 142, the second cut-off valve 131 connected to the third switching valve 143 and the third cut-off valve 132 connected to the fourth switching valve 144 are each closed.

Under these conditions, the first switching valve 129 is operated to connect the fuel gas feed pipe 161 to the anode exhaust pipe 147 while blocking the fuel gas feed pipe 161 off the fifth switching valve 152. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the raw material gas branched pipe 151. In addition, the fourth switching valve 144 is operated to connect the cathode side outlet 121d to the third switching valve 132 while blocking the cathode side outlet 121d off the second circulating pipe 146. Further, the fifth switching valve 152 is operated to connect the anode side inlet 121a to the first switching valve 129 while blocking the anode side inlet 121a off the anode exhaust pipe 147.

Further, the sixth switching valve 154 is operated to connect the gas purifying portion 122p to the fuel generator 123 while blocking the gas purifying portion 122p off the raw material gas branched pipe 151.

Since the aforementioned valve operation can be followed by a process which comprises switching the flow direction of the gas delivered from the fuel generator 123 by the first switching valve 129 so that it passes through the first connecting pipe 164 and the anode exhaust pipe 147 (first check valve 141 allows the flow) to the water purifying portion 133 where it is freed of water and is then refluxed to the fuel generator 123 where it is then combusted in the combusting portion thereof, the fuel generator 123 can be rapidly heated (Step S809), making it possible to raise the internal temperature of the fuel generator 123 (reformer 123e) to a value at which the modification reaction of the formula (4) can occur (about 640° C. or more).

Herein, it is judged to see if the temperature of the fuel generator 123 rose to 640° C. or more (Step S810), and if the temperature rise is insufficient (No at S810), the heating operation at S809 is continued, and if the temperature of the fuel generator 123 rose to 640° C. or more (Yes at S810), the process moves to the next step.

[Operation of Confirming the Possibility of the Start of the Electricity Generation of Fuel Cell Electricity-Generating Device]

After raising the temperature of the fuel generator 123 to 640° C. or more, the internal temperature of the fuel cell 121 and the electrical conductivity of the electrolyte membrane 111 of the fuel cell 121 are then confirmed to judge to see if the electricity generation of the fuel cell electricity-generating device 1100 may be started.

In the first confirming operation, it is judged to see if the internal temperature of the fuel cell 121 is not lower than the working temperature (70° C.) (Step S811), and if the temperature rise is insufficient (No at S811), the temperature raising operation at S803 is executed again (Step S812), and if the temperature of the fuel cell 121 is 70° C. or more (Yes at S811), the process moves to the next step.

In the second confirming operation, the electrical conductivity of the electrolyte membrane 111 of the fuel cell 121 is determined, and it is then judged to see if this electrical conductivity $\sigma$ is not smaller than $1.93 \times 10^{-2}$ Scm$^{-1}$ (Step S813), and if this electrical conductivity $\sigma$ is less than $1.93 \times 10^{-2}$ Scm$^{-1}$ (No at Step S813), it is then judged that the electrolyte membrane 111 is undermoistened, and the operation at S806 and S807 are executed again (Step S814), and if this electrical conductivity $\sigma$ is not smaller than $1.93 \times 10^{-2}$ Scm$^{-1}$ (Yes at Step S813), the process then moves to the next step. The method of measuring the electrical conductivity of the electrolyte membrane and the relationship between the electrical conductivity and the relative humidity of the electrolyte membrane are the same as described in Embodiment 6.

Thus, in addition to the judgment of the time of starting of electricity generation of a fuel cell having a suspension period and an electricity generation period on the basis of the temperature of the fuel cell, a judgment on the basis of the electrical conductivity of the electrolyte membrane of the fuel cell unit is executed, making it possible to accurately predict the water retention of the electrolyte membrane and hence enhance the reliability of judgment of the time of starting of electricity generation of the fuel cell electricity-generating device.

[Operation of Electricity Generation of Fuel Cell Electricity-Generating Device]

After the reaching of the numerical value of the aforementioned confirmation operation to a predetermined value (in some detail, the temperature of the fuel cell 121 is 70° C. or more and the electrical conductivity $\sigma$ of the electrolyte membrane is $1.93 \times 10^{-2}$ Scm$^{-1}$ or more), the switching valves and the cut-off valves are then operated in the following manner to cause the fuel cell 121 to generate electricity (Step S815 and Step S816).

The first cut-off valve 130 connected to the second switching valve 142, the second cut-off valve 131 connected to the third switching valve 143 and the third cut-off valve 132 connected to the fourth switching valve 144 are all opened.

Under these conditions, the first switching valve 129 is operated to block the fuel gas feed pipe 161 off the anode exhaust pipe 147 while connecting the fuel gas feed pipe 161 to the fifth switching valve 152. Further, the second switching valve 142 is operated to connect the anode side outlet 121b to the first cut-off valve 130 while blocking the anode side outlet 121b off the second circulating pipe 146. Moreover, the third switching valve 143 is operated to connect the cathode side inlet 121c to the second cut-off valve 131 while blocking the cathode side inlet 121c off the raw material gas branched pipe 151. Further, the fourth switching valve 144 is operated to connect the cathode side outlet 121d to the third cut-off valve 132 while blocking the cathode side outlet 121d off the second circulating pipe 146. In addition, the fifth switching valve 152 is operated to connect the anode side inlet 121a to the first switching valve 129 while blocking the anode side inlet 121a off the anode exhaust pipe 147. Further, the sixth switching valve 154 is operated to connect the gas purifying portion 122p to the fuel generator 123 while blocking the gas purifying portion 122p off the raw material gas branched pipe 151.

The aforementioned operation of the switching valves and the cut-off valves causes the hydrogen-rich fuel gas to be introduced from the fuel generator 123 through the fuel gas feed pipe 161 into the anode side inlet 121a of the fuel cell 121 and delivered from the anode side outlet 121b and the remaining fuel gas which has not been consumed in the anode 114a to be refluxed to the fuel generator 123 of the fuel cell 121 through the anode exhaust pipe 147.

On the other hand, the moistened air (moistened oxidizing agent gas) delivered from the humidifier 123 through the oxidizing agent gas feed pipe 162 is introduced into the cathode side inlet 121c of the fuel cell 121 while the remaining oxidizing agent gas which has been delivered from the cathode side outlet 121d but has not been consumed in the cathode 114c is refluxed to the humidifier 124 of the fuel cell 121 through the cathode exhaust pipe 160.

In this manner, the fuel gas is supplied into the anode 114a while the oxidizing agent gas is supplied into the cathode 114c, whereby hydrogen ion and electron are produced in the interior of the fuel cell 121 and current can be withdrawn at the circuit portion 125 through the output terminals 172a, 172c, and the generated electric power voltage is monitored at the measuring portion 126.

Embodiment 8

A further example of the configuration of the gas supplying system of the fuel cell electricity-generating device arranged such that the interior of the fuel cell 121 is exposed to moistened raw material gas during the transition period between suspension period and electricity generation period will be described below.

Figure 20:
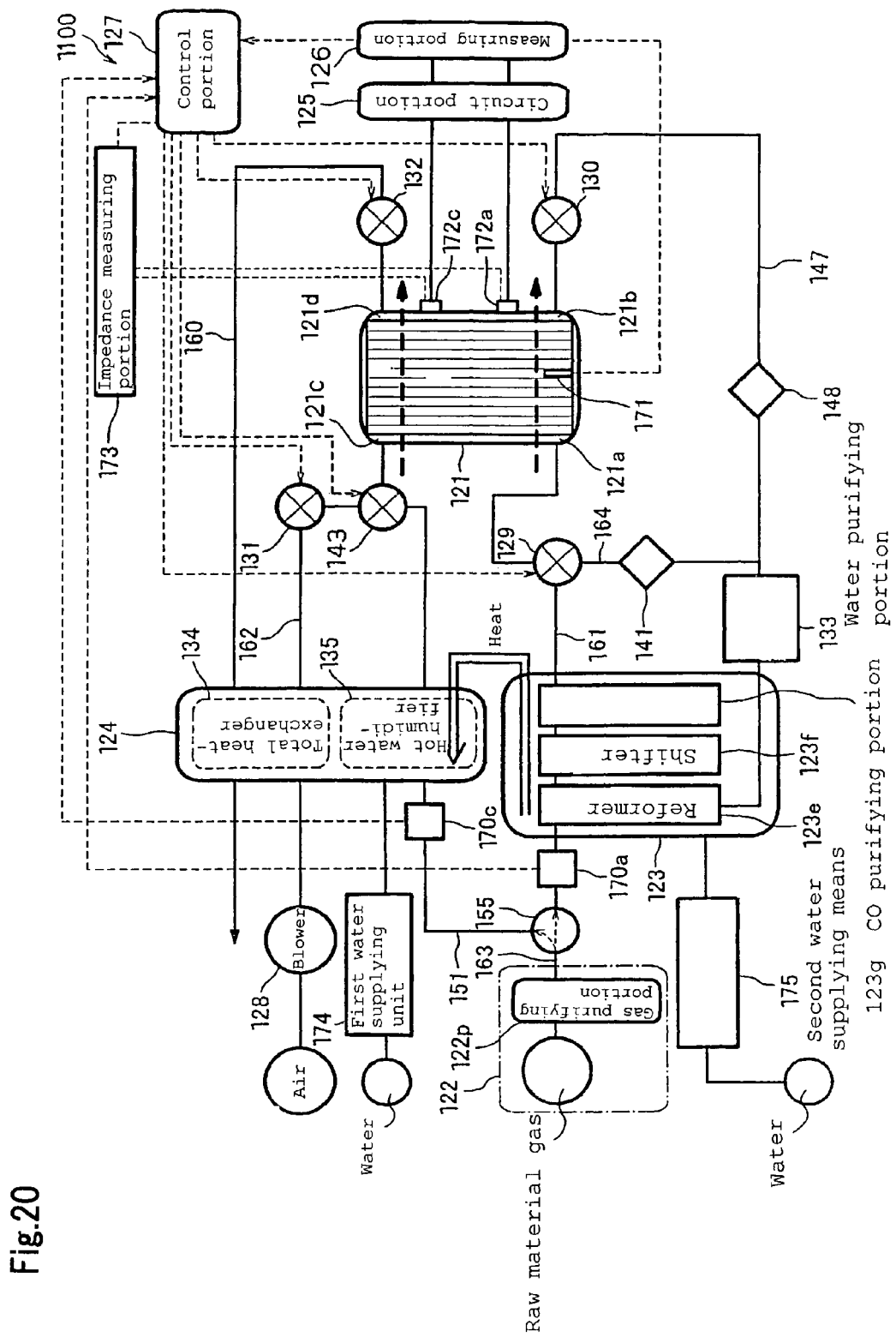
FIG. 20 is a block diagram illustrating the configuration of the fuel cell electricity-generating device according to Embodiment 8 of implementation of the present invention.

FIG. 20 is a block diagram illustrating the configuration of the fuel cell electricity-generating device according to Embodiment 3. The configuration of the fuel cell 121, the first water supplying unit 174, the second water supplying unit 175, the raw material gas supplying unit 122, the fuel generator 123, the humidifier 124, the impedance measuring device 173, the circuit portion 125, the measuring portion 126 and the control portion 127 are the same as described in Embodiment 6.

Embodiment 8 differs from Embodiment 6 in that the disposition of the pipe for the introduction of moistened raw material gas to the fuel cell 121, the switching valve therefore, the cut-off valve and the mass flow meter are changed, and the following description will be made focusing on the change of the pipe, the switching valve, the cut-off valve and the mass flow meter.

The second and fourth switching valves 142, 144 and the first and second circulating pipes 145, 146 used in Embodiment 6 (FIG. 12) are removed. Further, a shunt valve 155 is disposed shortly after the outlet of the gas purifying portion 122p, and this shunt valve 155 makes it possible to determine the ratio of the rate at which the raw material gas flows toward the humidifier 123 to the rate at which the raw material gas flows toward the fuel generator 123. In addition, a raw material gas branched pipe 151 extending through the humidifier 124 and connecting between the third switching valve 143 and the shunt valve 155 is provided. Further, in addition to the mass flow meter 170a, a mass flow meter 170c is provided along the raw material gas branched pipe 151 between the humidifier 124 and the third switching valve 143.

Figure 21:
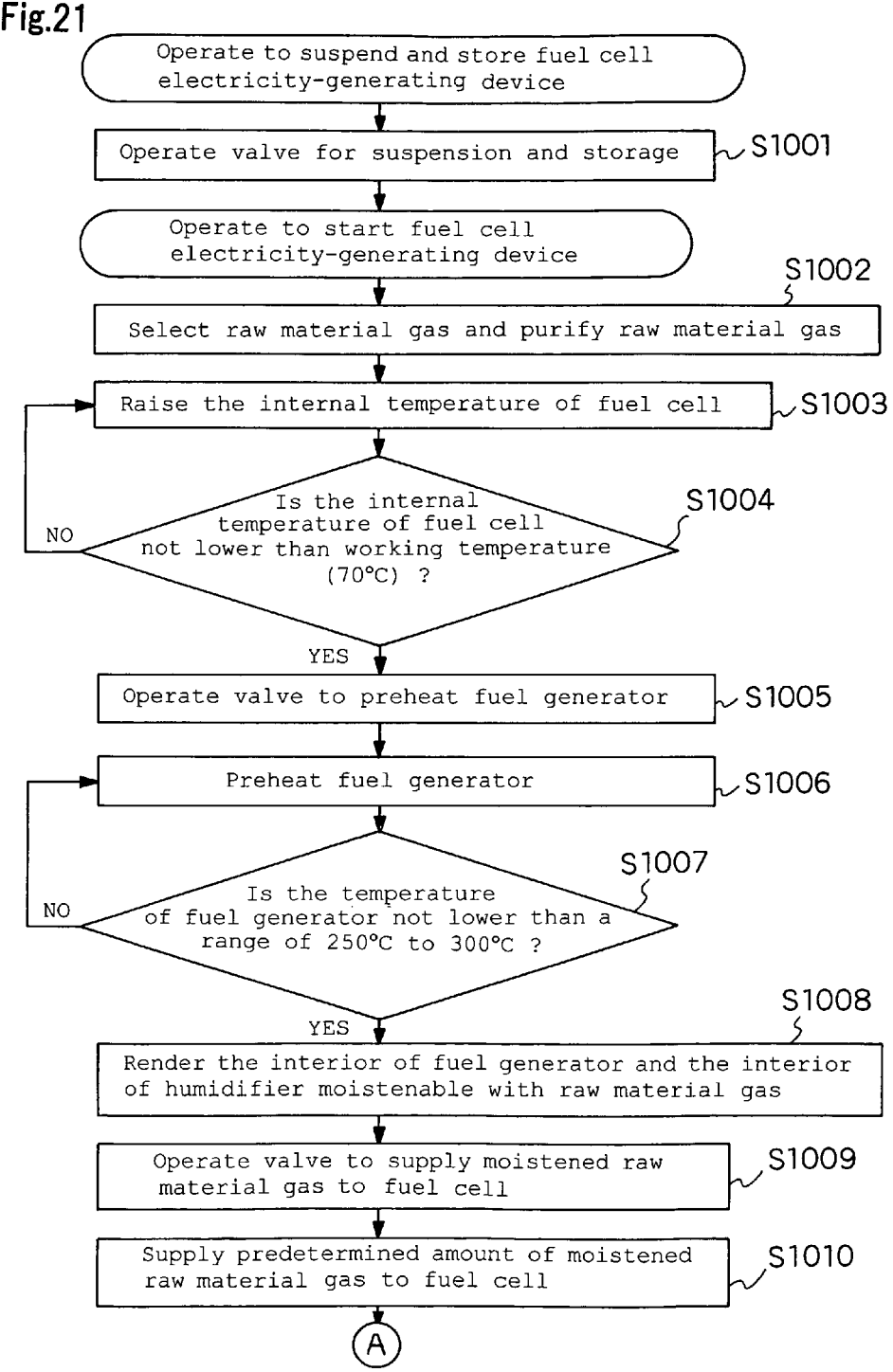
FIG. 21 is a diagram of the former half of a flow chart of explaining a gas supplying operation according to Embodiment 8 of implementation of the present invention.
Figure 22:
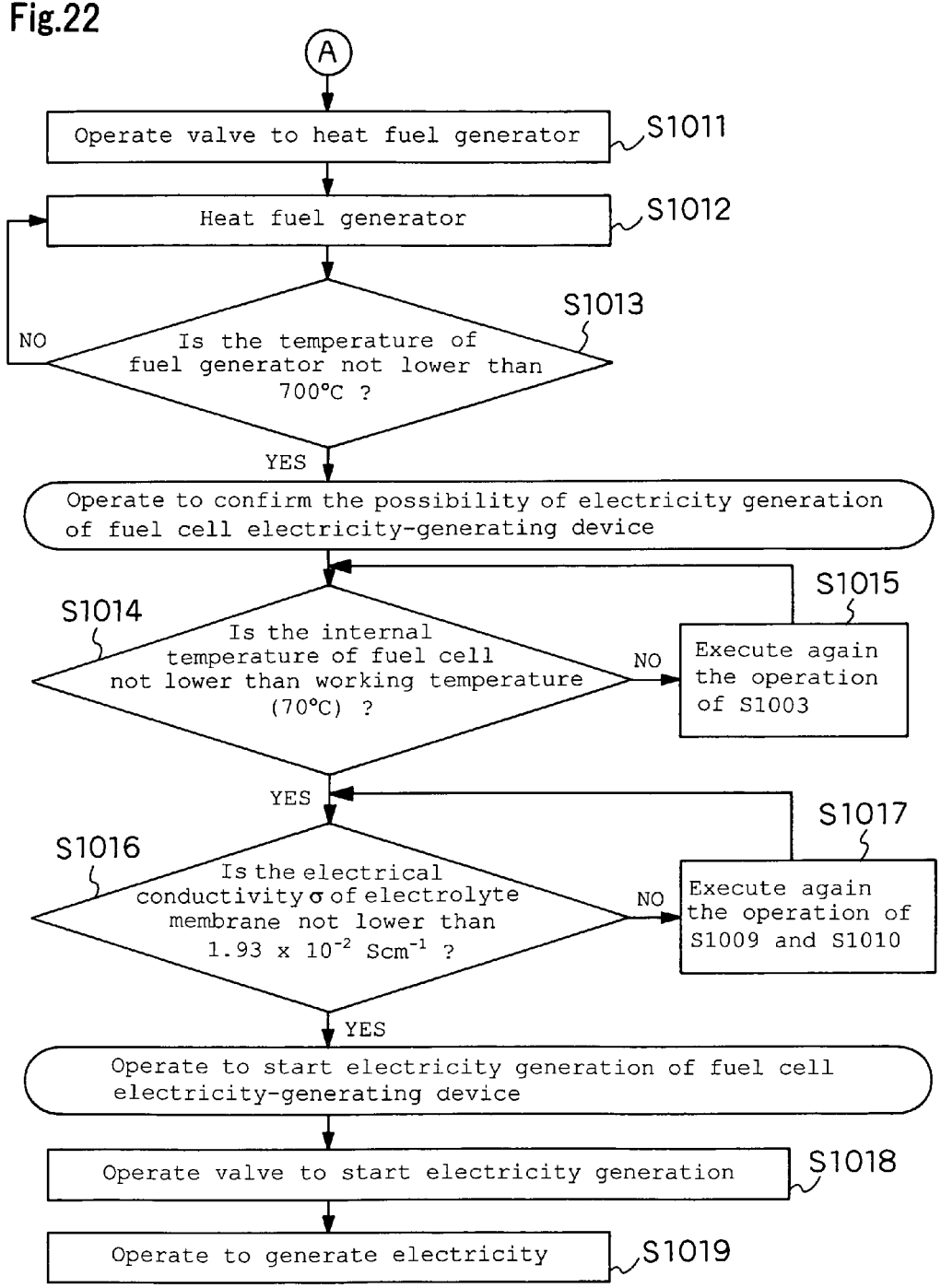
FIG. 22 is a diagram of the latter half of a flow chart of explaining a gas supplying operation according to Embodiment 8 of implementation of the present invention.

The operation of supply of fuel gas and oxidizing agent gas will be described in detail below with reference to the operation of suspension and storage, the operation of starting, the operation of confirming to see if the start of the electricity generation is made possible and the operation of electricity generation of fuel cell electricity-generating device in connection with the block diagram of FIG. 20 and the flow chart of FIG. 21 and FIG. 22.

[Operation of Suspension and Storage of Fuel Cell Electricity-Generating Device]

After the suspension of the fuel cell electricity-generating device 1100, the fuel cell electricity-generating device 1100 is stored over an extended period of time with the interior of the fuel cell 121 kept filled with the raw material gas. Herein, in order to suspend and store the fuel cell electricity-generating device 1100, the switching valves and the cut-off valves are operated as follows (Step S1001).

The first cut-off valve 130 connected to the anode side outlet 121b, the second cut-off valve 131 connected to the third switching valve 143 and the third cut-off valve 132 connected to the cathode side outlet 121d are each closed.

Under these conditions, the first switching valve 129 is operated to connect the fuel gas feed pipe 161 to the anode exhaust pipe 147 while blocking the fuel gas feed pipe 161 off the anode side inlet 121a. Further, the third switching valve 143 is operated to connect the cathode side inlet 121c to the second cut-off valve 131 while blocking the cathode side inlet 121c off the raw material gas branched pipe 151.

It is thus assured that the fuel gas and the oxidizing agent gas can be enclosed in the interior of the fuel cell 121. The interior of the fuel cell 121 is kept not higher than the working temperature of the fuel cell (70° C.), normally around room temperature (about 20° C. to 30° C.)

[Operation of Starting of Fuel Cell Electricity-Generating Device]

The selection of a raw material gas having no adverse effect on the catalyst of the fuel cell 121 and the purification of the raw material are conducted (Step S1002). The contents of the method of purifying the raw material gas and the selection of raw material gas are the same as in Embodiment 6.

Subsequently, the temperature of the interior of the fuel cell 121 is raised to the working temperature (70° C.) (Step S1003). The method of raising the internal temperature of the fuel cell 121 is the same as described in Embodiment 6.

Herein, it is judged to see if the internal temperature of the fuel cell 121 reached the working temperature (70° C.) or more (Step S1004), and if the temperature rise is insufficient (No at S1004), the temperature rising operation at S1003 is continued, and if the internal temperature of the fuel cell 121 reached 70° C. or more, the process moves to the next step.

Subsequently, in order to pre-heat the interior of the fuel generator 123, the switching valves and the cut-off valves are operated as follows (Step S1005).

The first cut-off valve 130 connected to the anode side outlet 121b, the second cut-off valve 131 connected to the third switching valve 143 and the third cut-off valve 132 connected to the cathode side outlet 121d are each closed.

Under these conditions, the first switching valve 129 is operated to connect the fuel gas feed pipe 161 to the anode exhaust pipe 147 while blocking the fuel gas feed pipe 161 off the anode side inlet 121a. Further, the third switching valve 143 is operated to connect the cathode side inlet 121c to the second cut-off valve 131 while blocking the cathode side inlet 121c off the raw material gas branched pipe 151. Further, the shunt valve 155 is operated to predetermine the shunt ratio of the rate at which the raw material gas flows through the raw material gas feed pipe 163 to the rate at which the raw material gas flows through the fuel gas feed pipe 161 to 1 so that all the amount of the raw material gas flowing through the raw material gas feed pipe 163 is introduced into the fuel generator 123.

In this manner, the gas delivered from the fuel generator 123 is allowed by the switching action of the first switching valve 129 to pass through the first connecting pipe 164 (first check valve 141 allows the flow) and the anode exhaust pipe 147, and then is prevented by the second check valve 148 from flowing backward so that it is refluxed to the combusting portion of the fuel generator 123 where it is then combusted to preheat the fuel generator 123 (Step S1006).

The range of temperature raised by preheating of the fuel generator 123 is the same as described in Embodiment 6 (The temperature of the fuel generator 123 (reformer 123e) is raised to a range of from 250° C. to 300° C.)

Herein, it is judged to see if the temperature of the fuel generator 123 (reformer 123e) rose to a range of from 250° C. to 300° C. (Step S1007), and if the temperature rise is insufficient (No at S1007), the preheating operation at S1006 is continued, and if the temperature of the fuel generator 123 (reformer 123e) rose to a range of from 250° C. to 300° C. (Yes at S1007), the process moves to the next step.

After the preheating of the fuel generator 123, the fuel generator 123 and the humidifier 124 are conditioned such that the raw material gas can be moistened to keep the dew point of the raw material gas supplied from the raw material gas supplying unit 122 not lower than the working temperature of the fuel cell 121 (70° C.) (Step S1008). The fuel generator 123 has been heated close to 300° C. and the water required for moistening is supplied from the second water supplying unit 175 to the fuel generator 123, making it possible to moisten the raw material gas in the interior of the fuel generator 123. At the same time, the water supplied from the first water supplying unit 174 to the interior of the humidifier 124 and the heat supplied from the fuel generator 123 to the humidifier 124 make it possible to moisten the raw material gas in the interior of the humidifier 124.

Subsequently, in order to supply the moistened raw material gas, the switching valves and the cut-off valves are operated as follows (Step S1009).

The first cut-off valve 130 connected to the second switching valve 142 and the third cut-off valve 132 connected to the fourth switching valve 144 are each opened.

Under these conditions, the first switching valve 129 is operated to connect the anode side inlet 121a to the fuel gas feed pipe 161 while blocking the anode side inlet 121a off the anode exhaust pipe 147. Further, the third switching valve 143 is operated to connect the cathode side inlet 121c to the raw material gas branched pipe 151 while blocking the cathode side inlet 121c off the cut-off valve 131. Further, the shunt valve 155 is operated to predetermine the shunt ratio to 0.5 such that the purified raw material gas delivered from the gas purifying portion 122p can be introduced equally into the humidifier 123 and the fuel generator 123.

In this manner, a purging process is executed involving the moistening of the interior of the fuel cell 121 with the moistened raw material gas delivered from the gas purifying portion 122p which is then introduced to the exterior and hence the substitution of the interior of the fuel cell 121 by the atmosphere of the moistened raw material gas (Step S1010) as below.

The raw material gas which has been purified in the gas purifying portion 122p and then delivered through the raw material gas feed pipe 163 is equally divided into a first raw material gas which flows through the raw material gas branched pipe 151 and a second raw material gas which flows through the fuel gas feed pipe 161 (shunt ratio: 0.5).

Referring to the first raw material gas, the purified raw material gas which has been delivered from the gas purifying portion 122p through the raw material gas feed pipe 163 is shunted by the shunt valve 155, and then introduced through the raw material gas branched pipe 151 to the humidifier 124 where it is then moistened. Thereafter, the moistened raw material gas is switched by the third switching valve 143 in its flow direction toward the cathode side inlet 121c of the fuel cell 121 so that it is supplied into the cathode 114c through the raw material gas branched pipe 151. In this manner, the cathode 114c of the fuel cell 121 is exposed to an atmosphere of moistened raw material gas, and the moistened raw material gas is then allowed to flow out from the cathode side outlet 121d. The moistened raw material gas which has flown out returns through the cathode exhaust pipe 160 to the humidifier 124 where it is then processed, properly diluted, and then discharged to the atmosphere.

Referring to the second raw material gas, the purified raw material gas which has been delivered from the gas purifying portion 122p through the raw material gas feed pipe 163 is shunted by the shunt valve 155, and then introduced into the fuel generator 123 where it is then moistened. Thereafter, the moistened raw material gas which has been delivered from the fuel generator 123 is switched by the first switching valve 129 in its flow direction toward the anode side inlet 121a of the fuel cell so that it is supplied into the anode 114a of the fuel cell 121 through the fuel gas branched pipe 161. In this manner, the anode 114a is exposed to an atmosphere of moistened raw material gas, and the moistened raw material gas is then allowed to flow out from the anode side outlet 121b. The moistened raw material gas which has flown out passes through the anode exhaust pipe 147 to the water purifying portion 133 where it is then freed of water, and then returned to the combusting portion of the fuel generator 123 where it is combusted and used to heat the fuel generator 123.

Herein, the total supplied amount of moistened raw material gas needs to be at least three times the volume of the inner space of the fuel cell 121 that can be filled by gas, and if the volume that can be filled by gas is 1.0 L for example, the moistened raw material gas may be supplied into the interior of the fuel cell 121 at a flow rate of 1.5 L/min for about 5 minutes, and this total supplied amount of moistened raw material gas is monitored by the control portion 127 on the basis of the output signal of the mass flow meter 170a and the mass flow meter 170c.

In this manner, the interior of the fuel cell 121 can be exposed to the moistened raw material gas for the transition period between suspension and electricity generation of the fuel cell 121, making it possible to moisten the electrolyte membrane 111 of the fuel cell 121 which has been dried during suspension and storage and prevent local combustion of fuel gas with oxygen gas which possibly entered the interior of the fuel cell 121 during suspension and storage. Further, since it is arranged such that the moistened raw material gas is introduced into the interior of the fuel cell 121 for the transition period between suspension and electricity generation of the fuel cell 121, the interior of the fuel cell 121 can be prevented from being exposed to an atmosphere of moistened raw material gas over an extended period of time, making it possible to prevent the loss of water repellency of the electrode of the fuel cell. In addition, it is arranged such that the first raw material gas and the second raw material gas are allowed to pass independently through the cathode 114c of the fuel cell 121 and the anode 114a of the fuel cell 121, respectively, without being mixed with each other, making it assured that both the anode 114a and the cathode 114c can be moistened.

After sufficiently supplying the moistened raw material gas into the interior of the fuel cell 121, the switching valves and the cut-off valves are operated in the following manner to heat the fuel generator 123 (Step S1011).

The first cut-off valve 130 connected to the anode side outlet 121b, the second cut-off valve 131 connected to the third switching valve 143 and the third cut-off valve 132 connected to the cathode side outlet 121d are each closed.

Under these conditions, the first switching valve 129 is operated to connect the fuel gas feed pipe 161 to the anode exhaust pipe 147 while blocking the fuel gas feed pipe 161 off the anode side inlet 121a. Further, the third switching valve 143 is operated to connect the cathode side inlet 121c to the second cut-off valve 131 while blocking the cathode side inlet 121c off the raw material gas branched pipe 151. The shunt valve 155 is operated to predetermine the shunt ratio of the rate at which the raw material gas flows through the fuel gas feed pipe 161 to the rate at which the raw material gas flows through the raw material gas feed pipe 163 to 1 such that all the amount of the raw material gas flowing through the raw material gas feed pipe 163 can be introduced into the fuel generator 123.

In this manner, the gas delivered from the fuel generator 123 is allowed by the switching action of the first switching valve 129 to pass through the first connecting pipe 164 (first check valve 141 allows the flow) and the anode exhaust pipe 147, and then is prevented by the second check valve 148 from flowing backward so that it is refluxed to the combusting portion of the fuel generator 123 where it is then combusted to heat the fuel generator 123 (Step S1012).

Herein, it is judged to see if the temperature of the fuel generator 123 rose to 640° C. or more (Step S1013), and if the temperature rise is insufficient (No at S1013), the heating operation at S1012 is continued, and if the temperature of the fuel generator 123 rose to 640° C. or more (Yes at S1013), the process moves to the next step.

[Operation of Confirming the Possibility of the Start of the Electricity Generation of Fuel Cell Electricity-Generating Device]

After raising the temperature of the fuel generator 123, the internal temperature of the fuel cell 121 and the electrical conductivity of the electrolyte membrane 111 of the fuel cell 121 are then confirmed to judge to see if the electricity generation of the fuel cell electricity-generating device 1100 may be started.

In the first confirming operation, it is judged to see if the internal temperature of the fuel cell 121 is not lower than the working temperature (70° C.) (Step S1014), and if the temperature rise is insufficient (No at S1014), the temperature raising operation at S1003 is executed again (Step S1015, and if the temperature of the fuel cell 121 is 70° C. or more (Yes at S1014), the process moves to the next step.

In the second confirming operation, the electrical conductivity of the electrolyte membrane 111 of the fuel cell 121 is determined, and it is then judged to see if this electrical conductivity $\sigma$ is not smaller than $1.93 \times 10^{-2}$ Scm$^{-1}$ (Step S1016), and if this electrical conductivity $\sigma$ is less than $1.93 \times 10^{-2}$ Scm$^{-1}$ (No at Step S1016), it is then judged that the electrolyte membrane 111 is undermoistened, and the operation at S1009 and S1010 are executed again (Step S1017), and if this electrical conductivity $\sigma$ is not smaller than $1.93 \times 10^{-2}$ Scm$^{-1}$ (Yes at Step S1017), the process then moves to the next step.

The method of measuring the electrical conductivity of the electrolyte membrane and the relationship between the electrical conductivity and the relative humidity of the electrolyte membrane are the same as described in Embodiment 6.

Thus, in addition to the judgment of the time of starting of electricity generation of a fuel cell having a suspension period and an electricity generation period on the basis of the temperature of the fuel cell, a judgment on the basis of the electrical conductivity of the electrolyte membrane of the fuel cell unit is executed, making it possible to accurately predict the water retention of the electrolyte membrane and hence enhance the reliability of judgment of the time of starting of electricity generation of the fuel cell electricity-generating device.

[Operation of Electricity Generation of Fuel Cell Electricity-Generating Device]

After the reaching of the numerical value of the aforementioned confirmation operation to a predetermined value (in some detail, the temperature of the fuel cell 121 is 70° C. or more and the electrical conductivity $\sigma$ of the electrolyte membrane is $1.93 \times 10^{-2}$ Scm$^{-1}$ or more), the switching valves and the cut-off valves are then operated in the following manner to cause the fuel cell 121 to generate electricity (Step S1018 and Step S1019).

The first cut-off valve 130 connected to the anode side outlet 121b, the second cut-off valve 131 connected to the third switching valve 143 and the third cut-off valve 132 connected to the cathode side outlet 121d are all opened.

Under these conditions, the first switching valve 129 is operated to block the fuel gas feed pipe 161 off the anode exhaust pipe 147 while connecting the fuel gas feed pipe 161 to the anode side inlet 121a. Further, the third switching valve 143 is operated to connect the cathode side inlet 121c to the second cut-off valve 131 while blocking the cathode side inlet 121c off the raw material gas branched pipe 151. In addition, the shunt valve 155 is operated to predetermine the shunt ratio of the rate at which the raw material gas flows through the fuel gas feed pipe 161 to the rate at which the raw material gas flows through the raw material gas feed pipe 163 to 1 such that all the amount of the raw material gas flowing through the raw material gas feed pipe 163 can be introduced into the fuel generator 123.

The aforementioned operation of the switching valves and the cut-off valves causes the hydrogen-rich fuel gas delivered from the fuel generator 123 through the fuel gas feed pipe 161 to be introduced into the anode side inlet 121a of the fuel cell 121 and delivered from the anode side outlet 121b and the remaining fuel gas which has not been consumed in the anode 114a to be refluxed to the fuel generator 123 of the fuel cell 121 through the anode exhaust pipe 147. Further, the moistened air (oxidizing agent gas) is introduced from the humidifier 123 through the oxidizing agent gas feed pipe 162 into the cathode side inlet 121c of the fuel cell 121 while the remaining oxidizing agent gas which has been delivered from the cathode side outlet 121d but has not been consumed in the cathode 114c is refluxed to the humidifier 124 of the fuel cell 121 through the cathode exhaust pipe 160.

In this manner, the fuel gas is supplied into the anode 114a while the oxidizing agent gas is supplied into the cathode 114c, whereby hydrogen ion and electron are produced in the interior of the fuel cell 121 and current can be withdrawn at the circuit portion 125 through the output terminals 172a, 172c, and the generated electric power voltage is monitored at the measuring portion 126.

Example

The effect of stabilizing the performance of fuel cell exerted by the purging with moistened raw material gas described in Embodiment 6 to Embodiment 8 was verified by the following evaluation of the properties of the fuel cell 121 (evaluation of voltage of MEA 17). In the evaluation of the performance of the fuel cell 121, as the catalyst material of the fuel cell electricity-generating device 1100 there is used the following material.

As an example of the material of desulfurized catalyst there is used zeolite, as an example of the modifying catalyst of the reformer 23e there is used $Ru/Al_2O_3$, as an example of the reforming catalyst of the shifter 23f there is used $Pt/CeZrOx$ (Pt=2 wt %, Ce:Zr=1:1, x=3 or 4), and as an example of the CO removing catalyst of the CO purifying portion 23g there is used a 1:1 mixture of $Pt/Al_2O_3$ (upstream) and Ru/zeolite which are formed into honeycomb.

As MEA 117 of the fuel cell 121 there is used one prepared by the following preparation method.

A mixture obtained by mixing 66 parts by weight of a catalyst (50% by weight of Pt) obtained by supporting a Pt catalyst on Ketjen Black (Ketjen Black EC, produced by Ketjen Black International Co., Ltd.; particle diameter: 30 nm) as a carbon powder with 33 parts by weight of a perflurocarbonsulfonic acid ionomer (5 wt % Nafion dispersion produced by Aldrich Inc. of USA) which is a hydrogen ionically-conductive material and a binder is molded to form catalyst reaction layers 12a, 12c (10 to 20 μm).

Acetylene black (Denka Black, produced by Denki Kagaku Kogyo K.K.; particle diameter: 35 nm) which is a carbon powder is mixed with an aqueous dispersion of a polytetrafluoroethylene (PTFE) (D1, produced by DAIKIN INDUSTRIES, Ltd.) to prepare a water-repellent ink having a PTFE content of 20% by weight as calculated in terms of dried weight. This ink is spread over a carbon paper (TGPH060H, produced by Toray Industries, Inc.) which is a substrate for the gas diffusion layers 113a, 113c so that the carbon paper is impregnated with the ink, and then subjected to heat treatment at 300° C. using a hot air drier to form gas diffusion layers 13a, 13c (about 200 μm).

The gas diffusion layers 13a, 13c and catalytic reaction layers 12a, 12c thus prepared are bonded to the respective surface of the polymer electrolyte membrane 111 (Nafion 112 electrolyte membrane, produced by Du Pont Inc. of USA) to complete MEA 117.

Figure 23:
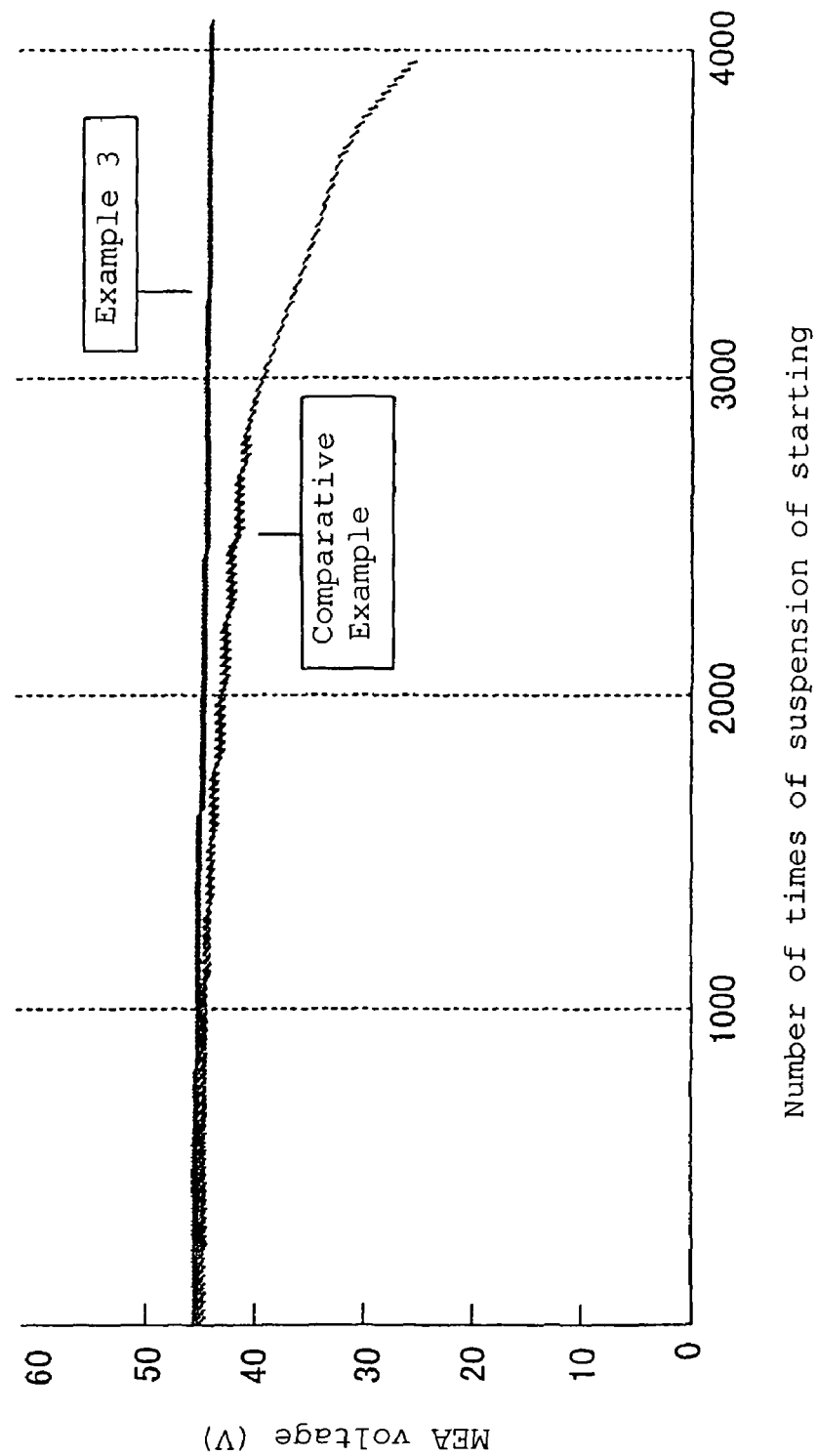
FIG. 23 is a diagram of the results of evaluation of MEA voltage properties based on the number of times of suspension of starting.

The change of the voltage of MEA in the catalyst material system of the aforementioned fuel cell electricity-generating device 1100 of Embodiments 6 to 8, which involve purging with moistened raw material gas, after 4,000 times of suspension of starting (electricity generation) of fuel cell 121 is set forth in the table below together with that of a comparative example involving no purging with moistened raw material gas. FIG. 23 depicts the change of the voltage of MEA of an example of purging with moistened raw material gas (Embodiment 8) and a comparative example with the times of suspension of starting of fuel cell plotted as abscissa and the voltage of MEA 117 plotted as ordinate.

In accordance with the purging with moistened raw material gas according to Embodiments 6 to 8, local combustion due to repetition of electricity generation and suspension, etc. can be prevented to inhibit the deterioration of MEA 117, making it possible to attain stabilized maintenance of the voltage of the fuel cell 121 over an extended period of time regardless of the number of times of suspension of starting.

On the contrary, in the comparative example, local combustion, etc. cause the progress of catalytic deterioration of MEA 117, and after 1,000 times of suspension of starting, a slight drop of the voltage of MEA 117 is observed, and after 3,000 times of suspension of starting, MEA 117 is destroyed (holes formed), showing a sudden voltage drop.

TABLE 1

| Number of times of suspension of starting | Voltage (V) of MEA | | | |
|---|---|---|---|---|
| | 1,000 | 2,000 | 3,000 | 4,000 |
| Processed according to Embodiment 1 | 45.6 V | 45.2 V | 45.2 V | 45.0 V |
| Processed according to Embodiment 2 | 45.9 V | 45.5 V | 45.3 V | 44.8 V |
| Processed according to Embodiment 3 | 45.7 V | 45.3 V | 45.2 V | 45.1 V |
| Comparative example (unmoistened) | 45.6 V | 42.0 V | 40.0 V | 28.9 V |

In the aforementioned various embodiments, the fuel cell electricity-generating device 1100 corresponds to the fuel cell system of the present invention, the fuel cell 121 corresponds to the fuel cell of the present invention, the fuel gas feed pipe 161 corresponds to the fuel gas pipe of the present invention, the first switching valve 129 corresponds to the fuel gas on-off valve of the present invention, and they constitute the fuel gas supplying means of the present invention.

Further, the oxidizing agent gas feed pipe 162 corresponds to the oxidizing agent gas pipe of the present invention, the second cut-off valve 131 corresponds to the oxidizing agent gas on-off valve of the present invention, and they constitute the oxidizing agent gas supplying means of the present invention.

Further, the pipe connecting the raw material gas feed pipe 151, the third switching valve 143 and the cathode side inlet of the fuel cell 121 to each other corresponds to the raw material gas pipe of the present invention, the third switching valve 143 corresponds to the raw material gas on-off valve of the present invention, and they constitute the raw material gas supplying means of the present invention.

Further, the second switching valve 152 corresponds to the anode side off-gas on-off valve of the present invention and the second connecting pipe 153 corresponds to the anode side exhaust pipe of the present invention. Moreover, the fourth switching valve 144 corresponds to the cathode side off-gas on-off valve of the present invention and the second circulating pipe 146 corresponds to the cathode side exhaust pipe of the present invention.

Further, the second circulating pipe 146 corresponds to the additional raw material gas pipe of the present invention and the fourth switching valve 144 and the second switching valve 142 each correspond to the additional raw material gas on-off valve of the present invention. Moreover, the control portion 127 corresponds to the controlling means of the present invention.

Further, the aforementioned Embodiments 6 to 8 may each correspond to the following embodiments of implementation of the present invention. In other words, the first invention may be a fuel cell electricity-generating device comprising a fuel cell having a fuel gas flow path and a raw material gas supplying unit which supplies a raw material gas, wherein during the electricity-generation period of the aforementioned fuel cell, a fuel gas produced from the aforementioned raw material gas is supplied into the aforementioned fuel gas flow path to cause the aforementioned fuel cell to generate electricity, and during the transition period of a fuel cell performing alternate repetition of suspension and electricity generation between suspension period and electricity generation period, a raw material gas delivered from the aforementioned raw material gas supplying unit is moistened to give an atmosphere of moistened raw material gas to which the interior of the aforementioned fuel cell is then exposed.

Further, the second invention may be a fuel cell electricity-generating device of the first invention, wherein the aforementioned raw material gas is allowed to flow through the aforementioned fuel gas flow path, causing the electrolyte membrane in the interior of the aforementioned fuel cell to be exposed to an atmosphere of the aforementioned raw material gas.

Further, the third invention may be a fuel cell electricity-generating device of the second invention, wherein the aforementioned raw material gas is moistened such that the dew point of the aforementioned raw material gas can be kept at not lower than the working temperature of the aforementioned fuel cell.

Further, the fourth invention may be a fuel cell electricity-generating device of any one of the first to third inventions, wherein the aforementioned raw material gas supplying unit comprise a gas purifying portion by which the sulfur components in aforementioned raw material gas is removed, and the interior of the aforementioned fuel cell is exposed in an atmosphere of the aforementioned raw material gas.

Further, the fifth invention may be a fuel cell electricity-generating device of the fourth invention, wherein the aforementioned raw material gas is any one of methane gas, propane gas, butane gas and ethane gas.

Further, the sixth invention may be a fuel cell electricity-generating device of the first invention, wherein there is provided a fuel generator which produces a fuel gas to be supplied into the aforementioned fuel cell from the aforementioned raw material gas supplied from the aforementioned raw material gas supplying unit and water vapor and when the raw material gas delivered from the aforementioned raw material gas supplying unit is moistened in the interior of the aforementioned fuel generator during the aforementioned transition period, the temperature of the aforementioned fuel generator is kept lower than the lower limit of temperature at which the aforementioned raw material gas is carbonized in the aforementioned fuel generator.

Further, the seventh invention may be a fuel cell electricity-generating device of the sixth invention, wherein the temperature of the aforementioned fuel generator is kept at 300° C. or less.

Further, the eighth invention may be a fuel cell electricity-generating device of the first invention, wherein the aforementioned fuel cell has an anode and a cathode disposed therein with the electrolyte membrane interposed therebetween and the exposure of the aforementioned anode to an atmosphere of the aforementioned raw material gas is followed by the exposure of the aforementioned cathode to an atmosphere of the aforementioned raw material gas.

Further, the ninth invention may be a fuel cell electricity-generating device of the eighth invention, wherein there is provided a fuel generator which produces a fuel gas to be supplied into the aforementioned fuel cell from the aforementioned raw material gas supplied from the aforementioned raw material gas supplying unit and water vapor and the aforementioned raw material gas is moistened in the interior of the aforementioned fuel generator.

Further, the tenth invention may be a fuel cell electricity-generating device of the first invention, wherein the aforementioned fuel cell has an anode and a cathode disposed therein with the electrolyte membrane interposed therebetween and the exposure of the aforementioned cathode to an atmosphere of the aforementioned raw material gas is followed by the exposure of the aforementioned anode to an atmosphere of the aforementioned raw material gas.

Further, the eleventh invention may be a fuel cell electricity-generating device of the tenth invention, wherein there is provided a humidifier which moistens an oxidizing agent gas for electricity-generating reaction with the aforementioned fuel gas to be supplied into the aforementioned cathode and the aforementioned raw material gas is moistened by the aforementioned humidifier.

Further, the twelfth invention may be a fuel cell electricity-generating device of the first invention, wherein the aforementioned fuel cell has an anode and a cathode disposed therein with the electrolyte membrane interposed therebetween and the aforementioned cathode is exposed to an atmosphere of the aforementioned first raw material gas shunted from the aforementioned raw material gas while the aforementioned anode is exposed to an atmosphere of the aforementioned second raw material gas shunted from the aforementioned raw material gas.

Further, the thirteenth invention may be a fuel cell electricity-generating device of the twelfth invention, wherein there are provided a fuel generator which produces a fuel gas to be supplied into the aforementioned fuel cell from the aforementioned raw material gas supplied from the aforementioned raw material gas supplying unit and water vapor and a humidifier which moistens an oxidizing agent gas to be supplied into the aforementioned cathode and the aforementioned first raw material gas is moistened in the interior of the aforementioned humidifier while the aforementioned second raw material gas is moistened in the interior of the aforementioned fuel generator.

Further, the fourteenth invention may be a fuel cell electricity-generating device of the first invention, wherein the aforementioned fuel cell comprises an electrolyte membrane provided therein and the aforementioned electricity generation period is started on the basis of the electrical conductivity of the aforementioned electrolyte membrane.

Further, the fifteenth invention may be a fuel cell electricity-generating device of the fourteenth invention, wherein the aforementioned electricity generation period is started on the basis of the electrical conductivity of the aforementioned electrolyte membrane that corresponds to a predetermined relative humidity in the interior of the aforementioned fuel cell.

Embodiment 9

Figure 24:
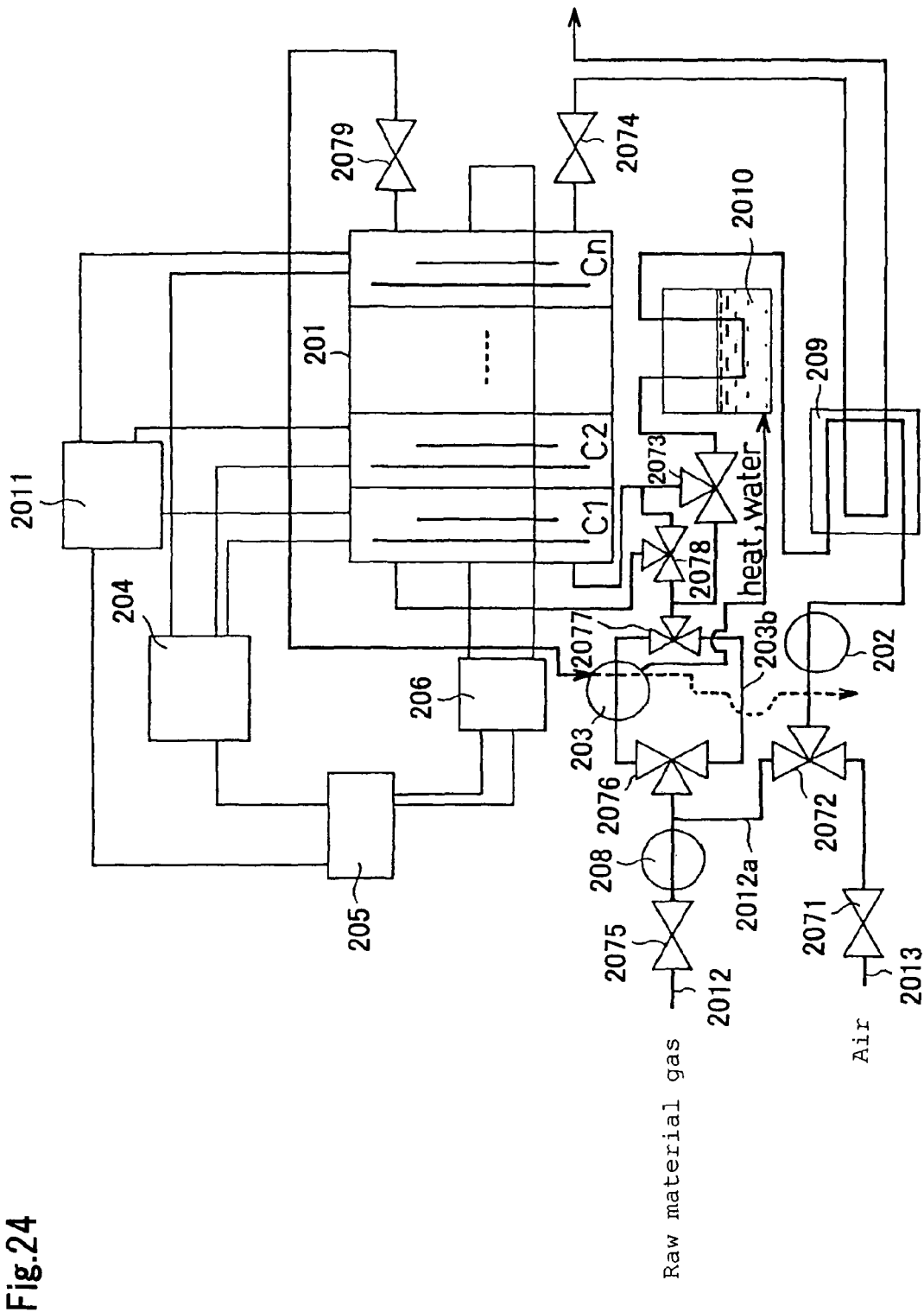
FIG. 24 is a diagram illustrating the configuration of the fuel cell system of Embodiment 9 of implementation of the present invention.
Figure 25:
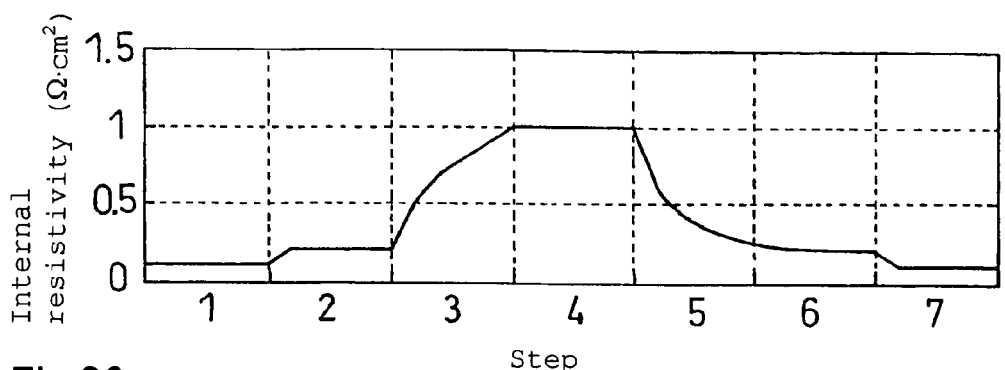
FIG. 25 is a diagram illustrating the change of average value of internal resistivity of single unit in a method of operating the fuel cell system of Embodiment 9 of implementation of the present invention.
Figure 26:
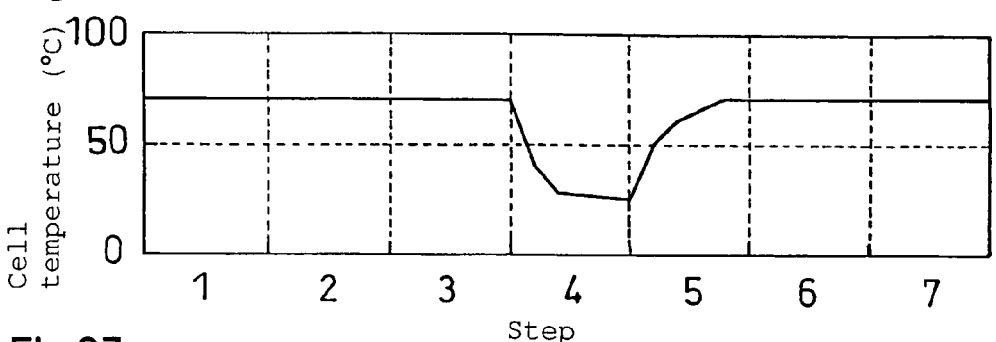
FIG. 26 is a diagram illustrating the change of battery temperature in a method of operating the fuel cell system of Embodiment 9 of implementation of the present invention.
Figure 27:
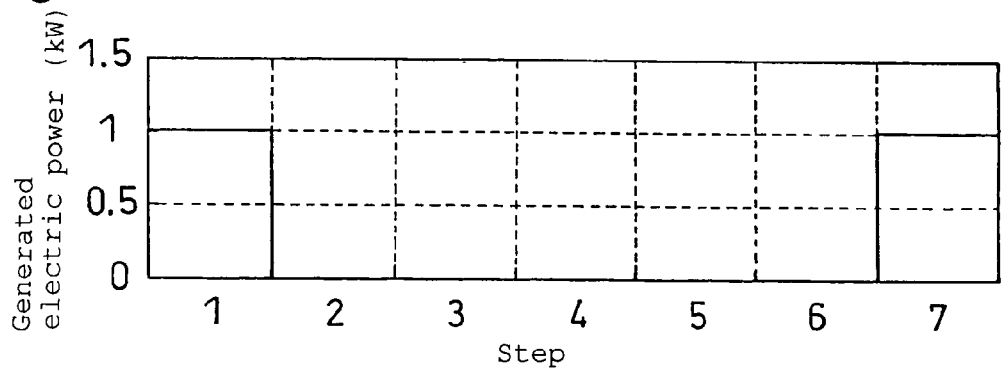
FIG. 27 is a diagram illustrating the change of generated amount of electric power in a method of operating the fuel cell system of Embodiment 9 of implementation of the present invention.
Figure 28:
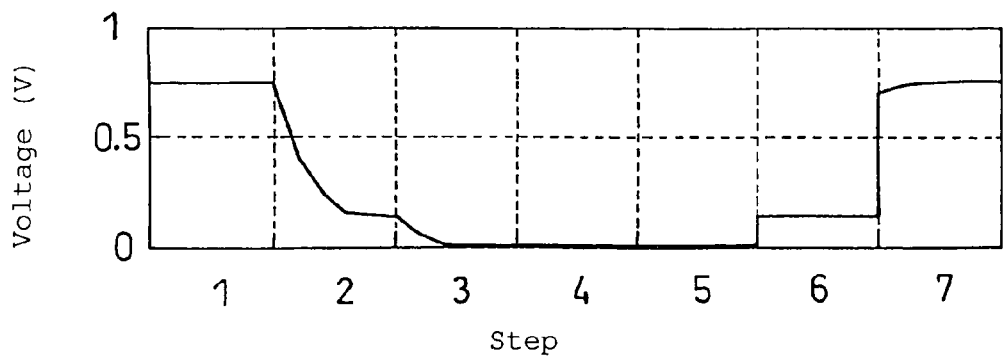
FIG. 28 is a diagram illustrating the change of average value of voltage of single unit in a method of operating the fuel cell system of Embodiment 9 of implementation of the present invention.

The fuel cell system according to Embodiment 9 of implementation of the present invention will be described in connection with FIG. 24. FIG. 24 is a configurational diagram of the fuel cell system according to the present embodiment.

A fuel cell stack 201 is formed by laminating a plurality (n) of single cell units (C1 to Cn). The single cell unit is formed by a hydrogen ionically-conductive polymer electrolyte membrane, a pair of electrodes having the aforementioned electrolyte membrane disposed interposed therebetween and a pair of separator plates having a gas flow path through which a fuel gas and an oxidizing agent gas are supplied into the aforementioned pair of electrodes, respectively.

To the fuel cell stack on the air electrode side thereof are connected an oxidizing agent gas controlling device 202 which controls the supplied amount of oxidizing agent gas on the basis of the voltage and internal resistivity of the fuel cell stack and an oxidizing agent gas feed pipe 2013 having a total heat-exchange type humidifier 209 and a hot water type humidifier 2010 disposed therein as humidifying portion of moistening oxidizing agent gas.

On the other hand, to the fuel electrode side is connected a fuel gas feed pipe 2012 having a fuel generator 203 of producing a fuel gas from a raw material gas and a gas purifying portion 208 of purifying a raw material gas disposed thereon.

Further, the fuel gas feed pipe 2012 and the oxidizing agent gas feed pipe 2013 have electromagnetic valves 2071 to 2079 of switching the flow path of gas disposed thereon. To the collector (not shown) of the fuel cell 1 is connected an electric power circuit portion 6, the voltage of the various single cell units (C1 to Cn) is detected by a voltage detecting device 204, and the internal resistivity of the single cell unit is measured by a measuring portion such as high frequency resistance meter 2011. A control portion 205 controls the fuel cell stack, the fuel generator, the gas purifying portion, the humidifying portion, the electric power circuit portion and the measuring portion, and in particular, the electric power outputted from the electric power circuit portion 206, the amount of fuel gas produced at the fuel generator 203 and the opening/closing of the electromagnetic valves 2071 to 2079 are controlled on the basis of the voltage and internal resistivity detected.

Next, the method of operating the fuel cell system according to the aforementioned present embodiment will be described in connection with Table 2 and FIGS. 25 to 29. Table 2 depicts a procedure (sequence) of the method of operating the fuel cell system according to the present embodiment and FIGS. 25 to 29 each depict the change of the average internal resistivity of single cell unit, the temperature and generated electric power of fuel cell stack and average voltage of single cell unit at the various steps in Table 2. These results indicate the case where 70 single cell units (n=70) are laminated.

At first, during normal operation (Step 1), moistened air is supplied into the air electrode and Steam Reformed Gas (SRG) is supplied into the fuel electrode to make electricity generation. Herein, the cell temperature is 70° C., the average voltage of the various single cell units is about 0.75 V, and the generated electric power is 1 kW.

In order to suspend the operation of this fuel cell system, dried inert gas is supplied into the fuel cell stack before suspension, and a procedure involving a step (1) of setting the internal resistivity of the single cell unit to 1.0 $\Omega \cdot cm^2$ or more is then executed.

In accordance with this procedure, the formation of local cell in the electrode can be inhibited during suspension. Further, even when oxygen enters from the exterior during suspension, the deterioration of the electrode due to the oxidation of the air electrode, the adsorption of impurities to the air electrode and the elution of catalyst components on the fuel electrode can be inhibited because the polymer electrolyte membrane has a small protonic conductivity and hence a low reactivity.

The internal resistivity of the single cell unit at the step (1) is preferably from 1.0 to 3.0 $\Omega \cdot cm^2$. When the internal resistivity of the single cell unit exceeds 3.0 $\Omega \cdot cm^2$, the change of water content resulted from the repetition of drying during suspension and moistening during starting increases to raise the change of volume resulted from the repetition of expansion and shrinkage of the polymer electrolyte membrane, making the electrode more subject to damage.

Firstly, at Step 2, the gas to be supplied into the air electrode is switched to dried inert gas to suspend external output. At this time, the cell voltage gradually decreases until the average voltage of the single cell unit reaches about 0.10 to 0.15 V. This is because the interior of the air electrode is substituted by the inert gas and the hydrogen in the fuel electrode spontaneously diffuses into the air electrode, causing the potential of the two electrodes to approach each other. In the configuration of the ordinary fuel cell, since the volume of flow path in the air electrode is almost equal to that of flow path in the fuel electrode and the diffusion and reaction of hydrogen and oxygen results in the excessive presence of hydrogen, the potential of the two electrodes approaches 0 V as opposed to standard hydrogen electrode.

Subsequently, at Step 3, dried inert gas is supplied into the two electrodes until the internal resistivity of the single cell unit in the fuel cell stack reaches 1.0 $\Omega \cdot cm^2$ or more. At Steps 2 and 3, the temperature of the fuel cell stack is kept at 70° C.

In other words, in Table 1, the aforementioned step (1) corresponds to Step 3.

At Step 4, where the internal resistivity of the single cell unit in the fuel cell stack is 1.0 $\Omega \cdot cm^2$ or more, the gas

TABLE 2

|  | Step 1 | Step 2 | Step 3 | Step 4 | Step 5 | Step 6 | Step 7 |
| --- | --- | --- | --- | --- | --- | --- | --- |
| Operation mode | Normal | Substitution by gas | Drying | Suspension | Temperature rise-swelling | Substitution by gas | Normal |
| Fuel electrode side | SRG (wet) | SRG (wet) | Inert gas (dry) | Enclosed | Inert gas (wet) | SRG (wet) | SRG (wet) |
| Air electrode side | Air (wet) | Inert gas (dry) | Inert gas (dry) | Enclosed | Inert gas (wet) | Inert gas (wet) | Air (wet) | flowpath in the fuel electrode and the air electrode are sealed to suspend the gas flow, lower the cell temperature and suspend the operation.

In order to start the operation of the fuel cell system, moistened inert gas is supplied into the fuel cell stack before starting of electricity generation, and a procedure involving the step (2) of setting the internal resistivity of the single cell unit to 0.3 Ω·cm² or less is then executed. In accordance with this procedure, the rise of the internal resistivity due to heat generation can be inhibited.

The internal resistivity of the single cell unit at the step (2) is preferably from 0.1 to 0.3 Ω·cm². The internal resistivity of the single cell unit during operation is about 0.1 Ω·cm².

At Step 5, moistened inert gas is supplied into the air electrode and the fuel electrode until the internal resistivity of the single cell unit in the fuel cell stack reaches 0.3 Ω·cm² or less while raising the temperature of the fuel cell stack. In accordance with Step 5, the polymer electrolyte membrane which has been kept dried during suspension is moistened, rendering the fuel cell stack again capable of generating electricity.

In other words, in Table 1, the aforementioned step (2) corresponds to Step 5.

At Step 6, the gas to be supplied into the fuel electrode is switched to Steam Reformed Gas (SRG), and operation is made for some time while the average voltage of the single cell unit is being kept at about 0.10 to 0.15 V. At this time, hydrogen spontaneously diffuses from the fuel electrode to the air electrode, causing the electrode catalyst to be reduced and purified.

Then, at Step 7, the gas to be supplied into the air electrode is switched to moistened air to generate electricity of 1 kW.

When operation is made according to the aforementioned method, the deterioration of the fuel cell stack due to repetition of starting and suspension of operation can be inhibited.

As the inert gas to be used hereinabove there may be used a raw material gas purified in the gas purifying portion 208. For example, in the case where as the raw material gas there is used a city gas containing methane or propane, a city gas which has been freed of odorizer (S component) contained therein as impurities and thus purified is used as inert gas. The removal of these impurities is conducted to prevent the poisoning of Pt contained in the catalyst layer.

As the dried inert gas to be used at Steps 2 and 3 there is used, e.g., a raw material gas which has passed through a bypass 203b provided along the route to the fuel generator 203 via the gas purifying portion 208.

Further, as the moistened inert gas to be used at Steps 5 and 6 there is used, e.g., a raw material gas which has passed through the fuel generator 203 at 300° C. or less via the gas purifying portion 208. In the case where the temperature of the fuel generator 203 is 300° C. or less, the raw material gas is not reformed to hydrogen-containing gas, but only the moistening of the raw material gas is conducted.

As the moistened inert gas there may be used, e.g., a raw material gas which has been passed through the gas purifying portion 208 and the connecting pipe 2012a connecting between the fuel gas feed pipe and the air feed pipe and then moistened in the hot water humidifier 2010 with heat and water generated by the fuel generator 203.

Further, the aforementioned raw material gas which has been supplied into the fuel cell stack 201 as inert gas can be reused as combusting fuel in the fuel generator 203.

Thus, the raw material gas can be used as inert gas, eliminating the necessity of separately providing a device of supplying inert gas such as nitrogen gas bomb. Accordingly, the deterioration of the fuel cell stack can be easily inhibited without complicating the fuel cell system and adding to cost.

Examples of the present invention will be described in detail hereinafter, but the present invention is not limited thereto.

Example

Figure 29:
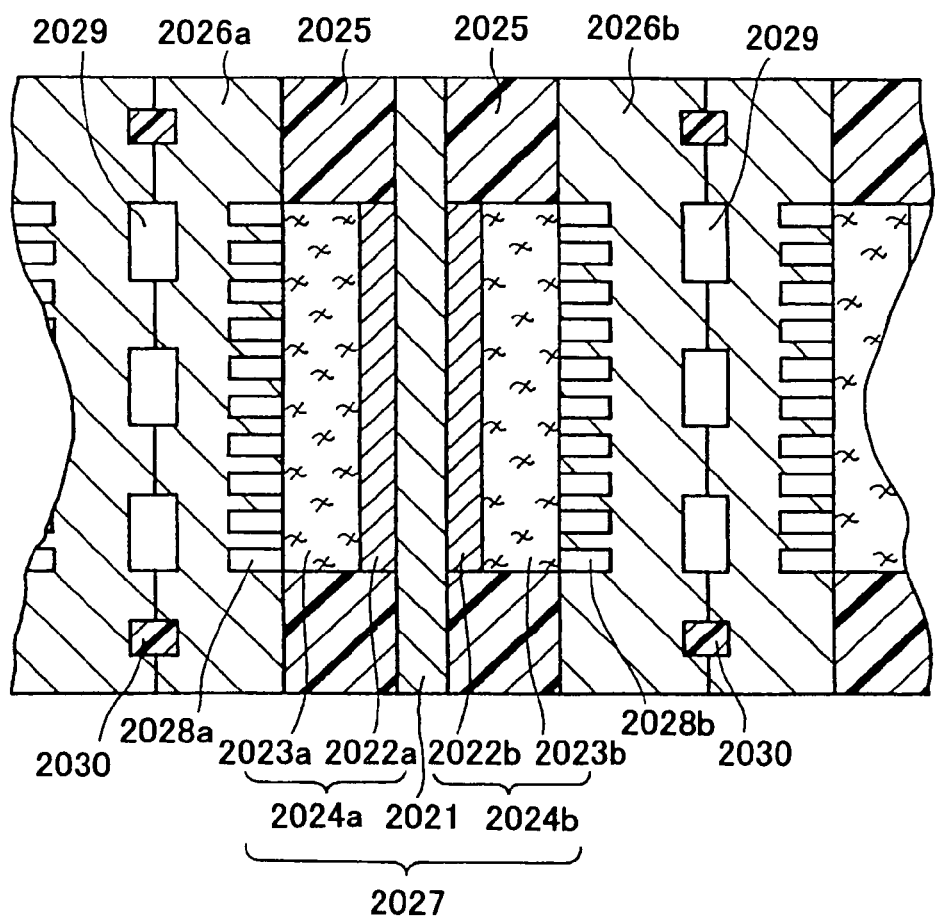
FIG. 29 is a schematic longitudinal sectional view illustrating a part of a fuel cell stack in the fuel cell system of Embodiment 9 of implementation of the present invention.

A fuel cell stack having the configuration shown in FIG. 29 was prepared according to the method described below. FIG. 29 is a schematic longitudinal sectional view illustrating a part of the fuel cell stack.

(1) Preparation of Membrane-Electrode Assembly

An acetylene black (Denka Black, produced by DENKI KAGAKU KOGYO KABUSHIKI KAISHA; particle diameter: 35 nm) as a carbon powder was mixed with an aqueous dispersion (D1, produced by DAIKIN INDUSTRIES, Ltd.) of a polytetrafluoroethylene (PTFE) to prepare a water-repellent ink containing PTFE in a dried amount of 20% by weight. This ink was spread over a carbon paper (TGPH060H, produced by Toray Industries, Inc.) as a substrate of gas diffusion layer so that the carbon paper was impregnated therewith, and then subjected to heat treatment at 300° C. using a hot air drier to form gas diffusion layers 2023a, 2023b having a thickness of about 200 μm.

Separately, Pt was supported on Ketjen Black (Ketjen Black EC, produced by Ketjen Black International Co., Ltd.; particle diameter: 30 nm) which is a carbon powder to obtain a catalyst powder having a Pt content of 50% by weight. This catalyst powder and a perfluorocarbonsulfonic acid ionomer (5 wt % Nafion dispersion produced by Aldrich Inc. of USA) as a hydrogen ionically-conductive material and a binder were then mixed at a weight ratio of 2:1 as calculated in terms of dried weight, and this mixture was then molded to form catalyst layers 2022a, 2022b having a thickness of from 10 to 20 μm.

The catalyst layers 2022a, 2022b and gas diffusion layers 2023a, 2023b thus obtained were then bonded to the respective surface of a hydrogen ionically conductive polymer electrolyte membrane 2021 (Nafion 112 membrane, produced by Du Pont Inc. of USA). Then, a membrane-electrode assembly (hereinafter referred to as "MEA") 2027 formed by the polymer electrolyte membrane 2021, the anode 2024a comprising the catalyst layer 2022a and the gas diffusion layer 2023a and the cathode 2024b comprising the catalyst layer 2022b and the gas diffusion layer 2023b having the polymer electrolyte membrane 2021 interposed therebetween was obtained.

At this time, a rubber gasket 2025 was bonded to the outer periphery of the polymer electrolyte membrane 2021 in MEA 2027. The gasket 2025 had a manifold hole formed therein through which the fuel gas, the oxidizing agent gas and the cooling water flow.

(2) Assembly of Fuel Cell Stack

An anode side separator plate 2026a having a gas flow path 2028a having a depth of 0.5 mm through which the fuel gas is supplied into the anode 2024a and a cathode side separator plate 2026b having a gas flow path 2028b having a depth of 0.5 mm through which the oxidizing agent gas is supplied into the cathode 2024b were prepared. As the separator plates 2026a and 2026b there were each used a graphite plate having an external size of 20 cm×32 cm×1.3 mm impregnated with a phenolic resin. These separator plates had a cooling water flow path 2029 having a depth of 0.5 mm formed on the surface thereof opposite the gas flow path.

A single cell unit was obtained by laminating the anode side separator plate 2026a on MEA 2027 in such an arrangement that the surface of the anode side separator plate 2026a having the gas flow path 2028a and the surface of MEA 2027 having the anode 2024a were opposed to each other and laminating the cathode side separator plate 2026b on MEA 2027 in such an arrangement that the surface of the cathode side separator plate 2026b having the gas flow path 2028b and the surface of MEA 2027 having the cathode 2024b were opposed to each other. 70 such single cell units were then laminated to obtain a cell laminate. At this time, the surface of the separator 2026a having the cooling water flow path 2029 and the surface of the separator 2026b having the cooling water flow path 2029 were opposed to each other to form a cooling portion every single cell unit. Further, on the surface of the separator plates having the cooling portion was provided a rubber sealing portion 2030 surrounding the cooling water flow path to prevent the cooling water from flowing out.

The cell laminate was entirely fixed by a fastening rod with a collector made of stainless steel and an insulating plate and an end plate made of an electrically-insulating material attached to the both ends thereof to prepare a fuel cell stack. The fastening pressure during this procedure was 15 kgf/cm$^2$ per area of separator plate.

[Evaluation of Fuel Cell System]

The fuel cell stack 201 thus obtained was connected to a fuel cell system having the same configuration as shown in FIG. 24 above, and the following operation test was then conducted according to the same procedure as set forth in Table 2 above.

At Step 1, 13A gas as raw material gas and air as oxidizing agent gas were supplied into the fuel gas feed pipe and the oxidizing agent gas feed pipe in the fuel cell system, respectively. During this procedure, the cell temperature, percent utilization of fuel gas (Uf) and percent utilization of air (Uo) in the fuel cell stack were 70° C., 70% and 40%, respectively. The fuel gas and air were moistened to have a dew point of 65° C. and 70° C., respectively. As the purging gas there was used 13A gas which had passed through the gas purifying portion 8.

Steps 1 to 6 were then executed by 100 cycles under the conditions that Step 1 was conducted for 80 minutes, Step 2 was conducted for 20 minutes, Step 3 was conducted for 30 minutes, Step 4 was conducted for 48 hours, Step 5 was conducted for 30 minutes and Step 6 was conducted for 20 minutes. The operating test was conducted at room temperature (27° C.) (Experiment No. 1).

As the dried inert gas there was used a raw material gas operating had been purified in the gas purifying portion. Further, as moistened inert gas there was used a raw material gas which had passed through the fuel generator at 300 C or less.

An operating test was conducted in the same manner as in the aforementioned Experiment No. 1 except that the time of Steps 1 to 6 were changed to the conditions set forth in Table 3.

TABLE 3

| Experiment | Step | | | | | |
|---|---|---|---|---|---|---|
| No. | 1 | 2 | 3 | 4 | 5 | 6 |
| 1 | 80 min | 20 min | 30 min | 48 hr | 30 min | 20 min |
| 2 | 80 min | 20 min | 40 min | 48 hr | 30 min | 20 min |
| 3 | 80 min | 20 min | 30 min | 48 hr | 40 min | 20 min |
| 4 | 80 min | 20 min | 30 min | 72 hr | 30 min | 20 min |
| 5 | 80 min | 20 min | 40 min | 72 hr | 30 min | 20 min |
| 6 | 80 min | 20 min | 10 min | 48 hr | 30 min | 20 min |
| 7 | 80 min | 20 min | 20 min | 48 hr | 30 min | 20 min |
| 8 | 80 min | 20 min | 50 min | 48 hr | 30 min | 20 min |

TABLE 3-continued

| Experiment | Step | | | | | |
|---|---|---|---|---|---|---|
| No. | 1 | 2 | 3 | 4 | 5 | 6 |
| 9 | 80 min | 20 min | 50 min | 48 hr | 20 min | 20 min |
| 10 | 80 min | 20 min | 30 min | 48 hr | 5 min | 20 min |
| 11 | 80 min | 20 min | 10 min | 72 hr | 30 min | 20 min |
| 12 | 80 min | 20 min | 20 min | 72 hr | 30 min | 20 min |

During normal operation (Step 1), the internal resistivity of the single cell unit was 0.1 Ω·cm$^2$ in all Experiment Nos. 1 to 12.

Firstly, the results of operation test in Experiment Nos. 1, 2 and 6 to 8, which are different in time of Step 3, are set forth in Table 4. The internal resistivity in Table 4 indicates the average value of internal resistivity of the various single cell units at the end of Steps 3 and 5. The percent deterioration indicates the average value of drop of voltage of the various single cell units per cycle (Steps 1 to 6) after alternate repetition of starting and suspension.

TABLE 4

| | Internal resistivity (Ω · cm$^2$) | | Percent deterioration |
|---|---|---|---|
| Experiment No. | Step 3 | Step 5 | (μV/cycle) |
| 1 | 1.0 | 0.3 | 20 |
| 2 | 3.0 | 0.3 | 20 |
| 6 | 0.3 | 0.3 | 40 |
| 7 | 0.6 | 0.3 | 30 |
| 8 | 10 | 0.3 | 200 |

Under these conditions that Step 3 time varies, results having different internal resistivity values during operation were obtained.

In order that the electric power generated by the fuel cell stack is advantageous over that of ordinary large-scale power plant in running cost, it is said that the maximum allowable level of deterioration accompanying the repetition of suspension of starting, i.e., voltage drop is 80 mV or less per about 4,000 cycles, that is, 20 μV/cycle or less. In Experiment Nos. 1 and 2, which show an internal resistivity of from 1.0 to 3.0 Ω·cm$^2$ during suspension, the drop of voltage of fuel cell stack was inhibited.

On the contrary, in Experiment Nos. 6 and 7, which show an internal resistivity of 1.0 Ω·cm$^2$ or less during suspension, the voltage drop was greater. This is presumably because the extent of drying during suspension is insufficient, causing blocking of pores by moistening water in the electrode and hence formation of local cell resulting in the deterioration of electrode. In Experiment No. 8, which shows an internal resistivity of 10 Ω·cm$^2$ during suspension, the voltage drastically fell.

This is presumably because the repetition of drying during suspension and moistening during starting causes too great change of water content resulting in the rise of volume change due to repetition of expansion and shrinkage of polymer electrolyte membrane and hence damage of electrode.

Next, the results of operating test in Experiment Nos. 1, 3, 9 and 10 are set forth in Table 5.

TABLE 5

| Experiment No. | Internal resistivity (Ω·cm²) Step 3 | Internal resistivity (Ω·cm²) Step 5 | Percent deterioration (μV/cycle) |
|---|---|---|---|
| 1 | 1.0 | 0.3 | 20 |
| 3 | 1.0 | 0.2 | 20 |
| 9 | 1.0 | 0.5 | 25 |
| 10 | 1.0 | 0.7 | 30 |

Under these conditions that the temperature rise and wetting time at Step 5 vary, the results having different internal resistivity values during starting were obtained. In Experiment Nos. 1 and 3, which show an internal resistivity of 0.3 Ω·cm² or less, the drop of voltage was inhibited.

On the contrary, in Experiment Nos. 9 and 10, which show an internal resistivity of more than 0.3 Ω·cm², the voltage drop was greater. This is presumably because when electricity generation begins while the internal resistivity during starting being kept high, the polymer electrolyte membrane exhibits a low protonic conductivity and hence a raised reaction resistivity and thus undergoes deterioration.

Next, the results of operating test in Experiment Nos. 1, 2, 4 to 8, 11 and 12 are set forth in Table 6.

TABLE 6

| Experiment No. | Internal resistivity (Ω·cm²) Step 3 | Internal resistivity (Ω·cm²) Step 5 | Percent deterioration (μV/cycle) |
|---|---|---|---|
| 1 | 1.0 | 0.3 | 20 |
| 2 | 3.0 | 0.3 | 20 |
| 4 | 1.0 | 0.3 | 20 |
| 5 | 3.0 | 0.3 | 20 |
| 6 | 0.3 | 0.3 | 40 |
| 7 | 0.6 | 0.3 | 30 |
| 11 | 0.3 | 0.3 | 80 |
| 12 | 0.6 | 0.3 | 60 |

In Experiment Nos. 1 and 4 and Experiment Nos. 2 and 5, the suspension period at Step 4 varied, but the voltage drop was small and the deterioration of fuel cell stack was inhibited regardless of length of suspension period.

On the contrary, in Experiment Nos. 6 and 11 and Experiment Nos. 7 and 12, the suspension period was long and Experiment Nos. 11 and 12 showed a greater voltage drop. This is presumably because under these drying conditions at Step 3, drying before suspension is so insufficient that local cell is formed in the interior of the electrode, demonstrating that the longer the suspension period is, the more proceeds the deterioration of the electrode.

In the present example, Nafion 112 was used as a polymer electrolyte membrane, but the same effect was obtained also with other materials used as polymer electrolyte membrane. Further, in the present example, the testing temperature was room temperature, which is 27° C., but also at other temperatures, the range of effective internal resistivity according to the present invention can be calculated by Arrhenius plot of electrical conductivity of Nafion 112 described in Reference 1 (Handbook of Fuel Cell, vol. 3, p 567, Fundamentals, Technology and Applications).

The aforementioned Embodiment 9 may correspond to the following embodiments of implementation of the present invention. In other words, the first invention may be a fuel cell system comprising:

A fuel cell stack obtained by laminating a plurality of single cell units each comprising a hydrogen ionically-conductive polymer electrolyte membrane, a pair of electrodes having the aforementioned electrolyte membrane interposed therebetween and a pair of separator plates having flow paths through which a fuel gas and an oxidizing agent gas are supplied into the aforementioned pair of electrodes, respectively;

A fuel generator which produces the aforementioned fuel gas from a raw material gas;

A gas purifying portion which purifies the raw material;

A humidifying portion which moistens the aforementioned oxidizing agent gas;

An electric power circuit portion which takes electric power out of the aforementioned fuel cell stack;

A measuring portion which measures the voltage and resistivity of the aforementioned single cell unit; and A control portion which controls the aforementioned fuel cell stack, fuel generator, gas purifying portion, humidifying portion, electric power circuit portion and measuring portion, wherein the internal resistivity of the aforementioned single cell unit during the suspension of operation of the aforementioned fuel cell system is 1.0 Ω·cm² or more.

Further, the second invention may be a fuel cell system as described in the first invention, wherein the aforementioned measuring portion comprises a high frequency resistance meter.

Further, the third invention may be a fuel cell system of the first invention, wherein the control portion controls the internal resistivity of the aforementioned single cell unit to 1.0 Ω·cm² or more by supplying dried inert gas into the aforementioned fuel cell stack while keeping the aforementioned operating temperature before suspending the operation of the aforementioned fuel cell system.

Further, the fourth invention may be a fuel cell system of the third invention, wherein the aforementioned control portion supplies dried inert gas into the aforementioned fuel cell stack while keeping the aforementioned operating temperature.

Further, the fifth invention may be a fuel cell system of the first invention, wherein the control portion controls the internal resistivity of the aforementioned single cell unit to 0.3 Ω·cm² or less by supplying moistened inert gas into the aforementioned fuel cell stack before suspending the operation of the aforementioned fuel cell system.

Further, the sixth invention may be a fuel cell system of any one of the third to fifth inventions, wherein the aforementioned inert gas is a raw material gas purified in the aforementioned gas purifying portion.

Further, the seventh invention may be a fuel cell system of the fifth invention, wherein the aforementioned inert gas is a moistened raw material gas which has been generated at a temperature of 300° C. or less in the aforementioned fuel generator during starting.

Further, the eighth invention may be a fuel cell system of the fifth invention, wherein the aforementioned inert gas is a raw material gas which has been moistened in the aforementioned humidifying portion with heat and water generated in the aforementioned fuel generator during starting.

Further, the ninth invention may be a fuel cell system of any one of the sixth to eighth inventions, wherein the aforementioned raw material gas is used as a combusting fuel for the aforementioned fuel generator after being supplied into the aforementioned fuel cell stack.

Further, the tenth invention concerns a method of operating a fuel cell system comprising a hydrogen ionically-conductive polymer electrolyte membrane, a pair of electrodes having the aforementioned electrolyte membrane interposed therebetween and a pair of separator plates having flow paths through which a fuel gas and an oxidizing agent gas are supplied into the aforementioned pair of electrodes, respectively, wherein there comprises a step (1) of supplying dried inert gas into the aforementioned fuel cell stack before suspending the operation of the aforementioned fuel cell system to set the internal resistivity of the aforementioned single cell unit to 1.0 $\Omega \cdot cm^2$ or more.

Further, the eleventh invention may be a method of operating a fuel cell system of the tenth invention, wherein at the aforementioned step (1) the aforementioned fuel cell stack is kept at the operating temperature.

Further, the twelfth invention may be a method of operating a fuel cell system of the tenth invention, wherein there comprises a step (2) of supplying moistened inert gas into the aforementioned fuel cell stack before starting the operation of the aforementioned fuel cell system to set the internal resistivity of the aforementioned single cell unit to 0.3 $\Omega \cdot cm^2$ or less.

Further, the thirteenth invention may be a method of operating a fuel cell system of the tenth or twelfth invention, wherein there comprises a step (3) of purifying the raw material gas and at the aforementioned steps (1) and (2) the aforementioned purified raw material gas is used as the aforementioned inert gas.

Further, the fourteenth invention may be a fuel cell system of the twelfth invention, wherein there comprise a step (4) of producing the aforementioned fuel gas from the raw material gas and a step (5) of moistening the raw material gas and at the aforementioned step (2) the aforementioned moistened raw material gas is used as the aforementioned inert gas.

Further, the fifteenth invention may be a fuel cell system of the fourteenth invention, wherein the raw material gas is moistened at the aforementioned step (5) with heat and water generated at the aforementioned step (4).

Embodiment 10

Firstly, the configuration of the fuel cell electricity-generating device according to the present embodiment will be described in connection mainly with FIGS. 30 to 32.

Figure 30:
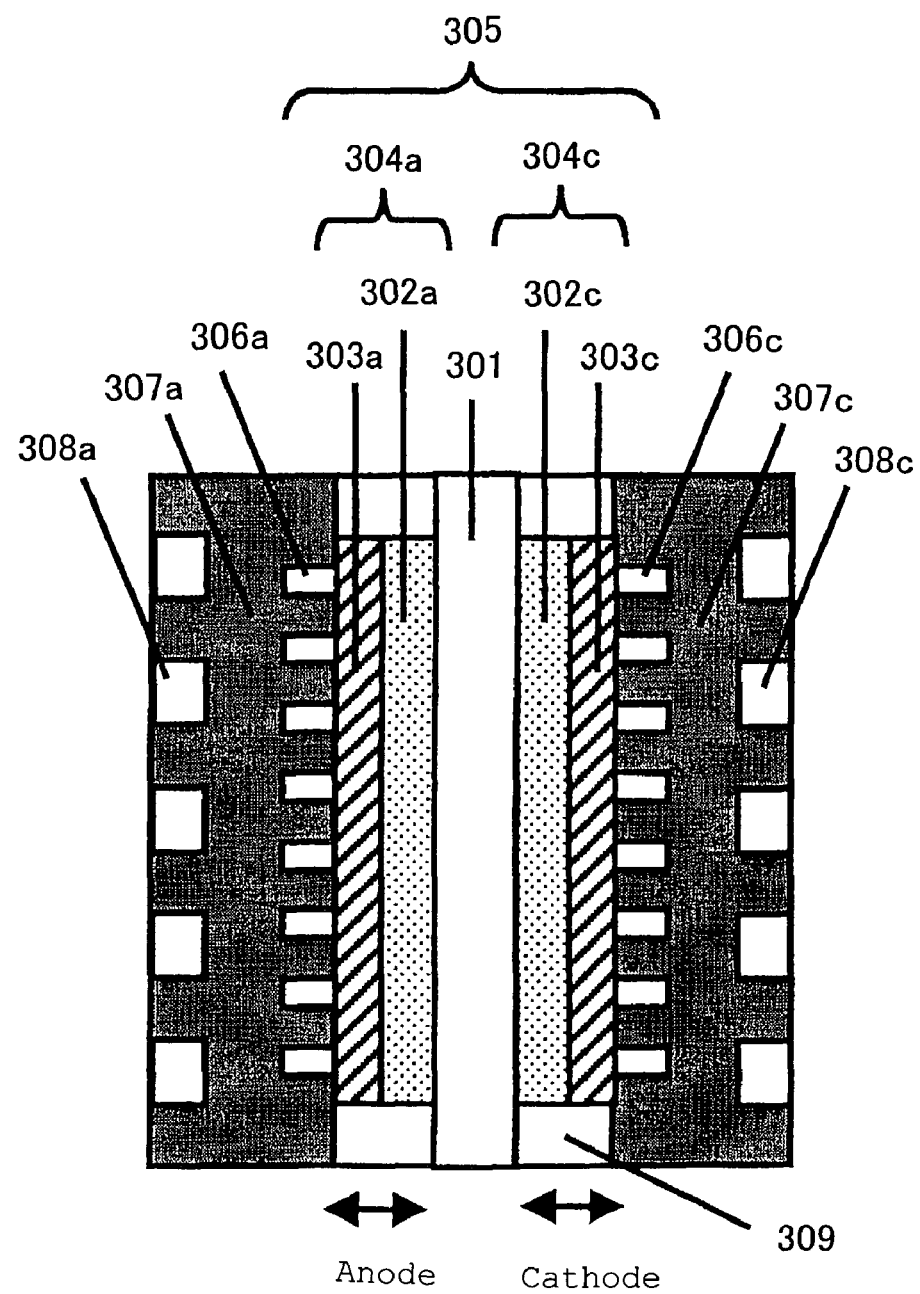
FIG. 30 is a schematic sectional view illustrating the structure of a part of single unit of the polymer electrolyte type fuel cell according to Embodiment 10 of implementation of the present invention.

FIG. 30 depicts the basic configuration of the polymer electrolyte membrane (hereinafter referred to as "PEFC") in the fuel cell according to Embodiment 10 of implementation of the present invention.

A fuel cell is adapted to cause a fuel gas such as hydrogen and an oxidizing agent gas such as air to undergo electrochemical reaction on a gas diffusion electrode to generate electricity and heat at the same time.

The side on which the fuel gas such as hydrogen takes part in the reaction is called anode and is given a sign a and the side on which the oxidizing agent gas such as air takes part in the reaction is called cathode and is given a sign c.

The reference numeral 301 indicates an electrolyte and as the electrolyte there is used a polymer electrolyte membrane which selectively transports hydrogen ion or the like. On the respective surface of the electrolyte 1 (hereinafter occasionally referred to as "membrane") are disposed catalytic reaction layers 302a, 302c mainly composed of a carbon powder having a platinum-based metal catalyst supported thereon. On the catalytic reaction layer, the aforementioned reactions of the (chemical formula 1) and (chemical formula 2) occur.

The fuel gas containing at least hydrogen (hereinafter referred to as "anode gas") undergoes reaction represented by the (chemical formula 1) (hereinafter referred to as "anode reaction").

The hydrogen ion which has moved through the electrolyte 1 then undergoes reaction represented by the (chemical formula 2) with an oxidizing agent gas (hereinafter referred to as "cathode gas") on the catalytic reaction layer 302c (hereinafter referred to as "cathode reaction") to produce water, thereby generating electricity and heat.

Further, diffusion layers 303a, 303c having both gas permeability and electrical conductivity are disposed in close contact with the outer surface of the catalytic reaction layers 302a, 302c. These diffusion layers 303a, 303c and catalytic reaction layers 302a, 302c constitute electrodes 304a, 304c, respectively.

The reference numeral 305 indicates a membrane-electrode assembly (hereinafter referred to as "MEA") which is formed by the electrodes 304a, 304c and the electrolyte 301.

MEA 305 is mechanically fixed, adjacent MEA 305's are electrically connected in series to each other, and a pair of electrically-conductive separators 307a, 307c having gas flow paths 306a, 306c formed on the surface thereof in contact with MEA 5 for carrying away the gas produced by reaction or extra gas are disposed.

The membrane 301, the pair of catalytic reaction layers 302a, 302c, the pair of diffusion layers 303a, 303c, the pair of electrodes 304a, 304c and the pair of separators 307a, 307c form a fuel cell (hereinafter referred to as "cell").

The separator 307c or separator 307a of the adjacent cell comes in contact with the surface of the separator 307a, 307c opposed to MEA 305.

The reference numerals 308a, 308c each indicate a cooling water passage provided on the side where the separators 307a, 307c come in contact with each other and cooling water flows therethrough. Cooling water moves heat through the separators 307a, 307c to adjust the temperature of MEA 305.

The reference numeral 309 indicates MEA gasket which seals MEA 305 to the separators 307a, 307c.

The membrane 301 has fixed charge and as a counter ion for the fixed charge there is present hydrogen ion. The membrane 301 is required to be selectively permeable to hydrogen ion, but, to this end, it is necessary that the membrane 301 have water content retained therein. This is because when the membrane 301 contains water content, the fixed charge fixed in the membrane 301 is ionized, causing hydrogen which is a counter ion for the fixed charge to be ionized and movable.

Figure 31:
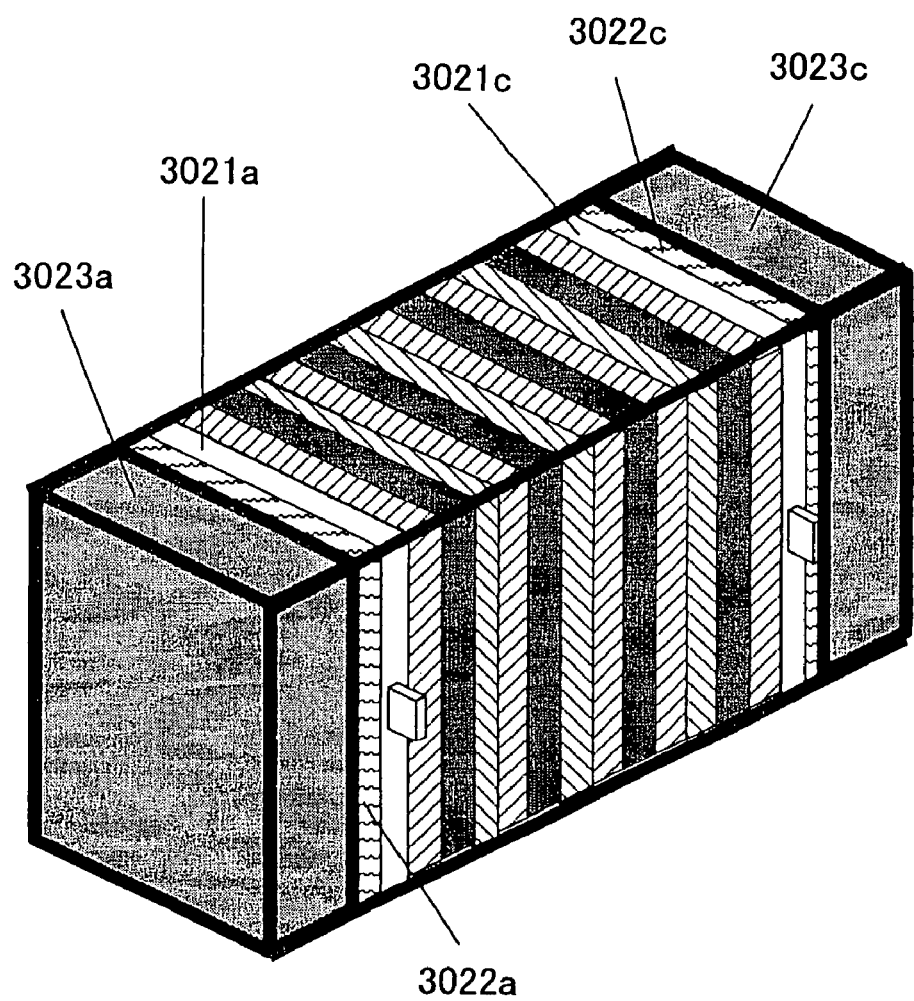
FIG. 31 is a schematic diagram illustrating the structure of a stack obtained by laminating polymer electrolyte type fuel cells according to Embodiment 10 of implementation of the present invention.

FIG. 31 is a perspective view of a stack obtained by laminating cells.

Since the voltage of the fuel cell unit is normally as low as about 0.75, a plurality of cells are laminated in series to attain a high voltage.

The reference numeral 3021 indicates a collector from which current is taken out of the stack and the reference numeral 3022 indicates an insulating plate which electrically insulates the cell from the exterior. The reference numeral 3023 indicates an end plate which fastens and mechanically retains the stack comprising a laminate of cells.

Figure 32:
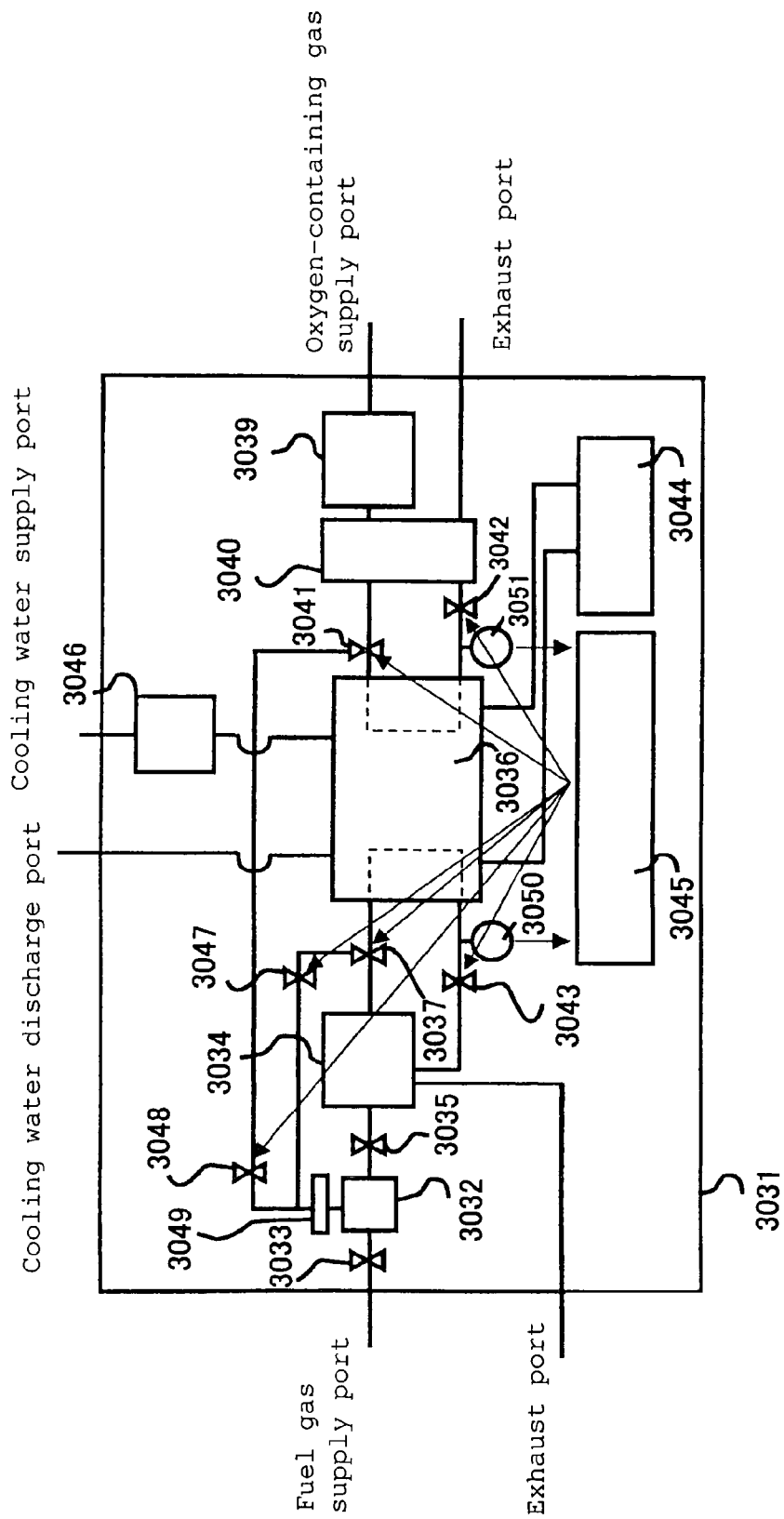
FIG. 32 is a schematic diagram of the fuel cell electricity-generating device according to Embodiment 10 of implementation of the present invention.

FIG. 32 is a diagram illustrating the fuel cell electricity-generating device according to Embodiment 1 of implementation of the present invention.

The reference numeral 3031 indicates the outer case of the fuel cell system.

The reference numeral 3032 indicates a purifying portion of removing materials having an adverse effect on the fuel cell from the fuel gas and introducing the fuel gas from the raw material gas pipe.

The reference numeral 3033 indicates a sluice valve which controls the flow of the raw material gas.

The reference numeral 3034 indicates a fuel generator which produces a fuel gas containing at least hydrogen from the raw material gas.

During the operation of the fuel cell, the raw material gas is introduced into the fuel generator 3034 via the raw material gas pipe and the sluice valve 3035.

The reference numeral 3036 indicates a stack the details of which are shown in FIG. 30 and FIG. 31. The fuel gas is introduced from the fuel generator 3034 into the fuel cell stack 3036 through the fuel gas pipe.

The reference numeral 3037 indicates a sluice valve which controls the flow of the fuel gas to the fuel cell stack 3036. Further, during suspension and storage, the sluice valve 3037 acts to purge the interior of the stack with an inert gas and enclose the inert gas therein. Moreover, during suspension and storage, the sluice valve 3037 acts to purge the interior of the stack with an inert gas and enclose the inert gas therein.

The inert gas is not necessarily a rare gas such as helium and neon or nitrogen but may be a gas inert to the fuel cell such as raw material gas purified in the gas purifying portion, that is, desired purging gas (hereinafter the same).

The reference numeral 3039 indicates a blower by which the oxidizing agent gas is introduced into the fuel cell stack 3036 though a suction pipe.

The reference numeral 3041 indicates a sluice valve which controls the flow of the fuel gas to the fuel cell stack 3036.

The oxidizing agent gas which has not been used in the fuel cell stack 3036 is discharged through the sluice valve 3042. Further, during suspension and storage, the sluice valve 3042 acts to purge the interior of the stack with an inert gas and enclose the inert gas therein.

The reference numeral 3040 indicates a humidifier. Since the fuel cell requires water content, the oxidizing agent gas to be introduced into the fuel cell stack 3036 is moistened in the humidifier.

The fuel gas which has not been used in the fuel cell stack 3036 is again introduced into the fuel generator 3034 through the off-gas pipe. The gas from the off-gas pipe is used for combustion, etc. and utilized for endothermic reaction for the production of fuel gas from the raw material gas, etc.

During suspension and storage, the sluice valve 3042 acts to purge the interior of the stack with an inert gas and enclose the inert gas therein.

The reference numeral 3043 indicates a sluice valve which controls the off-gas to be introduced into the fuel generator 3034 from the fuel cell stack 3036.

The reference numeral 3044 indicates an electric power circuit portion which takes electric power out of the fuel cell stack 3036 and the reference numeral 3045 indicates a control portion which controls gas, electric power circuit portion, sluice valve, etc.

The reference numeral 3046 indicates a pump by which water flows through the water line from the cooling water inlet pipe to the fuel cell stack 3036. The water which has flown through the fuel cell stack 3036 is carried out through the cooling water outlet pipe. When water flows through the fuel cell stack 3036, the heat generated in the fuel cell stack 3036 can be used outside the fuel cell system while keeping the heated fuel cell stack 303036 at a constant temperature.

The oxygen concentration detecting devices 3050, 3051 each detect the change of oxygen concentration of the inert gas with which the fuel cell stack 3036 is filled and, when they detect an oxygen concentration of not smaller than a predetermined value, a signal is then transmitted to the control portion 3045 to operate the sluice valve.

The fuel cell electricity-generating device according to Embodiment 10 is formed by a fuel cell stack 3036 comprising a fuel cell, a gas purifying portion 3032, a fuel generator 3034, an electric power circuit portion 3044, a control portion 3045 and an oxygen concentration detector.

The unit comprising the oxygen concentration detectors 3050, 3051 corresponds to the oxygen concentration detecting unit of the present invention, the control portion 3045 corresponds to the purging gas injecting unit of the present invention, and the fuel cell electricity-generating device according to the present embodiment corresponds to the fuel cell operating device of the present invention.

Further, the gas purifying portion 3032 corresponds to the fuel gas purifying unit of the present invention.

Further, the sluice valve 3041 corresponds to the oxidizing agent gas flow path upstream valve of the present invention, the sluice valve 3042 corresponds to the oxidizing agent gas flow path downstream valve of the present invention, the sluice valve 3037 corresponds to the fuel gas flow path upstream valve of the present invention, and the sluice valve 3043 corresponds to the fuel gas flow path downstream of the present invention.

Next, the operation of the fuel cell electricity-generating device according to the present embodiment will be described. An embodiment of the method of operating the fuel cell of the present invention will be described together with the description of the operation of the fuel cell electricity-generating device according to the present embodiment (hereinafter the same).

Firstly, the basic operation will be described, and the operation concerning the storage, which is a key point of the fuel cell electricity-generating device according to the present embodiment, will be described later.

In FIG. 32, the valve 3033 is opened to cause the raw material gas to flow from the raw material gas pipe into the gas purifying portion 3032.

As the raw material gas there may be used a hydrocarbon-based gas such as natural gas and propane gas, but in the present embodiment, 13A, which is a mixture of methane, ethane, propane and butane gases, was used.

As the gas purifying portion 3032 there is used a member which removes particularly a gas odorizer such as TBM (tertiary butyl mercaptane), DMS (dimethyl sulfide) and THT (tetrahydrothiophine). This is because a sulfur compound such as odorizer is adsorbed to the catalyst of the fuel cell to act as a catalyst poison that inhibits the reaction.

In the fuel generator 34, reaction represented by the (chemical formula 9), etc. occur to produce hydrogen.

$$CH_3 + H_2O \rightarrow 3H_2 + CO \ (-203.0 \text{ KJ/mol}) \quad \text{(chemical formula 9)}$$

Herein, a fuel gas containing hydrogen and water content is produced and then flows into the fuel cell stack 3036 through the fuel gas pipe.

The blower 3039 causes the oxidizing agent gas pass through the humidifier 3040 into the fuel cell stack 3036. The exhaust oxidizing agent gas is discharged out through the exhaust pipe.

As the humidifier 3040 there may be used one which allows an oxidizing agent gas to flow into hot water, one which allows water to be blown into an oxidizing agent gas or the like, but in the present embodiment, a total heat-exchange type humidifier was used. This is adapted to cause water and heat in the exhaust gas passing through the humidifier 3040 to move into the oxidizing agent gas delivered from the suction pipe as a raw material.

The pump 3046 causes cooling water to flow through the water line from the cooling water inlet pipe to the fuel cell stack 3036 and then move out from the cooling water outlet pipe. Though not shown in FIG. 32, the cooling water inlet pipe or the cooling water outlet pipe is normally provided with a hot water dispenser. In this arrangement, heat generated in the fuel cell stack 3036 of the fuel cell can be taken out for use in hot water supply, etc.

The operation of the fuel cell in the fuel cell stack 3036 will be described in connection with FIG. 30.

An oxidizing agent gas such as air is allowed to flow through the gas flow path 306c and a fuel gas containing hydrogen is allowed to flow through the gas flow path 306a.

The hydrogen in the fuel gas diffuses through the diffusion layer 303a until it reaches the catalytic reaction layer 302a. On the catalytic reaction layer 302a, hydrogen decomposes into hydrogen ion and electron. Electron is moved toward the cathode through an external circuit. The hydrogen ion passes through the membrane 301 and then moves toward the cathode until it reaches the catalytic reaction layer 302c.

The oxygen in the oxidizing agent gas diffuses through the diffusion layer 303c until it reaches the catalytic reaction layer 302c. On the catalytic reaction layer 302c, the oxygen reacts with electron to produce oxygen ion that then reacts with hydrogen ion to produce water. In other words, the oxidizing agent gas and the fuel gas react with each other around MEA 305 to produce water and cause electron to flow.

Further, during the reaction, heat is generated to raise the temperature of MEA 305.

Therefore, by allowing water or the like to flow through the cooling water lines 308a, 308c, the heat generated by the reaction is carried out to the exterior. In other words, heat and current (electricity) are generated.

Herein, it is important to control the humidity of the gas to be introduced and the amount of water produced by the reaction. When the water content is too small, the membrane 301 is dried to reduce the ionization of fixed charge and hence the movement of hydrogen, causing the reduction of the generation of heat and electricity. On the contrary, when the water content is too great, water is accumulated around MEA 305 or the catalytic reaction layers 302a, 302c to inhibit the supply of gas and hence the reaction, causing the reduction of the generation of heat and electricity. (This condition will be hereinafter referred to as "flatting".)

The operation after the reaction in the fuel cell unit will be described in connection with FIG. 32.

The exhaust gas as an oxidizing agent gas which has not been used is allowed to move its heat and water content to the oxidizing agent gas which has been sent from the blower 3039 via the humidifier 3040, and then discharged out of the system.

The off-gas as a fuel gas which has not been used is then allowed to again flow into the fuel generator 3040 through the off-gas pipe. The gas from the off-gas pipe is used for combustion or the like in the fuel generator 3040. Since the reaction for the production of a fuel gas from a raw material gas is an endothermic reaction as shown in the (chemical formula 4), it is used as a heat required for the reaction.

The electric power circuit 44 acts to take out dc electric power from the fuel cell stack 36 after the starting of electricity generation of the fuel cell.

The control portion 3045 is adapted to control to keep the control over other parts of the fuel cell system optimum.

Next, the operation concerning the storage, which is a key point of the fuel cell electricity-generating device according to the present embodiment, will be described.

As the raw material gas there was used 13A gas, which is a city gas and as the oxidizing agent gas there was used air.

The conditions were such that the temperature of the fuel cell is 70° C., the percent utilization of fuel gas (Uf) is 70% and the percent utilization of oxygen (Uo) is 40%.

The fuel gas and air were moistened such that they have a dew point of 70° C.

Current was then taken out of the electric power circuit portion 3044. The current was adjusted such that a current density of 0.2 A/cm$^2$ is given per apparent area of electrode.

The cooling water inlet pipe and the cooling water outlet pipe were each provided with a hot water storage tank (not shown).

The pump 3046 was adjusted such that the temperature of water in the cooling water inlet pipe is 70° C. and the temperature of water in the cooling water outlet pipe is 75° C.

The conditions of suspension of starting and storage were as follows.

Figure 34:
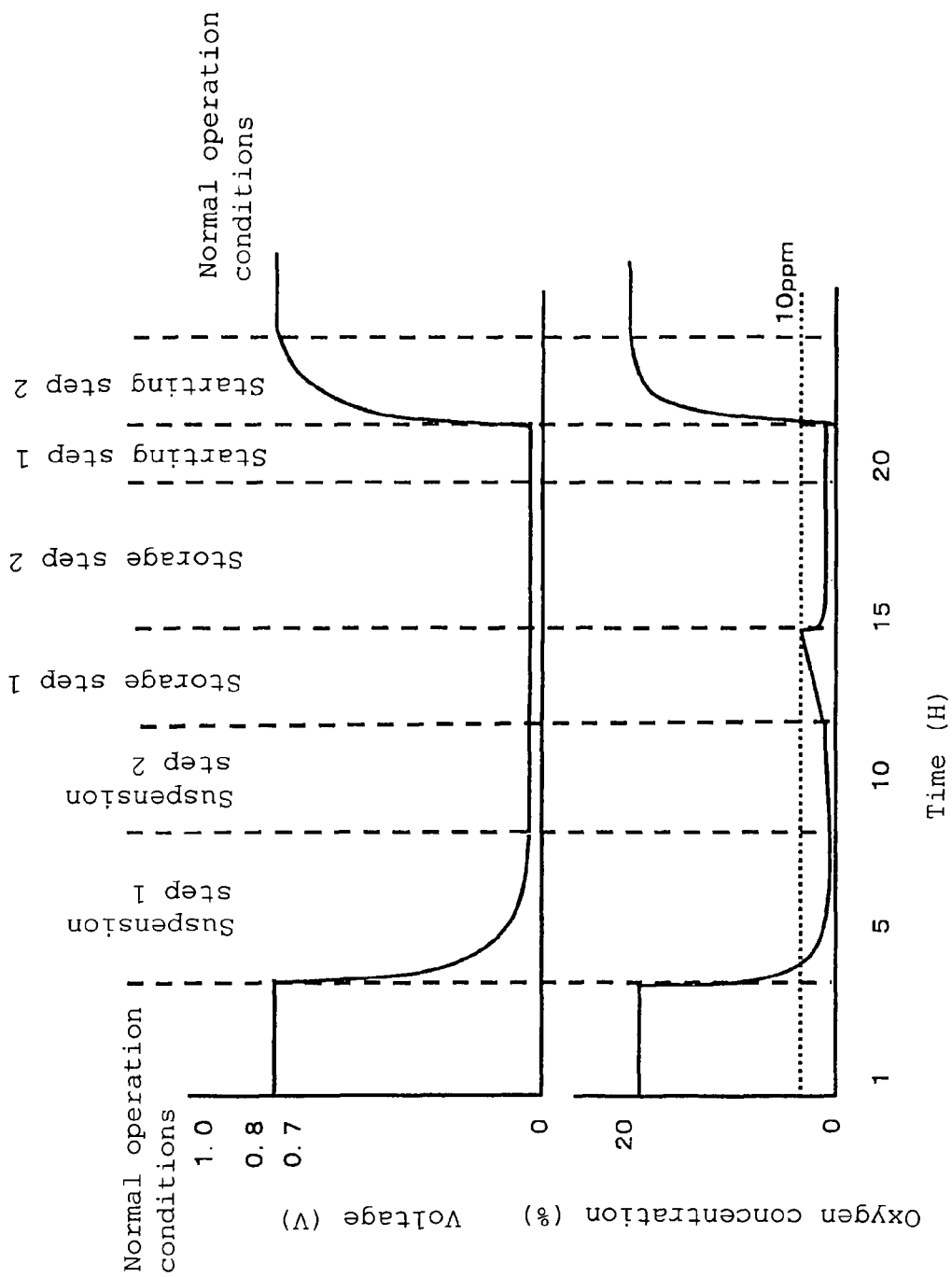
FIG. 34 is a diagram illustrating the relationship between the voltage change and the oxygen concentration in an operation of suspending the starting of the fuel cell electricity-generating device according to Embodiment 10 of implementation of the present invention.

FIG. 34 depicts the voltage change of the stack and the oxygen concentration change.

Under the operating condition A, after the execution of normal operation, the process moved to the suspension step 1.

Current from the stack is taken out by the electric power circuit portion 3044, and the control portion 3045 controls such that when the voltage of a typical single cell unit of the fuel cell stack 3036 falls below 0.5 V, the withdrawal of current is suspended while the voltage exceeds 0.7 V, the withdrawal of current is again conducted.

At the suspension step 1, the blower 3039 was suspended to suspend the supply of air into the fuel cell stack 3036 and the sluice valve 3048 was opened so that the raw material gas which had been freed of materials having adverse effect on the fuel cell such as sulfur compound, e.g., odorizer, nitrogen compound, e.g., ammonia and amine material and carbon monoxide in the gas purifying portion 3032 was allowed to flow in the system by the pump 3049.

Subsequently, the suspension step 2 was executed.

The sluice valve 3035 was closed to suspend the supply of the fuel gas from the fuel generator 3034 into the fuel cell stack 3036 and the sluice valve 3047 was opened so that the raw material gas which had been freed of materials having adverse effect on the fuel cell such as sulfur compound, e.g., odorizer, nitrogen compound, e.g., ammonia and amine material and carbon monoxide in the gas purifying portion 3032 was allowed to flow into the fuel cell stack 3036. The fuel gas which had been pushed out of the fuel cell stack 3036 by the raw material gas was returned from the off-gas pipe to the fuel generator 3034 and the fuel gas in the fuel cell stack 3036 was replaced by the raw material gas.

Subsequently, the suspension step 3 was executed.

At the suspension step 3, the sluice valve 3037 and the sluice valve 3043 on the anode side were closed and the sluice valve 3041 and the sluice valve 3042 on the cathode side were closed so that the interior of the fuel cell stack 3036 was filled with and enclosed by the raw material gas and the pump 3049 was suspended. Further, the pump 3046 was suspended so that the cooling water no longer moves from and to the exterior.

Subsequently, the process moves to the storage step 1. At the storage step 1, the temperature of the fuel generator 3034 and the fuel cell stack 3036 which have had high temperature gradually falls and finally reaches the same value as that of the exterior.

At the storage step 2, since both the oxygen concentration detectors 3050, 3051 detected an oxygen concentration of 10 ppm (corresponding to the lower limit of oxygen concentration that can be detected by an ordinary measuring method), the signal from the control portion 3045 caused the sluice valve 3037 and the sluice valve 3043 on the anode side to be opened and the sluice valve 3041, the sluice valve 3042 on the cathode side to be opened and the pump 3049 to be operated so that the raw material gas was again injected into the fuel cell stack 3036 and caused the sluice valve 3037 and the sluice valve 3043 on the anode side and the sluice valve 3041 and the sluice valve 3042 on the cathode side to be closed so that the fuel cell stack 3036 was enclosed.

In other words, sluice valves are provided upstream and downstream from the oxidizing agent electrode and the fuel electrode on the oxidizing agent gas and fuel gas feed paths, an oxygen concentration detector is provided between the two electrodes and the lower sluice valve and a predetermined concentration is detected by the oxygen concentration detector, whereby the sluice valves disposed upstream and downstream from the two electrodes are opened and closed so that the inert gas is again injected into the system.

In some detail, by predetermining the oxygen concentration at which the oxygen concentration detector causes the sluice valves to operate to 10 ppm or more, a fuel cell electricity-generating device having an excellent durability which is not subject to catalyst deterioration by oxygen can be realized.

Subsequently, the starting step 1 is conducted.

At the starting step 1, the sluice valve 3035 was opened to cause the raw material gas to flow into the fuel generator 3034 where processing was conducted so that the concentration of material which contains hydrogen but is not a fuel, such as carbon monoxide, was not greater than a predetermined value, and subsequently, the sluice valve 3047 was closed, the pump 3049 was suspended and the sluice valve 3037 and the sluice valve 3043 on the anode side were opened so that the raw material gas was supplied into the fuel cell stack 3036.

The temperature of the fuel cell stack 3036 may be raised by operating the pump 3046 to circulate water having a higher temperature than that of the fuel cell stack 3036.

Subsequently, the process moves to the suspension step 2.

At the starting step 2, the blower 3039 was operated and the sluice valve 3041 and the sluice valve 3042 on the cathode side were opened so that air was supplied into the fuel cell stack 3036.

Subsequently, the fuel and current are controlled, and when the fuel and current reaches the conditions for normal operation step, the device is then operated at normal operation step.

While the present embodiment has been described with reference to the case where the raw material gas is again introduced only once, the present invention is not limited thereto, but even when the similar operation was conducted several times in the case where the oxygen concentration detector detects a predetermined concentration, the same effect was obtained.

Thus, the catalyst deterioration by oxygen can be prevented by a suspension method involving the purging and enclosure of the fuel electrode and oxidizing agent electrode of the fuel cell electricity-generating device by an inert gas and the catalyst deterioration can be inhibited by reinjecting the inert gas thereinto in the case where the oxygen concentration in the two electrodes measured during storage reaches not smaller than a predetermined value, whereby a fuel cell electricity-generating device having an excellent durability which is not subject to catalyst deterioration even after prolonged storage can be realized.

Herein, the use of a raw material gas purified in the gas purifying portion as a gas inert to the fuel cell makes it possible to reduce simply the deterioration due to suspension of starting and storage.

In the aforementioned present embodiment, both the detection of the concentration of oxygen on the oxidizing agent gas flow path at a portion between the sluice valve 3041 and the sluice valve 3042 and the detection (b) of the concentration of oxygen on the fuel gas flow path at a portion between the sluice valve 3037 and the sluice valve 3043 were conducted. However, the present invention is not limited to this, and one of the detection of the concentration of oxygen on the oxidizing agent gas flow path at a portion between the sluice valve 3041 and the sluice valve 3042 and the detection (b) of the concentration of oxygen on the fuel gas flow path at a portion between the sluice valve 3037 and the sluice valve 3043 may be conducted.

Further, in the aforementioned present embodiment, both the injection (a) of a predetermined purging gas into a portion between the sluice valve 3041 and the sluice valve 3042 and the injection (b) of a predetermined purging gas into a portion between the sluice valve 3037 and the sluice valve 3043 were conducted. However, the present invention is not limited to this, and one of the injection (a) of a predetermined purging gas into a portion between the sluice valve 3041 and the sluice valve 3042 and the injection (b) of a predetermined purging gas into a portion between the sluice valve 3037 and the sluice valve 3043 may be conducted.

The injection of such a predetermined purging gas was conducted in the aforementioned present embodiment when both the concentration of oxygen on the oxidizing agent gas flow path thus detected and the concentration of oxygen on the fuel gas flow path thus detected were not smaller than a predetermined value. However, the present invention is not limited to this, and the injection of such a predetermined purging gas may be conducted when one of the concentration of oxygen on the oxidizing agent gas flow path thus detected and the concentration of oxygen on the fuel gas flow path thus detected is not smaller than a predetermined value.

Embodiment 11

Firstly, the configuration of the fuel cell electricity-generating device according to the present embodiment will be described in connection mainly with FIG. 33.

Figure 33:
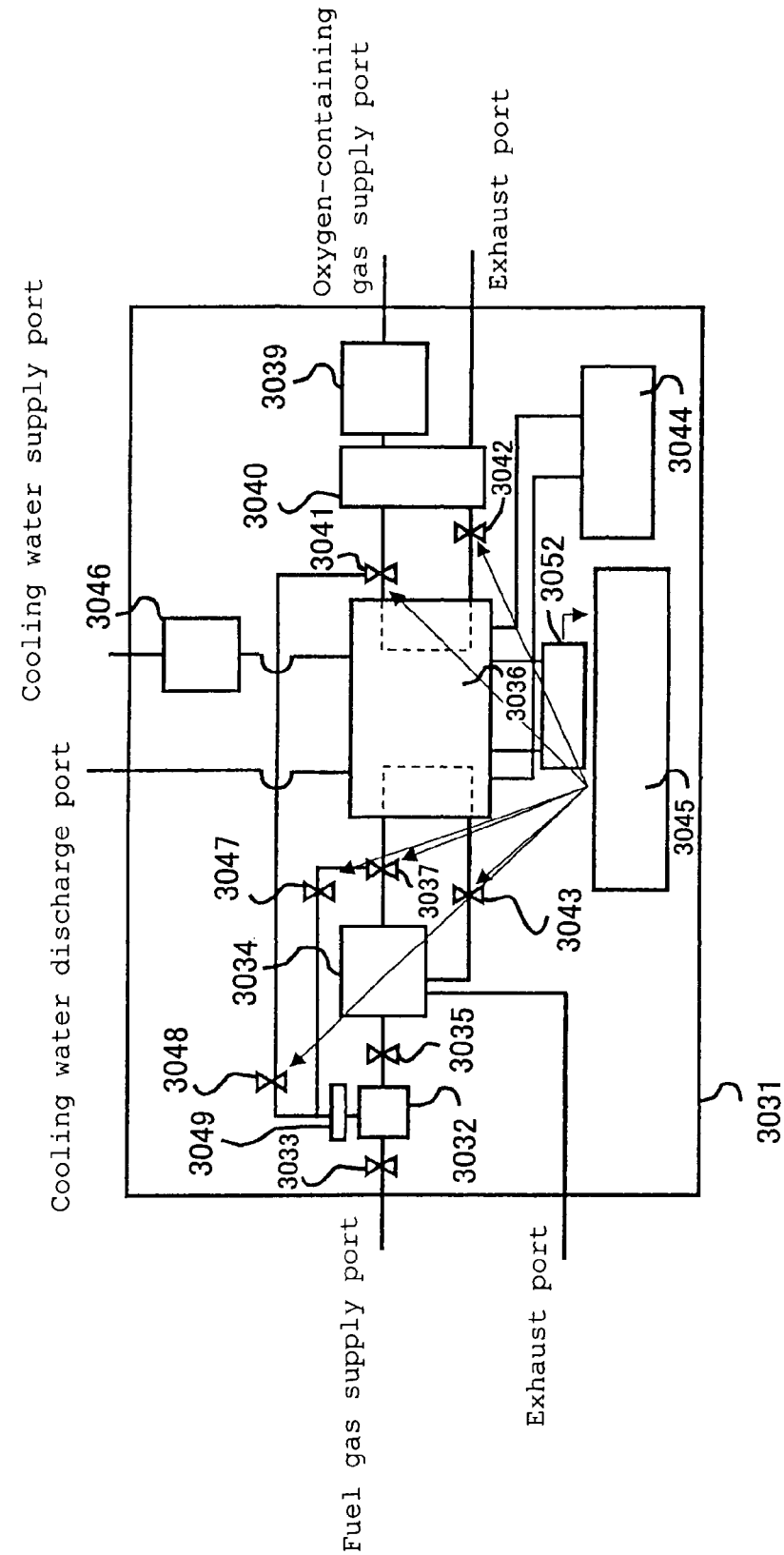
FIG. 33 is a schematic diagram of the fuel cell electricity-generating device according to Embodiment 11 of implementation of the present invention.

FIG. 33 is a diagram illustrating the fuel cell electricity-generating device according to Embodiment 11 of implementation of the present invention.

The fuel cell electricity-generating device according to the present embodiment is essentially the same as the fuel cell electricity-generating device according to Embodiment 10 shown in FIG. 32 but is a fuel cell electricity-generating device comprising a voltage detector 3052 which observes the change of potential of the anode and cathode of the fuel cell stack 3036 instead of the oxygen concentration detector. In other words, the principle of the present embodiment is to observe the potential rise attributed to the adsorption potential caused by the adsorption of oxygen to the electrode.

In the present embodiment, MEA 305 (see FIG. 30) was prepared as follows.

Acetylene black (Denka Black, produced by Denki Kagaku Kogyo K.K.; particle diameter: 35 nm) which is a carbon powder was mixed with an aqueous dispersion of a polytetrafluoroethylene (PTFE) (D1, produced by DAIKIN INDUSTRIES, Ltd.) to prepare a water-repellent ink having a PTFE content of 20% by weight as calculated in terms of dried weight.

This ink was spread over a carbon paper (TGPH060H, produced by Toray Industries, Inc.) which is a substrate for gas diffusion layer so that the carbon paper was impregnated with the ink, and then subjected to heat treatment at 300° C. using a hot air drier to form a gas diffusion layer (about 200 μm).

Separately, 66 parts by weight of a catalyst material (Pt content is 50% by weight) obtained by allowing aPt catalyst to be supported on Ketjen Black (Ketjen Black EC, produced by Ketjen Black International Co., Ltd.; particle diameter: 30 nm) which is a carbon powder and 33 parts by weight (as calculated in terms of dried amount of polymer) of a perfluorocarbonsulfonic acid ionomer (5 wt % Nafion dispersion produced by Aldrich Inc. of USA) as a hydrogen ionically-conductive material and a binder were mixed, and the mixture thus obtained was then molded to form a catalyst layer (10 to 20 μm).

The gas diffusion layer and the catalyst layer thus obtained were then bonded to the respective surface of a polymer electrolyte membrane (Nafion 112 membrane, produced by Du Pont Inc. of USA) to prepare MEA 305.

Subsequently, to the outer periphery of the electrolyte 301 of MEA 305 thus prepared was bonded a rubber gasket plate in which manifold holes for the passage of cooling water, fuel gas and oxidizing agent gas were then formed.

Separately, electrically-conductive separator 307a, 307c made of a graphite plate impregnated with a phenolic resin having an external size of 20 cm×32 cm×1.3 mm and a gas flow path and a cooling water flow path with a depth of 0.5 mm were used.

The control portion 3045 corresponds to the unit containing the first purging gas injecting unit and the second purging gas injecting unit, the voltage detector 52 corresponds to the potential difference detecting unit of the present invention, and the fuel cell electricity-generating device according to the present embodiment corresponds to the fuel cell electricity-generating device of the present invention.

Further, the gas purifying portion 3032 corresponds to the fuel gas purifying unit of the present invention.

Next, the operation of the fuel cell electricity-generating device according to the present embodiment will be described.

The basic operation of the fuel cell stack 3036 other than at the storage step 2 is the same as that of Embodiment 10.

At the storage step 2 of Embodiment 11, after the storage step 1, the sluice valve 3041 and the sluice valve 3042 on the cathode side are temporarily opened to inject the raw material gas into only the cathode.

At this time, when the voltage detector 3052 detects that the potential difference between the anode and the cathode shows a change of not smaller than 10 mV (equal to the above defined 10 ppm, which corresponds to the lower limit of oxygen concentration detectable by an ordinary measuring method), the signal from the control portion 3045 causes the sluice valve 3037 and the sluice valve 3043 on the anode side to be opened. Then, the sluice valve 3041 and the sluice valve 3042 on the cathode side were opened and the pump 3049 was operated so that the raw material gas was again injected into the fuel cell stack 3036 and the sluice valve 3037 and the sluice valve 3041 on the anode side and the sluice valve 3042 on the cathode side were closed to enclose the fuel cell stack 3036.

Figure 35:
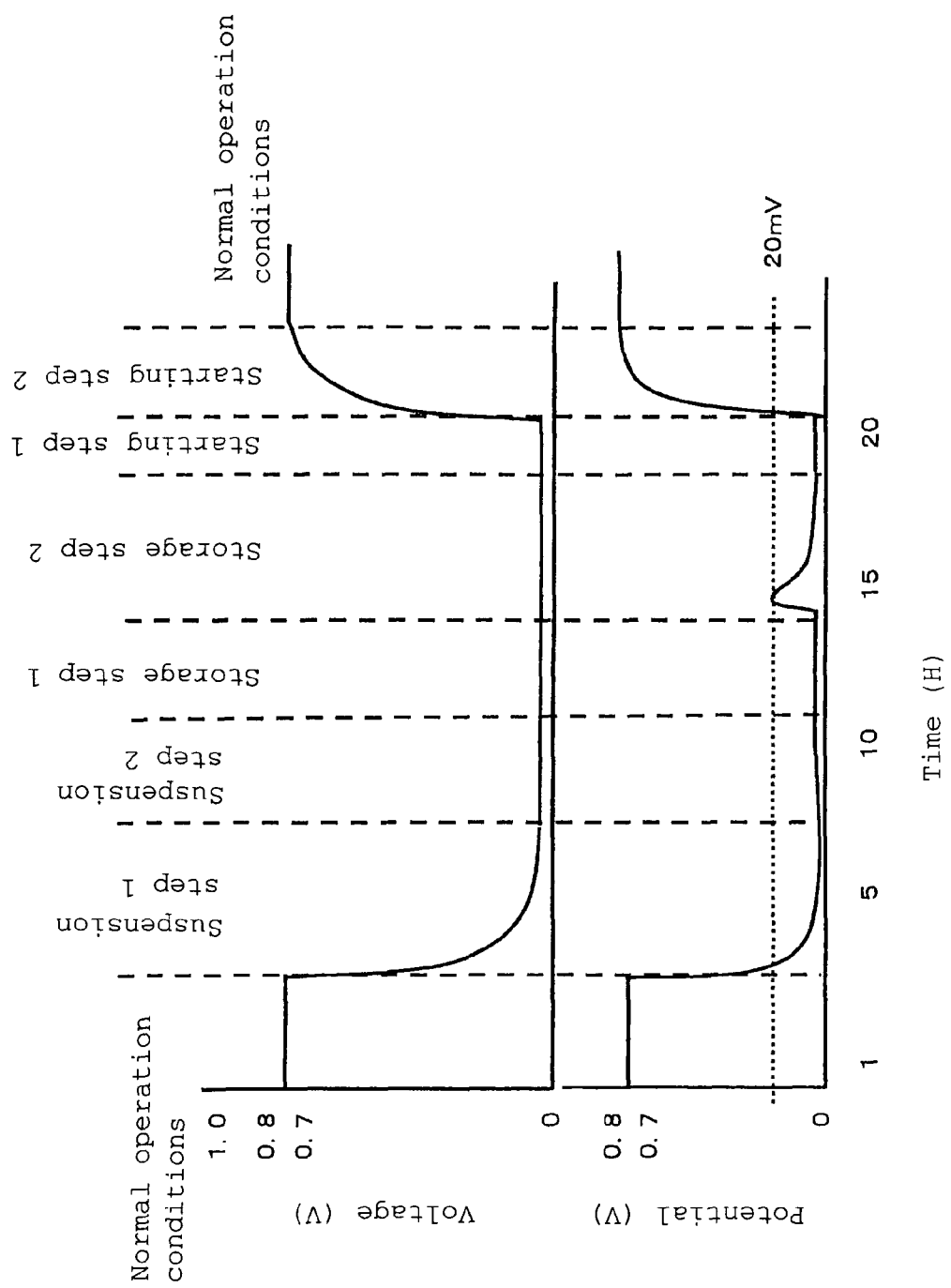
FIG. 35 is a diagram illustrating the relationship between the voltage change and the change of potential between anode and cathode in an operation of suspending the starting of the fuel cell electricity-generating device according to Embodiment 11 of implementation of the present invention.

FIG. 35 depicts the voltage change of the stack and the change of potential of the anode different from the cathode into which the raw material gas has been injected.

While the raw material gas was temporarily injected into the cathode in the present embodiment, the present invention is not limited thereto, but the same effect was obtained also when the raw material gas was temporarily injected into the anode.

The reason why the raw material gas is firstly injected into only one of the cathode or the anode is that oxygen penetrates the entire fuel cell stack 3036 from the sealed portion of the fuel cell stack 3036, etc., often causing the potential of the both electrodes to change almost similarly.

By thus temporarily and additionally purging one of the fuel electrode and the oxidizing agent electrode with an inert gas during storage, detecting the potential difference between the two electrodes and then reinjecting the inert gas thereinto, the catalyst deterioration can be inhibited, making it possible to realize a fuel cell electricity-generating device having an excellent durability which is not subject to catalyst deterioration even during prolonged storage.

In other words, sluice valves are provided upstream and downstream from the oxidizing agent electrode and the fuel electrode on the oxidizing agent gas and fuel gas flow paths, a voltage detecting device of detecting the potential difference between the oxidizing agent electrode and the fuel electrode is provided, and when the potential difference between the two electrodes during partial additional purging with the inert gas indicates not smaller than a predetermined value, the sluice valves disposed upstream and downstream from the two electrodes are opened or closed to reinject the inert gas.

In some detail, by causing the voltage detector to operate the sluice valves so that the potential difference between the two electrodes into which the inert gas is reinjected reaches 10 mV or more, a fuel cell electricity-generating device having an excellent durability which is not subject to catalyst deterioration due to entrance of gas from the exterior or leakage of slight amount of gas can be realized.

Comparative Example

The comparative example is similar to Embodiment 10 and Embodiment 11 but is not provided with oxygen concentration detector and voltage detector and is a starting suspending and storage method which involves the reinjection of the raw material gas at the storage step 2 only when the predetermined potential difference is detected.

Figure 36:
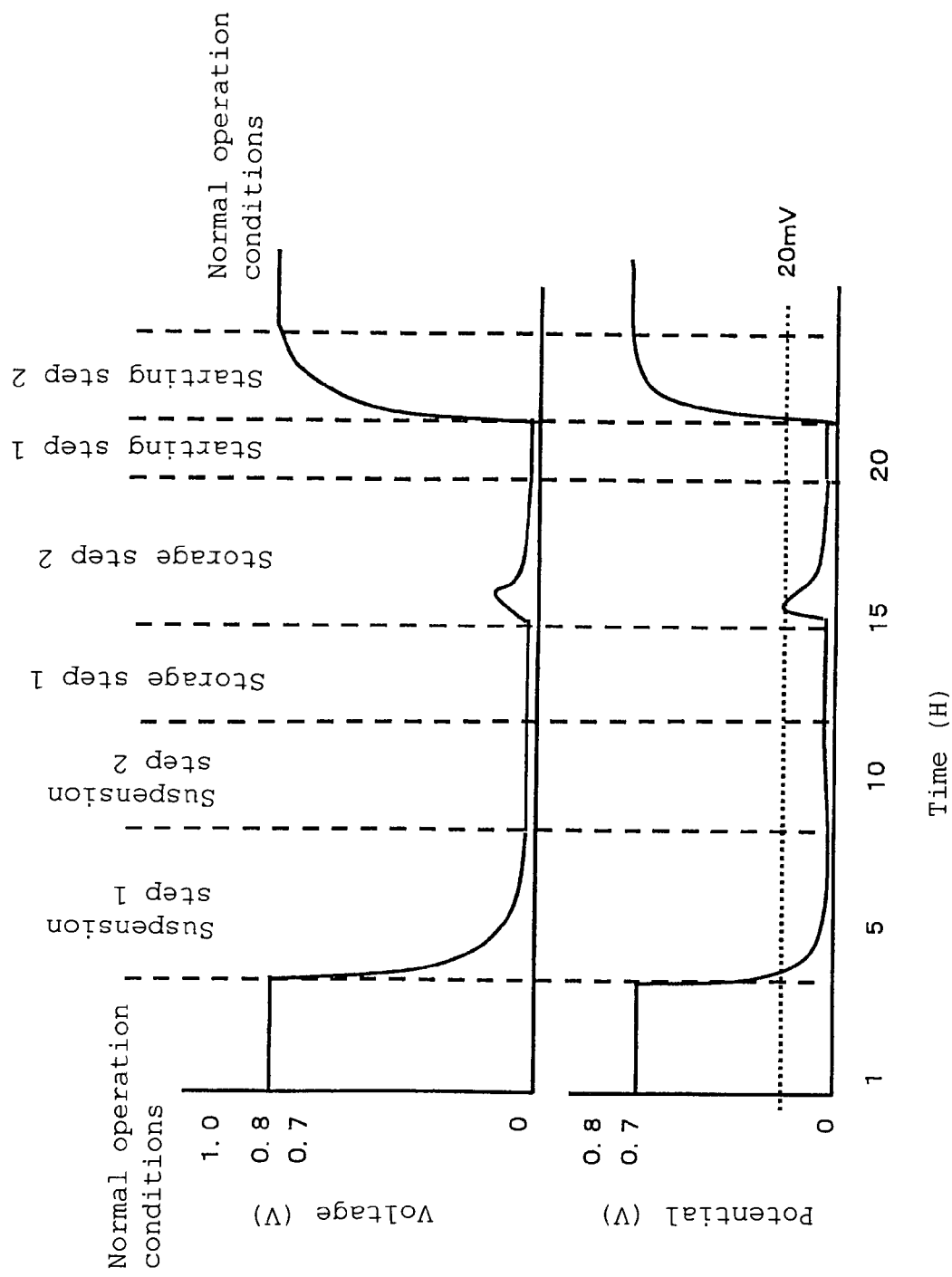
FIG. 36 is a diagram illustrating the voltage change in an operation of suspending the starting of a fuel cell electricity-generating device according to a comparative example of the present invention.

FIG. 36 depicts the voltage change of the stack of the comparative example and the potential change of the anode.

As can be seen in the change of stack voltage shown in FIG. 34, the voltage of the fuel cell stack 3036 shows no change even when oxygen has entered the fuel cell stack 3036 during storage (As previously mentioned, since oxygen enters the entire fuel cell stack 3036, the potential of the two electrodes change almost similarly, causing no change of the voltage of the fuel cell stack 3036, which is the potential change between the two electrodes). Thus, by providing the outer case 3031 with the oxygen concentration detectors 3050, 3051, the effect of oxygen in the fuel cell stack 3036 can be observed.

In other words, when the operation of Embodiment 10 is executed, the catalyst deterioration can be prevented, making it possible to provide a fuel cell electricity-generating device which exhibits an excellent durability even when suspension of starting is conducted.

As can be seen in the change of stack voltage shown in FIG. 35, when the raw material gas is temporarily injected into the cathode or anode, a change of the potential difference between the two electrodes is observed. This is presumably a potential change attributed to the entrance of oxygen from the exterior.

Even when the potential difference between the two electrodes is zero, the potential itself has risen in most cases (For the aforementioned reasons, the potential difference between the two electrodes is observed to be zero even when oxygen enters the fuel cell stack 3036). When the anode is affected by the potential rise, the elution of Ru occurs. In Embodiment 11, the change of potential rise can be observed by the voltage detector by making the use of the change of potential of the various cells during the temporary injection of the raw material gas into one of the electrodes.

In other words, the operation of Embodiment 11 can be executed to prevent not only the catalyst deterioration due to oxygen but also the catalyst deterioration due to potential rise, making it possible to provide a fuel cell electricity-generating device which exhibits an excellent durability even when suspension of starting is conducted.

Figure 37:
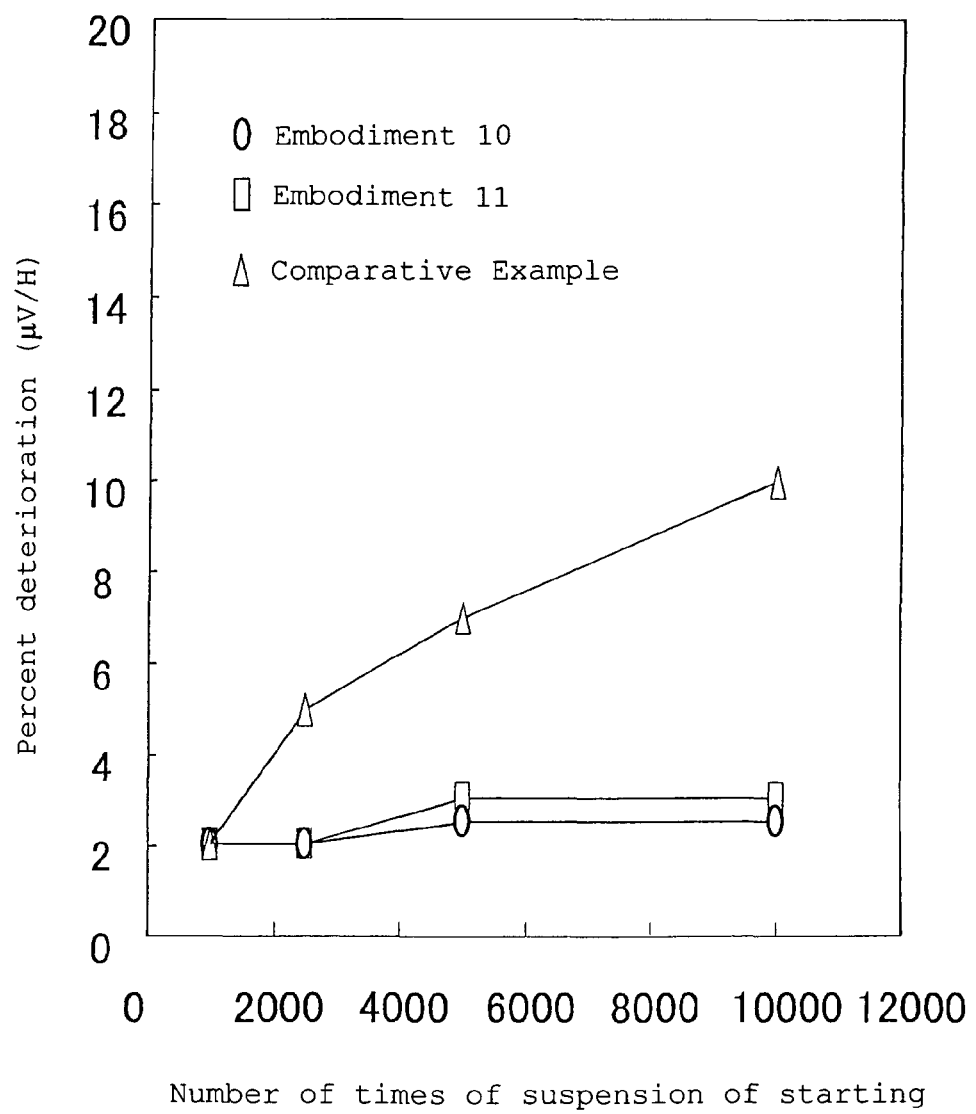
FIG. 37 is a diagram illustrating the relationship between the number of times of suspending of starting and durability of fuel cell electricity-generating devices according to Embodiments 10 and 11 of implementation of the present invention and comparative example.
Figure 38:
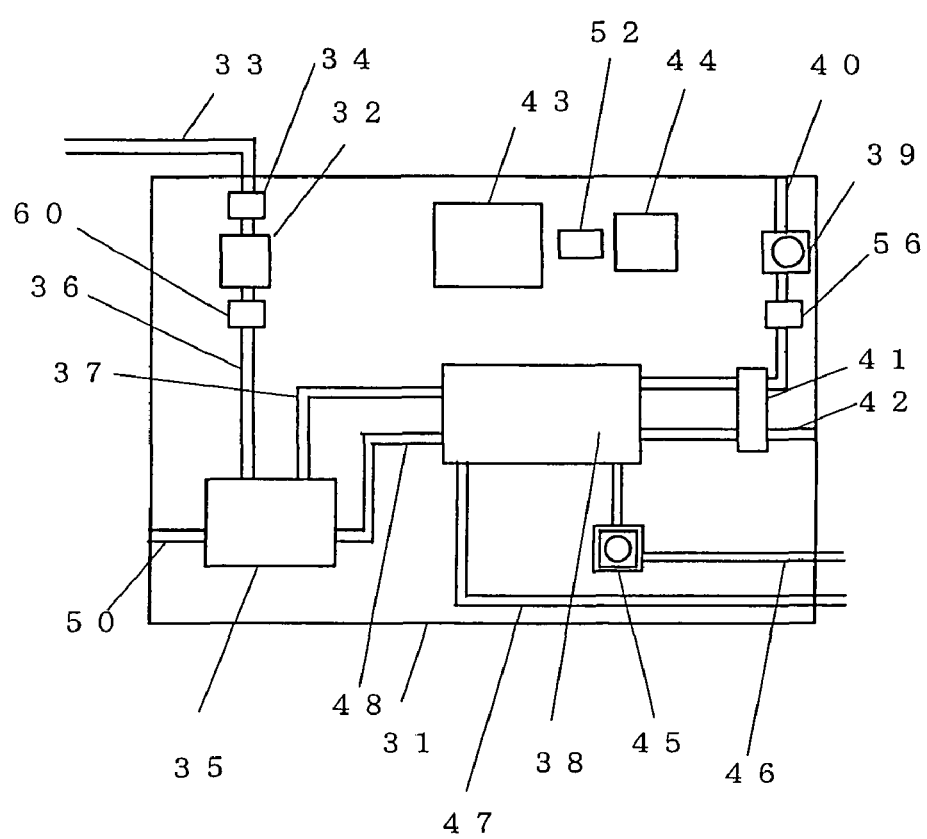
FIG. 38 is a configurational diagram of a fuel cell system according to conventional technique.

FIG. 37 depicts the results of durability of the stack which has been subjected to starting suspension method according to Embodiments 10 and 11 and the comparative example.

As shown in FIG. 37, Embodiment 10 and Embodiment 11, in which the raw material gas was reinjected during storage step, allow the percent endurance deterioration after 10,000 times of suspension of starting to be kept at a very low value as compared with the comparative example.

This demonstrates that the reinjection of the raw material gas during storage and suspension makes it possible to prevent the catalyst deterioration by oxygen and the catalyst deterioration due to potential rise as previously mentioned.

In accordance with the present embodiment, a fuel cell electricity-generating device which can exhibit a high durability without causing catalyst deterioration even during prolonged storage can be provided.

Further, the aforementioned Embodiments 10 and 11 may correspond to the following embodiments of implementation of the present invention. In other words, the first invention may be a fuel cell operating device comprising:

An oxygen concentration detecting unit of performing, during the storage period of the fuel cell, (1) the detection of the concentration of oxygen on an oxidizing agent gas flow path through which a predetermined oxidizing agent gas is supplied to or discharged from an oxidizing agent electrode of the aforementioned fuel cell between an oxidizing agent gas flow path upstream valve provided upstream from the aforementioned oxidizing agent electrode on the oxidizing agent gas flow path and an oxidizing agent gas flow path downstream valve provided downstream from the aforementioned oxidizing agent electrode on the aforementioned oxidizing agent gas flow path and/or (2) the detection of the concentration of oxygen on a fuel gas flow path through which a predetermined fuel gas is supplied to and discharged from a fuel electrode of the aforementioned fuel cell between a fuel gas flow path upstream valve provided upstream from the aforementioned fuel electrode on the fuel gas flow path and a fuel gas flow path downstream valve provided downstream from the aforementioned fuel electrode on the aforementioned fuel gas flow path; and A purging gas injecting unit of performing, when the aforementioned oxidizing agent gas flow path oxygen concentration thus detected and/or the fuel gas flow path oxygen concentration thus detected is not smaller than a predetermined value, (a) the injection of a predetermined purging gas into a portion between the aforementioned oxidizing agent gas flow path upstream valve and the aforementioned oxidizing agent gas flow path downstream valve and/or (b) the injection of the predetermined purging gas into a portion between the aforementioned fuel gas flow path upstream valve and the aforementioned fuel gas downstream valve.

Further, the second invention may be a fuel cell operating device of the first invention, wherein there is further provided a fuel gas purifying unit of purifying the aforementioned predetermined fuel gas, and the aforementioned predetermined purging gas is the aforementioned purified fuel gas.

Further, the third invention may be a fuel cell operating device of the first invention, wherein the aforementioned predetermined value is 10 ppm.

Further, the fourth invention may be a fuel cell operating method comprising:

An oxygen concentration detecting step of performing, during the storage period of a fuel cell, (1) the detection of the concentration of oxygen on an oxidizing agent gas flow path through which a predetermined oxidizing agent gas is supplied to and discharged from an oxidizing agent electrode of the aforementioned fuel cell between an oxidizing agent gas flow path upstream valve provided upstream from the aforementioned oxidizing agent electrode on the oxidizing agent gas flow path and an oxidizing agent gas flow path downstream valve provided downstream from the aforementioned oxidizing agent electrode on the aforementioned oxidizing agent gas flow path and/or (2) the detection of the concentration of oxygen on a fuel gas flow path through which a predetermined fuel gas is supplied to and discharged from a fuel electrode of the aforementioned fuel cell between a fuel gas flow path upstream valve provided upstream from the aforementioned fuel electrode on the fuel gas flow path and a fuel gas flow path downstream valve provided downstream from the aforementioned fuel electrode on the aforementioned fuel gas flow path; and A purging gas injecting step of performing, when the aforementioned oxidizing agent gas flow path oxygen concentration thus detected and/or the fuel gas flow path oxygen concentration thus detected is not smaller than a predetermined value, (a) the injection of a predetermined purging gas into a portion between the aforementioned oxidizing agent gas flow path upstream valve and the aforementioned oxidizing agent gas flow path downstream valve and/or (b) the injection of the predetermined purging gas into a portion between the aforementioned fuel gas flow path upstream valve and the aforementioned fuel gas downstream valve.

Further, the fifth invention may be a program of causing a computer to execute the purging gas injecting step of performing, when the aforementioned oxidizing agent gas flow path oxygen concentration thus detected and/or the fuel gas flow path oxygen concentration thus detected is not smaller than a predetermined value, (a) the injection of a predetermined purging gas into a portion between the aforementioned oxidizing agent gas flow path upstream valve and the aforementioned oxidizing agent gas flow path downstream valve and/or (b) the injection of the predetermined purging gas into a portion between the aforementioned fuel gas flow path upstream valve and the aforementioned fuel gas downstream valve.

Further, the sixth invention may be a fuel cell operating device comprising:

A first purging gas injecting unit of performing, during the storage period of a fuel cell, (1) the injection of a predetermined purging gas into a portion on an oxidizing agent gas flow path through which a predetermined oxidizing agent gas is supplied to and discharged from an oxidizing agent electrode of the aforementioned fuel cell between an oxidizing agent gas flow path upstream valve provided upstream from the aforementioned oxidizing agent electrode on the oxidizing agent gas flow path and an oxidizing agent gas flow path downstream valve provided downstream from the aforementioned oxidizing agent electrode on the aforementioned oxidizing agent gas flow path and/or (2) the injection of a predetermined purging gas into a portion on a fuel gas flow path through which a predetermined fuel gas is supplied to and discharged from a fuel electrode of the aforementioned fuel cell between a fuel gas flow path upstream valve provided upstream from the aforementioned fuel electrode on the fuel gas flow path and a fuel gas flow path downstream valve provided downstream from the aforementioned fuel electrode on the aforementioned fuel gas flow path;

A potential difference detecting unit of detecting the difference in potential between the aforementioned oxidizing agent electrode and the aforementioned fuel electrode; and A second purging gas injecting unit of performing again, when the change of potential difference between the aforementioned detection conducted before and after the injection of the predetermined purging gas into a portion between the aforementioned oxidizing agent gas flow path upstream valve and the aforementioned oxidizing agent gas flow path downstream valve or the injection of the predetermined purging gas into a portion between the aforementioned fuel gas flow path upstream valve and the aforementioned fuel gas flow path downstream valve is not smaller than a predetermined value, (a) the injection of the predetermined purging gas into a portion between the aforementioned oxidizing agent gas flow path upstream valve and the aforementioned oxidizing agent gas flow path downstream valve and (b) the injection of the predetermined purging gas into a portion between the aforementioned fuel gas flow path upstream valve and the aforementioned fuel gas downstream valve.

Further, the seventh invention may be a fuel cell operating device of the sixth invention, wherein there is further provided a fuel gas purifying unit of purifying the aforementioned predetermined fuel gas, and the aforementioned predetermined purging gas is the aforementioned purified fuel gas.

Further, the eighth invention may be a fuel cell operating device of the sixth invention, wherein the aforementioned predetermined value is 10 mV.

Further, the ninth invention may be a fuel cell operating method comprising:

A first purging gas injecting step of performing, during the storage period of a fuel cell, (1) the injection of a predetermined purging gas into a portion on an oxidizing agent gas flow path through which a predetermined oxidizing agent gas is supplied to and discharged from an oxidizing agent electrode of the aforementioned fuel cell between an oxidizing agent gas flow path upstream valve provided upstream from the aforementioned oxidizing agent electrode on the oxidizing agent gas flow path and an oxidizing agent gas flow path downstream valve provided downstream from the aforementioned oxidizing agent electrode on the aforementioned oxidizing agent gas flow path or (2) the injection of a predetermined purging gas into a portion on a fuel gas flow path through which a predetermined fuel gas is supplied to or discharged from a fuel electrode of the aforementioned fuel cell between a fuel gas flow path upstream valve provided upstream from the aforementioned fuel electrode on the fuel gas flow path and a fuel gas flow path downstream valve provided downstream from the aforementioned fuel electrode on the aforementioned fuel gas flow path;

A potential difference detecting step of detecting the difference in potential between the aforementioned oxidizing agent electrode and the aforementioned fuel electrode; and A second purging gas injecting step of performing again, when the change of potential difference between the aforementioned detection conducted before and after the injection of the predetermined purging gas into a portion between the aforementioned oxidizing agent gas flow path upstream valve and the aforementioned oxidizing agent gas flow path downstream valve or the injection of the predetermined purging gas into a portion between the aforementioned fuel gas flow path upstream valve and the aforementioned fuel gas flow path downstream valve is not smaller than a predetermined value, (a) the injection of the predetermined purging gas into a portion between the aforementioned oxidizing agent gas flow path upstream valve and the aforementioned oxidizing agent gas flow path downstream valve and (b) the injection of the predetermined purging gas into a portion between the aforementioned fuel gas flow path upstream valve and the aforementioned fuel gas downstream valve.

Further, the tenth invention may be a program of causing a computer to execute, during the storage period of a fuel cell, (1) the injection of a predetermined purging gas into a portion on an oxidizing agent gas flow path through which a predetermined oxidizing agent gas is supplied to or discharged from an oxidizing agent electrode of the aforementioned fuel cell between an oxidizing agent gas flow path upstream valve provided upstream from the aforementioned oxidizing agent electrode on the oxidizing agent gas flow path and an oxidizing agent gas flow path downstream valve provided downstream from the aforementioned oxidizing agent electrode on the aforementioned oxidizing agent gas flow path or (2) a first purging gas injecting step of injecting a predetermined purging gas into a portion on a fuel gas flow path through which a predetermined fuel gas is supplied to or discharged from a fuel electrode of the aforementioned fuel cell between a fuel gas flow path upstream valve provided upstream from the aforementioned fuel electrode on the fuel gas flow path and a fuel gas flow path downstream valve provided downstream from the aforementioned fuel electrode on the aforementioned fuel gas flow path and a second purging gas injecting step of performing again, when the change of potential difference between the aforementioned detection conducted before and after the injection of the predetermined purging gas into a portion between the aforementioned oxidizing agent gas flow path upstream valve and the aforementioned oxidizing agent gas flow path downstream valve or the injection of the predetermined purging gas into a portion between the aforementioned fuel gas flow path upstream valve and the aforementioned fuel gas flow path downstream valve is not smaller than a predetermined value, (a) the injection of the predetermined purging gas into a portion between the aforementioned oxidizing agent gas flow path upstream valve and the aforementioned oxidizing agent gas flow path downstream valve and (b) the injection of the predetermined purging gas into a portion between the aforementioned fuel gas flow path upstream valve and the aforementioned fuel gas downstream valve, of the fuel cell operating method of the ninth invention.

Further, the eleventh invention may be a recording medium carrying a program of the fifth or tenth invention which can be processed by a computer.

The program according to the present invention may be a program which causes a computer to execute the function of all or some units (or devices, elements, circuits, parts, etc.) of the aforementioned fuel cell system of the present invention and operates in cooperation with the computer.

Further, the present invention may be a medium carrying a program which causes a computer to execute the function of all or some units of the aforementioned fuel cell system of the present invention and operates in cooperation with the computer and can be read by the computer wherein the aforementioned program thus read performs the aforementioned function in cooperation with the aforementioned computer.

The term "some units (or devices, elements, circuits, parts, etc.)" and the term "some steps (or processes, operations, actions, etc.) as used hereinabove are meant to indicate some of a plurality of these units or steps or some functions or some operations in one unit or step.

Further, some devices (or elements, circuits, parts, etc.) of the present invention mean some devices in a plurality of these devices, some units (or elements, circuits, parts, etc.) in one device or some functions in one unit.

Further, a recording medium having a program of the present invention recorded therein which can be read by a computer, too, is included in the present invention.

Further, an embodiment of the usage of the program of the present invention may be such that it is recorded on a recording medium recordable by a computer and operates in cooperation with the computer.

Further, another embodiment of the usage of the program of the present invention may be such that it propagates in a transmitting medium, is read by a computer and operates in cooperation with the computer.

Further, recording media include ROM, etc., and transmitting media include transmitting mechanisms such as internet, light, electric wave, sound wave, etc.

Further, the aforementioned computer of the present invention is not limited to pure hardwares such as CPU but may be one including firmware, OS or even peripheries.

As mentioned above, the constitution of the present invention may be realized either on a software basis or on a hardware basis.

INDUSTRIAL APPLICABILITY

The fuel cell system according to the present invention can cope with problems such as acceleration of drying of electrolyte membrane and local reaction to allow stabilization of performance of fuel cell even after repetition of suspension and electricity generation of fuel cell and thus is useful as a portable electric supply, electric supply for portable devices, electric supply for electric car or household fuel cell system.

The invention claimed is:

1. A fuel cell system comprising:
    a fuel cell which generates electric power from a fuel gas and an oxidizing agent gas;
    a fuel gas supplying means which supplies the fuel gas to an anode side of the fuel cell;
    an oxidizing agent gas supplying means which supplies the oxidizing agent gas to a cathode side of the fuel cell;
    a raw material gas supplying means which supplies a raw material gas to be used in the production of the fuel gas; and
    a control means which controls the fuel gas supplying means, the oxidizing agent gas supplying means and the raw material gas supplying means such that during the starting of electricity generation of the fuel cell, the raw material gas supplying means purges at least the cathode side with the raw material gas, in which a sulfur compound is removed, before the fuel gas supplying means and the oxidizing agent gas supplying means supply the fuel gas and the oxidizing agent gas to the fuel cell, respectively,
    wherein the raw material gas comprises hydrogen and carbon.

2. The fuel cell system according to claim 1, wherein the raw material gas supplying means purges the anode side after purging the cathode side.

3. The fuel cell system according to claim 1 or 2, further comprising:
    a fuel gas pipe disposed between the fuel gas supplying means and the anode side;
    a fuel gas on-off valve disposed along the fuel gas pipe;
    an oxidizing agent gas pipe disposed between the oxidizing agent gas supplying means and the cathode side;
    an oxidizing agent gas on-off valve disposed along the oxidizing agent gas pipe;
    a raw material gas pipe connected to the raw material gas supplying means and a part of the oxidizing agent gas pipe disposed between the oxidizing agent gas on-off valve and the cathode side; and
    a raw material gas on-off valve disposed along the raw material gas pipe.

4. The fuel cell system according to claim 3, further comprising:
    a cathode side exhaust pipe through which an off-gas discharged from the cathode side is discharged; and
    a cathode side off-gas on-off valve disposed along the cathode side exhaust pipe,
    wherein the purge is carried out by opening the cathode side off-gas on-off valve, opening the raw material gas on-off valve for a predetermined period of time and then closing the raw material gas on-off valve.

5. The fuel cell system according to claim 4, further comprising:
    an additional raw material gas pipe connected to the raw material gas supplying means and a part of the fuel gas pipe disposed between the fuel gas on-off valve and the anode side;
    an additional raw material gas on-off valve disposed along the additional raw material gas pipe;
    an anode side exhaust pipe through which an off-gas discharged from the anode side is discharged; and
    an anode side off-gas on-off valve disposed along the anode side exhaust pipe,
    wherein the purge is carried out by opening the raw material gas on-off valve, opening the anode side off-gas on-off valve, and then opening the additional raw material gas on-off valve for a predetermined period of time.

6. The fuel cell system according to claim 5, wherein the operation of the fuel gas supplying means and the oxidizing agent gas supplying means of supplying the fuel gas and the oxidizing agent gas to the fuel cell is carried out by opening the anode side off-gas on-off valve, opening the fuel gas on-off valve, opening the cathode side off-gas on-off valve, and then opening the oxidizing agent gas on-off valve.

7. A method of starting a fuel cell system comprising a fuel cell which generates electric power from a fuel gas and an oxidizing agent gas, a fuel gas supplying means which supplies the fuel gas to an anode side of the fuel cell, and an oxidizing agent gas supplying means which supplies the oxidizing agent gas to a cathode side of the fuel cell, comprising:
    a purging step of purging, during the starting of electricity generation of the fuel cell, at least the cathode side with a raw material gas to be used in the production of the fuel gas, in which a sulfur compound is removed, before the fuel gas and the oxidizing agent gas are supplied to the fuel cell,
    wherein the raw material gas comprises hydrogen and carbon.

8. The method of starting a fuel cell system according to claim 7, wherein the anode side is purged after purging the cathode side.

9. The fuel cell system according to claim 1, wherein the raw material gas is a hydrocarbon-based gas to be used by a reformer in the production of the fuel gas.

* * * * *